United States Patent [19]

Minovitch

[11] Patent Number: 5,052,638

[45] Date of Patent: Oct. 1, 1991

[54] ELECTROMAGNETIC RAMJET

[76] Inventor: Michael A. Minovitch, 2832 St. George St. #6, Los Angeles, Calif. 90027

[21] Appl. No.: 330,632

[22] Filed: Mar. 30, 1989

[51] Int. Cl.$^5$ .................. B64C 39/00; B64D 27/02
[52] U.S. Cl. .................. 244/53 R; 60/202; 244/62; 244/172
[58] Field of Search .......... 60/202; 244/53 R, 62, 244/166, 172

[56] References Cited

U.S. PATENT DOCUMENTS

| | | | |
|---|---|---|---|
| 3,114,517 | 12/1963 | Brown | 244/62 |
| 3,174,705 | 3/1965 | Schiff et al. | 244/62 |
| 3,322,374 | 5/1967 | King, Jr. | 244/62 |
| 3,436,918 | 4/1969 | Brogan et al. | 60/202 |
| 3,542,316 | 11/1970 | Hart | 244/53 R |
| 3,818,700 | 6/1974 | Kantrowitz et al. | 244/53 R |
| 3,825,211 | 7/1974 | Minovitch | 244/62 |
| 3,891,160 | 6/1975 | Minovitch | 244/62 |
| 4,006,597 | 2/1977 | Dick | 60/721 |

FOREIGN PATENT DOCUMENTS 2212773 8/1989 United Kingdom ............ 244/53 R

OTHER PUBLICATIONS

Astronautics & Aeronautics, Kantrowitz, Propulsion to Orbit by Ground-Based Lasers, May 1972, pp. 74-76.

Primary Examiner—Charles T. Jordan
Assistant Examiner—Richard W. Wendtland
Attorney, Agent, or Firm—Christie, Parker & Hale

[57] ABSTRACT

An electromagnetic ramjet propulsion system is provided for accelerating high mass payloads through the upper atomsphere at orbital velocities. The propulsion system comprises a plurality of coplaner self-supporting superconducting dipole coils several hundred meters in diameter that is initially accelerated to high altitude and supersonic speed by magnetic repulsive forces generated by a plurality of superconducting field coils several kilometers in diameter embeded beneath the earth's surface. The ramjet is accelerated to orbital velocities by a multigigawatt microwave beam that is transmitted from the earth's surface. A reflecting grid of conducting wires is mounted inside the inner dipole which shock ionizes the low dentisy atmospheric gas passing through it. The frequency of the microwave beam is adjusted to produce electron cyclotron resonance with the free electrons passing through the magnetic field of the dipoles thereby accelerating them away from the dipoles by magnetic repulsive forces, taking the positively charged ions with them. The system becomes a giant hypervelocity ionospheric ramjet propelled by magnetic repulsive forces without any velocity limitations. By utilizing a plurality of microwave transmitters located along the ground track of the ramjet, it is possible to accelerate payloads of several thousand tons to orbit.

133 Claims, 14 Drawing Sheets

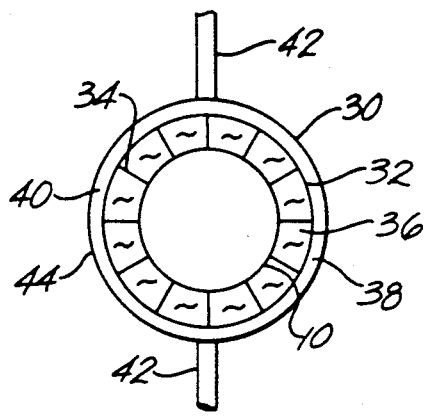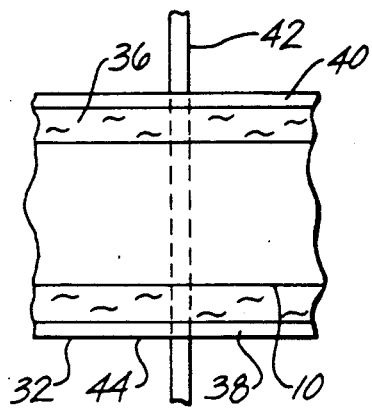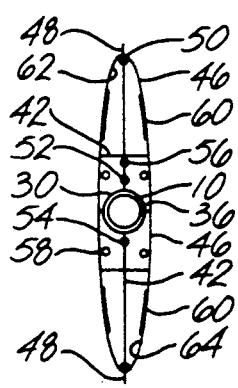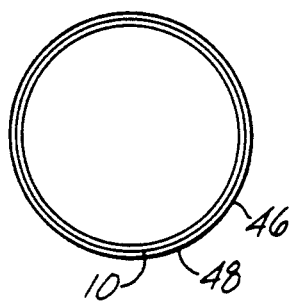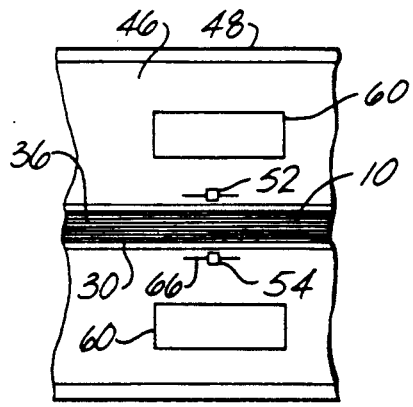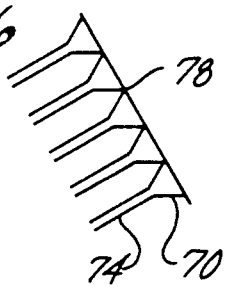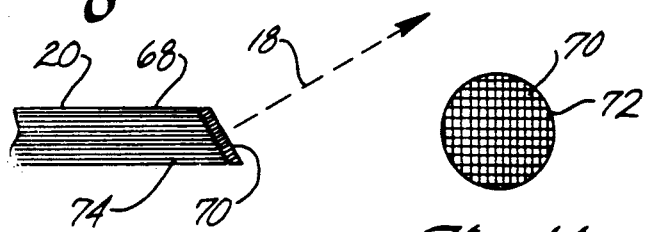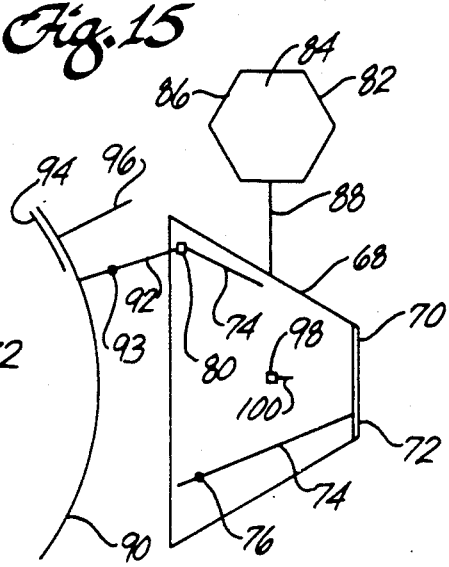

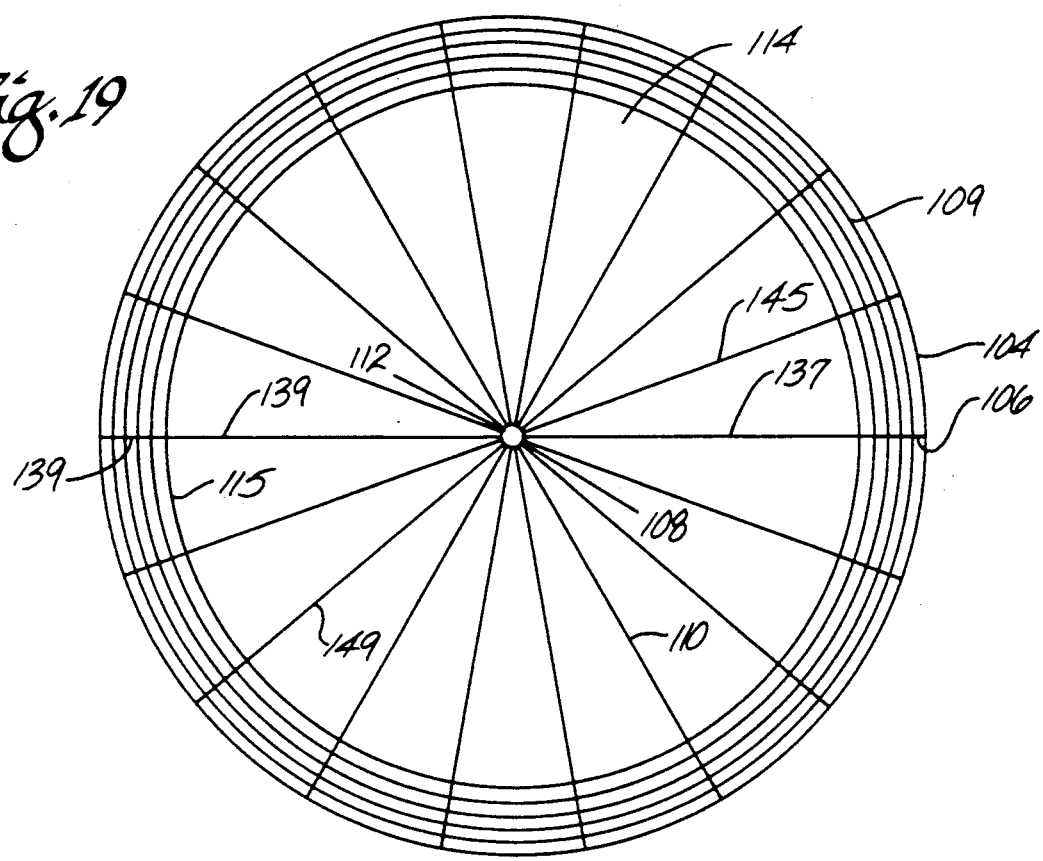
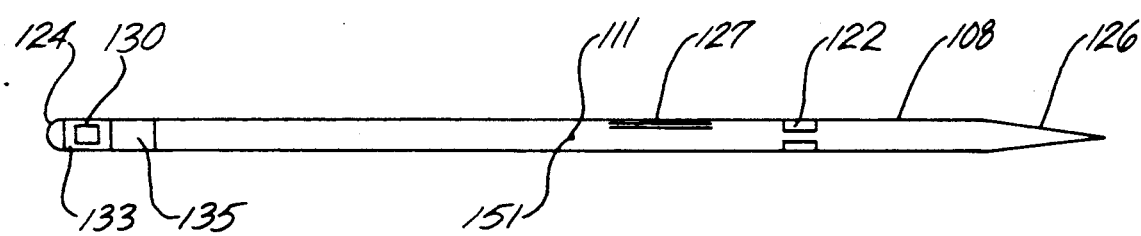
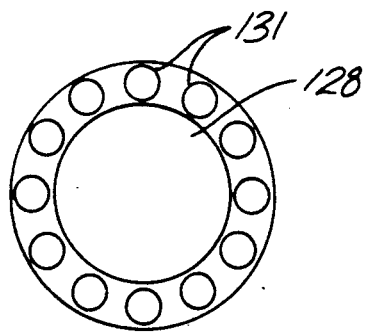

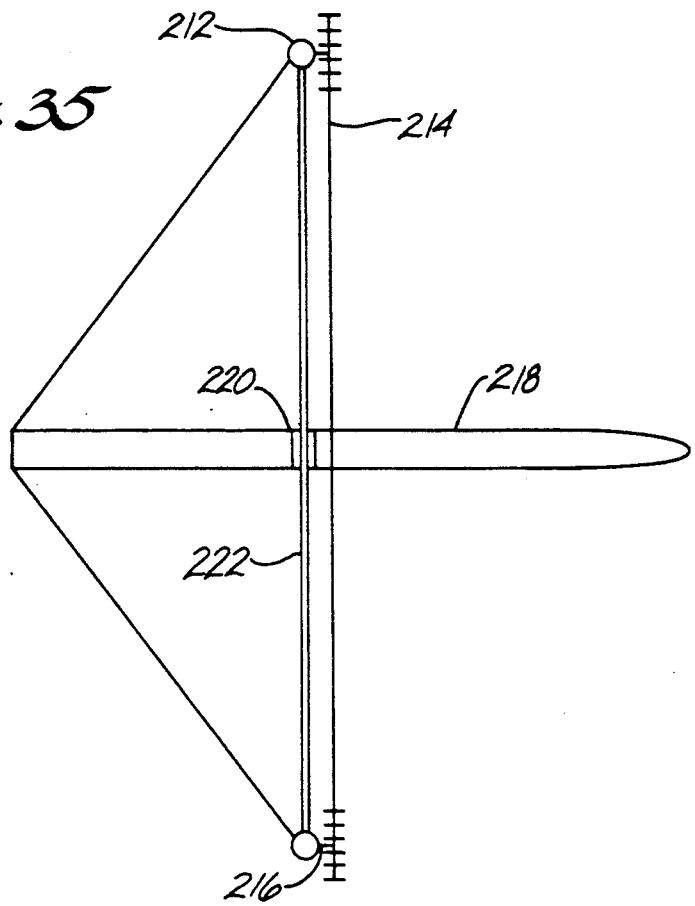
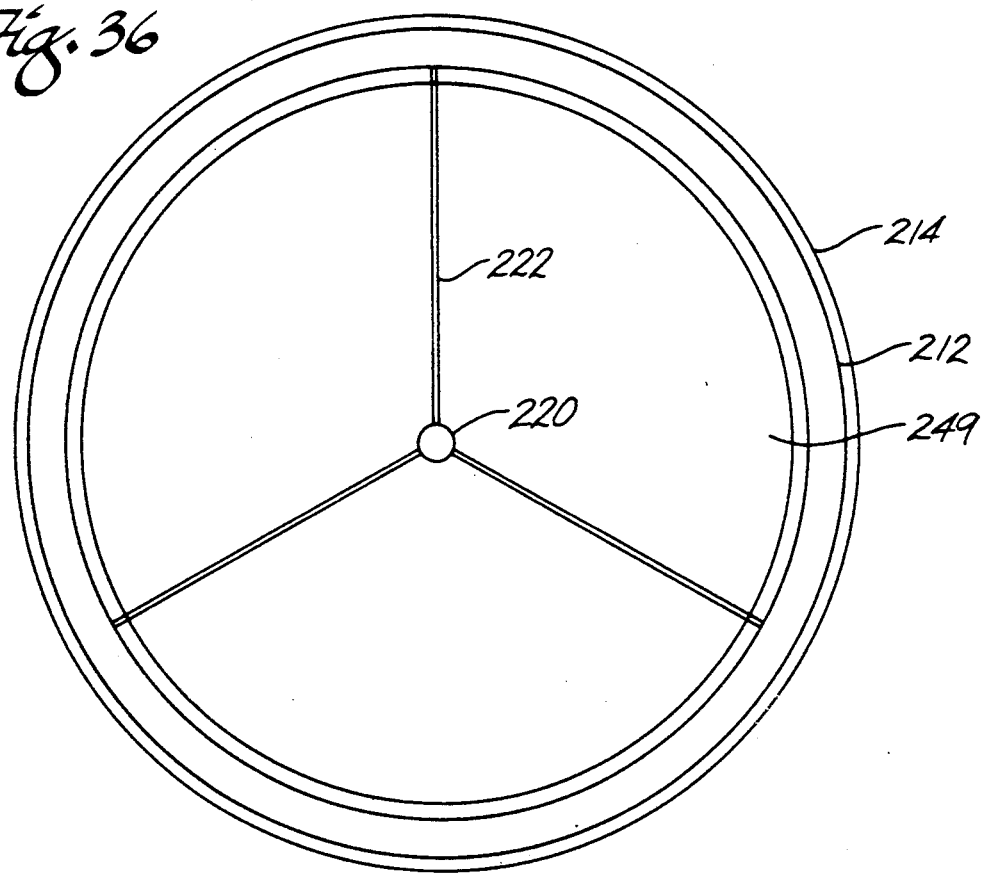

ELECTROMAGNETIC RAMJET

BACKGROUND

The problem of launching payloads into orbit from the earth's surface involves the development of a thrust generating mechanism powerful enough to lift a payload off the earth's surface and accelerate it to orbital velocities. In the prior art, this has been achieved with the development of high thrust rocket engines using the reaction principle. Unfortunately, rocket engines consume huge quantities of propellant that must be stored onboard the vehicle. Hence, in order to launch even relatively small payloads into orbit, the size of a rocket propelled launch vehicle must be enormous in order to contain all of the propellant. (The required propellant mass is over 100 times greater than the payload mass.)

The "scramjet" designed for the proposed ground-to-orbit aerospace plane, represents another type of propulsion system for accelerating payloads to high velocities. Basically, this engine is a ramjet in that it ingests air at some ingestion velocity (which is essentially equal to the engine's forward velocity through the atmosphere), sprays it with fuel which ignites forcing the expanding combustion gases to leave the engine with a velocity greater than the ingestion velocity. Since the ingestion velocity is very high, the ignition time must be very short. Only hydrogen fuel can be used in these scramjet engines because of the very short ignition time. Unfortunately, liquefied hydrogen has a very low density which requires fuel tanks five times larger than conventional fuel tanks (which must be thermally insulated since liquefied hydrogen is a very low temperature cryogenic fluid). This results in a high inert structural mass with a corresponding decrease in payload mass. See "Will the Aerospace Plane Work," *Technology Review*, January 1987, pp. 42–51 by S. W. Korthals-Altres. This problem is compounded by the fact that since the kinetic energy which the vehicle must develop in order to reach orbital velocity is so high ($4 \times 10^9$ Joules/kg) the amount of hydrogen fuel that must be carried by the vehicle to achieve orbital velocity is about 56% of the total initial vehicle mass, even assuming optimal combustion efficiency. See "From Earth To Orbit In A Single Stage," *Aerospace America*, August 1987, pp. 32–34, by R. A. Jones and C. D. Donaldson. Thus, there are inherent fundamental engineering problems with this propulsion concept that cannot be circumvented even if the scramjet propulsion system can be made to operate as envisioned at orbital velocity (which may be a physical impossibility). Moreover, another problem will be introduced involving a severe limitation on payload size because nearly all of the interior volume of the vehicle will have to be filled with liquefied hydrogen.

Since the scramjet propelled reusable aerospace plane is currently believed to represent the cheapest method for achieving orbit (with an estimated cost of $200/lb compared to $2,000/lb for the Space Shuttle) the prospects for commercial space travel by private individuals in the 21st century appear to be very remote. (For example, it would cost a 200 lb passenger without luggage $40,000 to be transported to orbit on a one-way flight with the scramjet propelled vehicle.)

By utilizing the concept of beamed energy transmission where a vehicle's propulsive energy is generated off the vehicle at some remote power generating plant and transmitted to it via microwave or laser beams, it is possible to construct a ramjet which does not require the vehicle to carry any fuel. A microwave propelled ramjet was proposed as early as 1959 by William Brown. (See his U.S. Pat. No. 3,083,528 entitled "Microwave Engines" filed May 12, 1959.) This microwave propelled ramjet concept was later developed by Schad and Moriarty to propel payloads from the earth's surface directly into orbit. (See "Microwave Rocket Concept," *International Astronautical Congress*, Vol. 16, Athens, 1965, pp. 175–199.) Unfortunately, the problem of designing a sufficiently large receiving antenna for capturing the beamed microwave power and focusing it into the ramjet engine required for long range power transmission rendered the concept impractical. Since the wavelength of optical radiation is much smaller than micro wave radiation, it is possible to achieve significantly greater power transmission distances using a laser beam as the energy transmitting medium. A laser propelled ramjet was invented in 1972 by Kantrowitz and Rose. (See U.S. Pat. No. 3,818,700 entitled "Ram Jet Powered By A Laser Beam".) However, all of these prior art beamed energy ramjet propulsion concepts generate propulsive thrust by using the incoming beam energy to heat the ingested air to high temperatures so that it can be expelled through a conventional exhaust system with a velocity greater than the ingestion velocity. Thus, the incoming beam energy is not converted directly into propulsive thrust. These systems require the intermediate step of heating. Since all thermal rocket engines require a relatively small heating region, there is a practical upper limit on the amount of beam power that can be converted into propulsive thrust in thermal rocket engines that is set by power density limitations and by the thermal limitations of the surrounding structure. This intermediate heating step also results in a considerable reduction of efficiency. (More than 50% of the beam energy is wasted by radiative heat losses.) Since laser generators are not very efficient to begin with, prior art beamed power propulsion systems using laser beams will consume large amounts of input energy in the conversion to vehicle kinetic energy.

In theory, the most efficient method for propelling payloads into orbit is by means of an electromagnetic accelerator because the cost essentially reduces to the cost of generating an amount of electrical energy equal to the kinetic and potential energy of the total mass that is accelerated to orbit. For example, if the cost of generating electrical energy is 10¢/KW-hr, this cost is 90¢/kg or 41¢/lb for a 200 km high circular orbit. This is 5,000 times cheaper than the U.S. Space Shuttle and about 500 times cheaper than the proposed aerospace plane. Although there are several different types of prior art electromagnetic accelerators (which are also called mass drivers) that have been designed to accelerate bodies to high velocities (i.e., orbital velocities) from the earth's surface, they all have one common and very undesirable characteristic: they all require an evacuated launch tube through which the payload is accelerated. Therefore, unless an evacuated tube of several hundred kilometers is provided, the acceleration of prior art electromagnetic ground to orbit launchers are inherently high, and the mass and physical dimensions of the payload are too small to be of any significant practical value. See "Electromagnetic Launchers," *IEEE Transactions On Magnetics*, Vol. MAG-16, No. 5, Sept. 1980, pp. 719–721 by H. Kolm et al.

Large objects, such as completely assembled space based interplanetary transfer vehicles (ITVs) with diameters exceeding 25 m and lengths exceeding 100 m would be completely impossible to accelerate to orbit from the earth's surface by any prior art electromagnetic accelerator. In fact, completely assembled payloads with these dimensions could not be accelerated into orbit by any prior art ground to orbit transportation system (or any such system proposed for the future) because they would simply be too large to fit inside any launch vehicle. It is assumed without question and taken for granted that large objects designed for operating in earth orbit will have to be transported there piece by piece, in relatively small sections, and assembled in orbit.

The high cost and payload limitations of prior art launch vehicles is a result of the basic thrust generating principles used for their propulsion. For all practical purposes, these prior art propulsion principles are believed to be essentially unchangeable because they involve basic laws of physics. However, the discovery of a fundamentally new physical phenomenon or principle be applied to develop a completely new thrust generating propulsion concept. The electromagnetic ramjet propulsion concept disclosed herein is based upon one such discovery—superconducting materials with high critical temperatures. It will be shown that this propulsion concept will enable payloads to be orbited with mass and physical dimensions far beyond that which were previously believed to be possible. Moreover, since this propulsion concept is basically electromagnetic, it also enables payloads to be transported to orbit with minimum cost. The vacuum environment usually required for electromagnetic accelerators is provided by operating the ramjet in the ionosphere at very high altitude—instead of on the earth's surface inside a vacuum tube.

BRIEF SUMMARY OF THE INVENTION

With the foregoing in mind, the present invention provides an ultra high thrust electromagnetic ramjet propulsion system for accelerating high mass payloads with very large dimensions from the earth's surface directly into orbit. The propulsion system comprises a plurality of coplanar self-supporting superconducting dipole coils several hundred meters in diameter with very high aspect ratios that is initially accelerated to supersonic speed by magnetic repulsive forces generated by a plurality of giant superconducting field coils several kilometers in diameter mounted coaxially in circular underground tunnels located in a remote region. All of the superconducting coils are constructed with superconducting material having a critical temperature above liquid nitrogen thereby eliminating the need for expensive liquefied helium cryogenic refrigeration systems. The electromagnetic ramjet, along with the attached payload, is launched vertically and initially accelerated along a line of magnetic induction generated by the field coils.

The propulsion coils of the ramjet are mounted inside circular hypersonic wing-like airfoils equipped with movable aerodynamic control surfaces for guidance. The surfaces are moved by a plurality of electric servo motors controlled by a high accuracy inertial guidance system. The propulsion system can also be controlled from the ground, or from an orbiting satellite via radio signals. The individual superconducting dipole coils and their surrounding circular airfoils are maintained in a rigid concentric spaced-apart relationship by a plurality of radial airfoils that are mounted between adjacent circular airfoils. This system of circular airfoils containing the superconducting dipole propulsion coils and the radial airfoils mounted between them comprise the electromagnetic ramjet propulsion system. It is a self-contained automated reusable launch vehicle which is able to traverse through the atmosphere in controlled flight and land back at the launch site.

The payload is mounted inside a long cylindrical central body (fuselage) extending along the perpendicular longitudinal axis of the dipoles that is connected to the ramjet by a plurality of detachable cables. A reflecting grid of conducting wires is mounted across the inner dipole such that after the system is initially accelerated to supersonic speed at high altitude by the field coils, the low density atmospheric gas passing through the inner dipole is shock ionized via collision processes.

After the electromagnetic ramjet is launched from the earth's surface and accelerated to a relatively high initial altitude by the field coils, it is accelerated to orbital velocity by means of an ultra high power microwave beam. The frequency of the microwave beam is adjusted to produce electron cyclotron resonance with free electrons of the shock ionized gas moving away from the magnetic field of the dipoles. When the free electrons move into this resonance region they are rapidly accelerated in circular transverse paths that are perpendicular to the lines of magnetic induction of the dipoles. The electrons are thus pumped into very high energy cyclotron orbits by the microwave beam. A strong coupling between the electrons and the microwave beam is created resulting in the absorption of essentially all of the beam energy by the electrons. But this absorption is not thermalization. Almost all of this energy is pumped into extremely high energy electron cyclotron orbits. The high energy orbiting electrons become strong magnetic dipoles by virtue of their circular motion. Their magnetic moments are essentially aligned antiparallel to the coil's magnetic field. The magnetic field of the dipole coils decreases with increasing distance from its center giving rise to a magnetic gradient. This gradient is felt by the electron dipoles as a strong magnetic repulsive force which rapidly accelerates them away from the dipole coils. Although the remaining positively charged ions are not affected by the microwave beam, or by the magnetic field, the resulting charge separation accelerates them after the receding electrons. This generates a retarding force on the electrons. However, the electrons keep accelerating ahead of the ions propelled by magnetic repulsive forces. A strong magnetic repulsive recoil force is then exerted on the dipole coils propelling them forward. Basically, the orbiting electrons, in their aggregate, create a huge magnetic field behind the ramjet propelling it forward by magnetic repulsive forces. The process is purely electromagnetic so that in principle, the microwave beam can be converted into propulsive thrust with an efficiency approaching 100%. The dipole coils become a giant electromagnetic ionospheric ramjet several hundred meters in diameter that is propelled by enormous magnetic repulsive forces.

By constructing the microwave transmitter on the earth's surface as a close-packed, electronically steered, phased array with several million active elements each radiating microwave power on the order of one megawatt, it is possible to obtain CW beam powers of thousands of gigawatts for accelerating extremely large payloads of several thousand tons. The DC electric current used to operate the microwave transmitter can be obtained from the field coils which are utilized as a giant inductive superconducting energy storage system. By employing several microwave transmitters located along a prescribed ground track, the acceleration process can be extended over distances of several thousand kilometers thereby reducing the peak acceleration loads to relatively low levels that can be easily tolerated by human passengers. The propulsion system is so powerful that it will be possible to transfer huge payloads of thousands of tons directly from the earth's surface to lunar orbit.

Since the magnetic field strength directly over the field coils at orbital altitudes is inversely proportional to the cube of the altitude, the field at orbital altitudes directly over the coils is negligibly small (smaller than the earth's natural magnetic field) and decreases very rapidly with increasing altitude. Likewise, the magnetic field generated by the coils on the earth's surface in a region surrounding the outer perimeter of the coils (in the plane of the coils) also decreases very rapidly with distance. Thus, the magnetic fields generated by the field coils resulting from fundamental principles of electromagnetism are ideally suited for the propulsion concept proposed herein because these fields are sufficiently strong locally to generate enormous propulsive thrust, but decrease very rapidly with increasing distance so as to not affect the surrounding region at any significant distance.

A system of annular arrays of photovoltaic solar cells are mounted around the outer periphery of the field coils for generating electrical energy. This electrical energy is used for initially charging up the superconducting field coils and maintaining them with a desired inductive energy. The amount of inductive energy in the fully charged field coils is several orders of magnitude greater than the amount of energy used to launch a payload. Thus, the system will enable multiple launches to take place nearly simultaneously with massive payloads without any significant decrease in the magnetic field. By constructing large solar arrays with diameters of many kilometers, the system will generate significantly more electrical energy than is used for launching payloads. Thus, the cost of the electrical energy used in launching payloads is zero and the excess electrical energy generated by the arrays can be sold to utility companies for generating income revenue that is significantly greater than the total cost of operating the system.

Since the solar arrays can only generate electric power during daylight hours, the field coils are also utilized for accumulating a portion of the electrical energy generated during daylight hours so that it can be released into a power distribution system to various utility companies during the non-daylight hours. Thus, the field coils also serve as a giant load-leveling system that allows electric power to be fed info the distribution system at a nearly uniform rate 24 hours per day.

A large fleet of automated electromagnetic ramjet accelerators are provided operating from a large central launching/landing region using the same field coils and microwave transmitters ranging in size from a few dozen meters in diameter for accelerating small payloads of a few thousand kilograms to a diameter exceeding one kilometer for launching payloads exceeding $5 \times 10^8$ kg. The ground-to-orbit transportation system is envisioned as a vast circular complex with an outer diameter exceeding 80 km and an inner launching/landing region 10 km in diameter for providing very low cost transportation to orbit. It is also envisioned as a giant electric power generating plant.

DRAWINGS

These and other advantages and features of the invention will be apparent from the disclosure, which includes the specification with the foregoing and ongoing description, the claims, and the accompanying drawings wherein:

FIG. 8 is a schematic transverse cross section of a superconducting propulsion dipole mounted inside a tubular cryogenic Dewar system that is mounted inside a ramjet's circular airfoil illustrating the design and construction;

FIG. 9 is a schematic longitudinal cross section further illustrating the design and construction of a cryogenic Dewar system for a superconducting dipole coil that is mounted inside a circular airfoil of an electromagnetic ramjet;

FIG. 10 is an enlarged transverse cross section through the minor axis a propulsion coil illustrating the design and construction of a circular hypersonic wing-like airfoil mounted around the propulsion coil with movable aerodynamic control surfaces;

FIG. 11 is a perpendicular cross section of FIG. 10;

FIG. 12 is a longitudinal cross section of a portion of the airfoil shown in FIG. 10 further illustrating its design and construction;

FIG. 13 is a schematic longitudinal cross section of a giant multigigawatt phased array microwave transmitter;

FIG. 14 is a schematic transverse cross section of FIG. 13 further illustrating the design and construction of a phased array microwave transmitter FIG. 15 is a schematic plan view of a giant multigigawatt phased array microwave transmitter further illustrating its design and construction;

FIG. 16 is an enlarged longitudinal cross section of a portion of the phased array microwave transmitter illustrating the design and construction of the individual beam launching horns and the connecting waveguides;

FIG. 19 is a transverse view of the multiple-coil electromagnetic ramjet shown in FIG. 18;

FIG. 20 is an enlarged schematic longitudinal cross section of the electromagnetic ramjet's rotatable central body which contains the payload and which is accelerated to orbital velocity by the ramjet;

FIG. 21 is an enlarged schematic transverse cross section through the rear of a central body illustrating its high thrust propulsion system;

Figure 29:
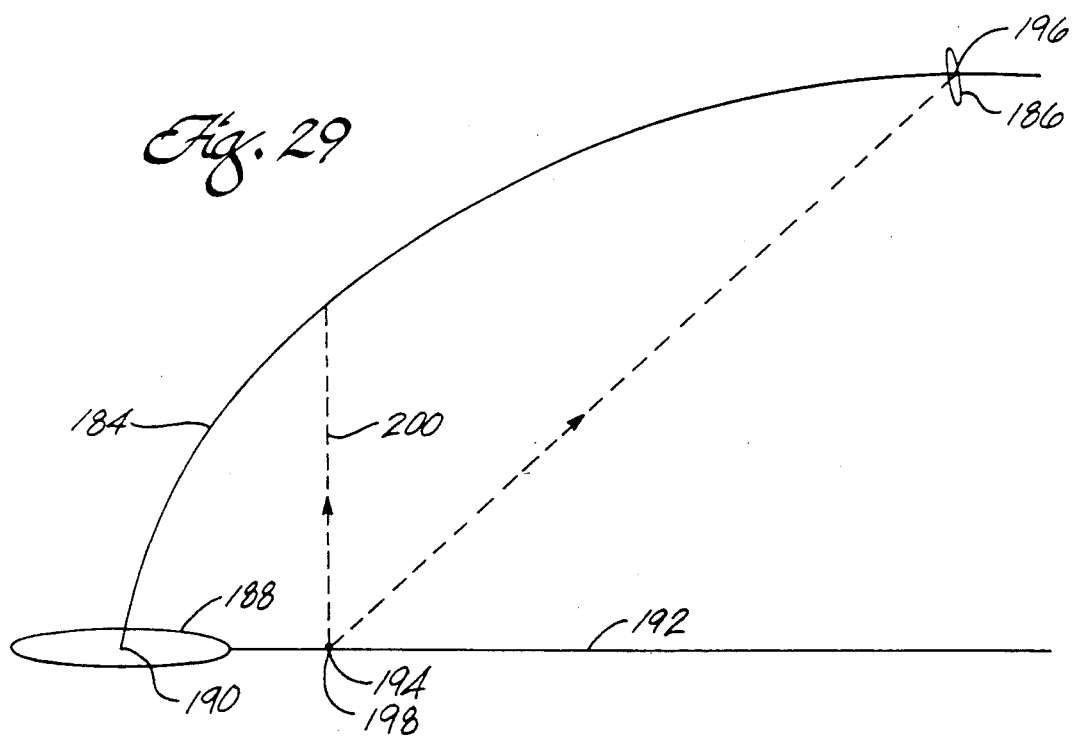
Figure 30:
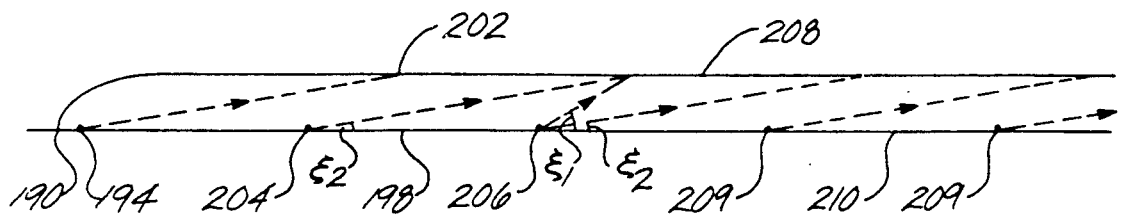
Figure 31:
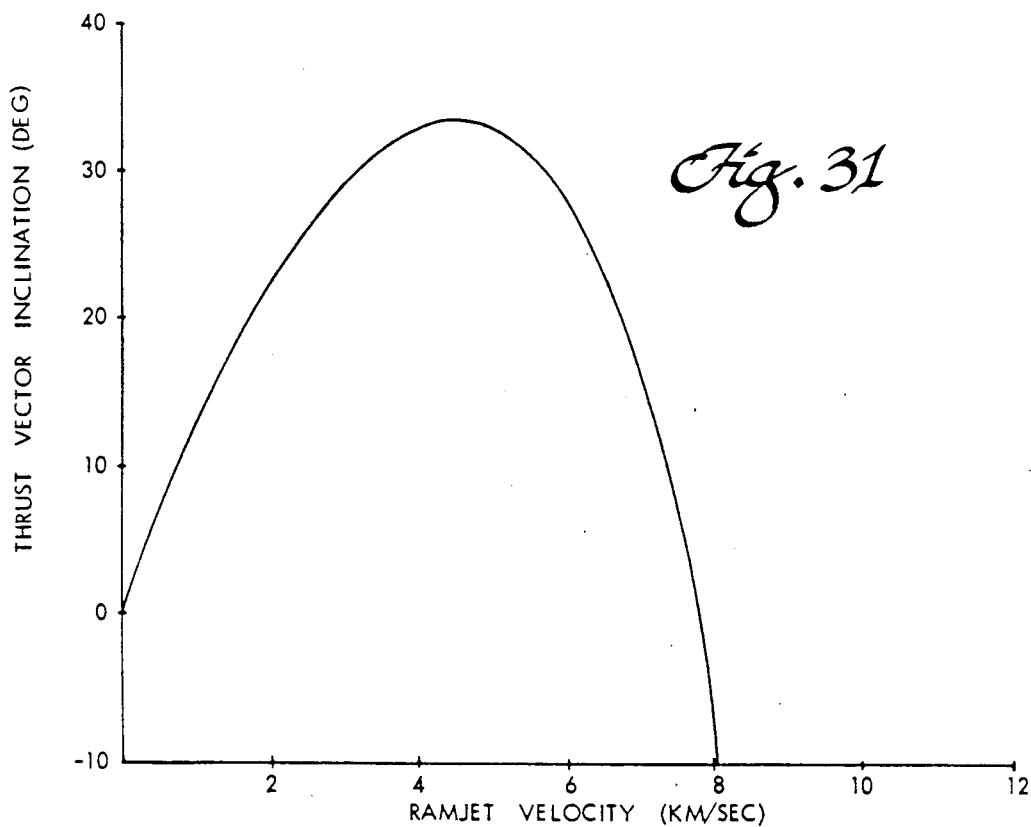
Figure 32:
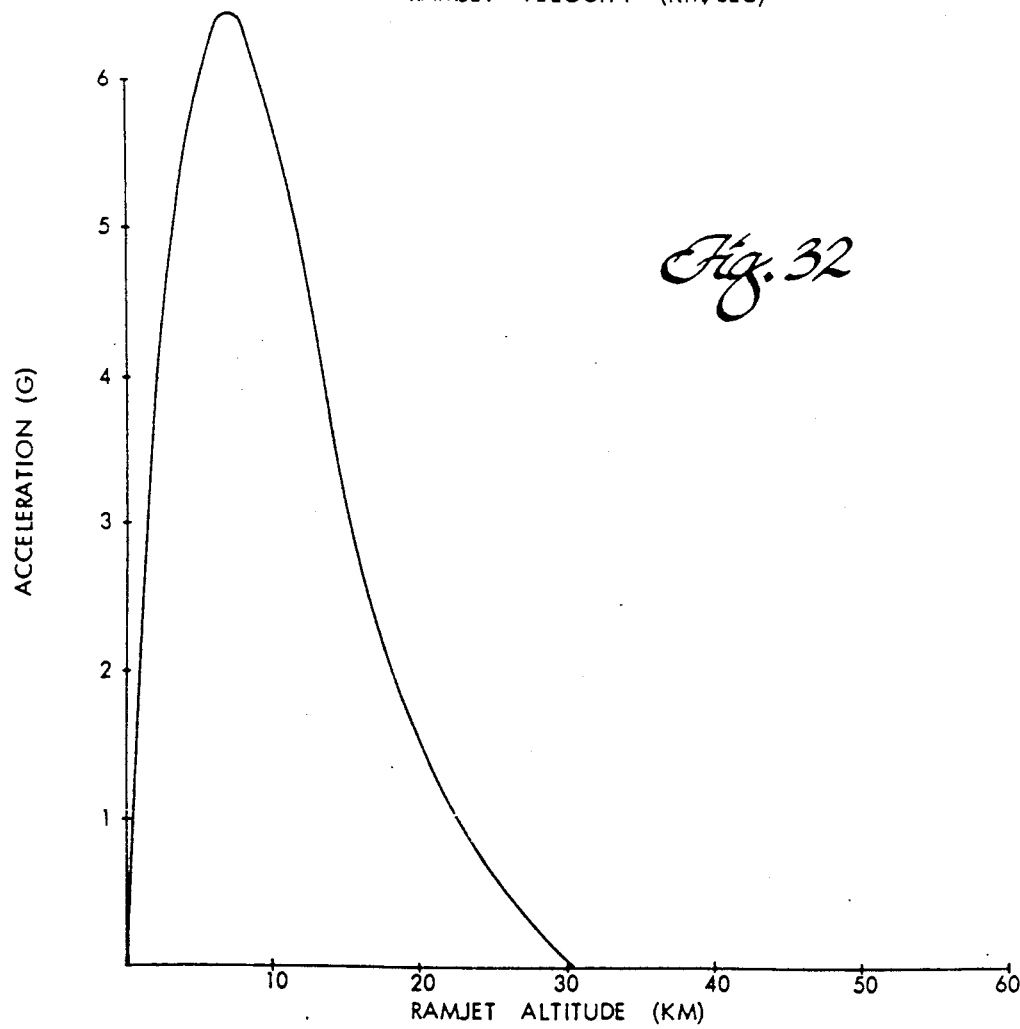
Figure 33:
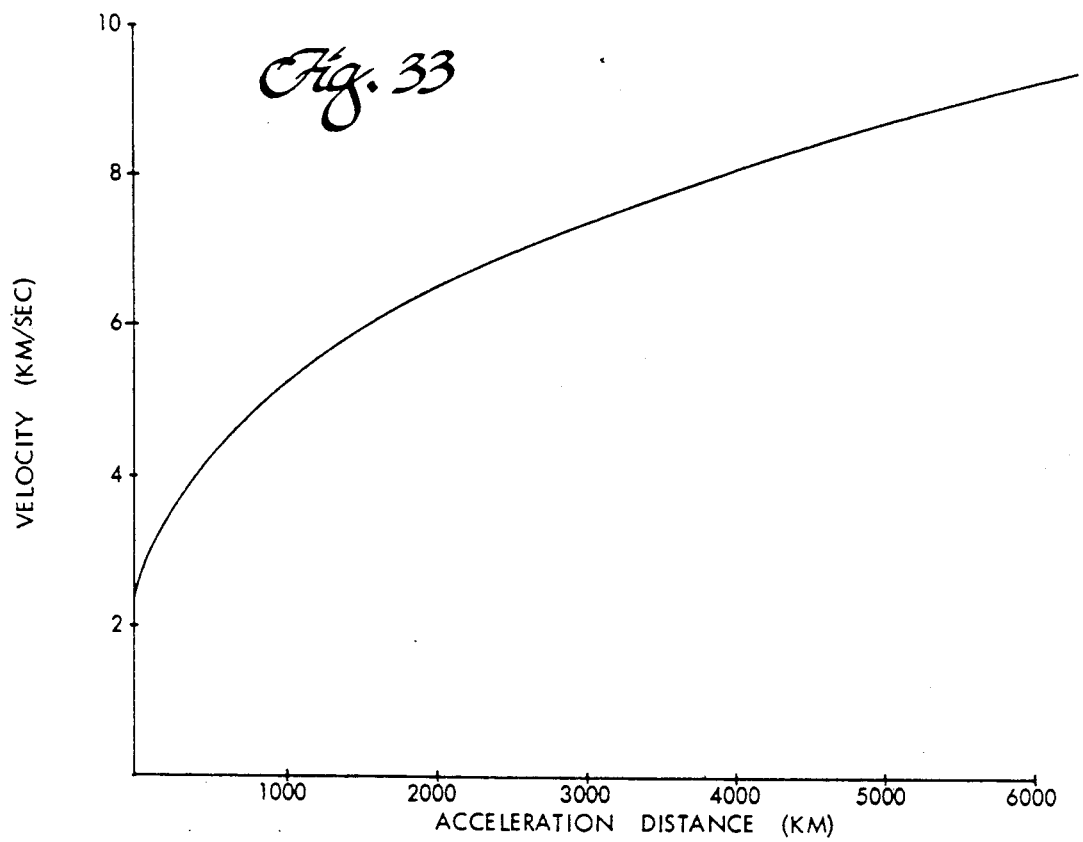
Figure 34:
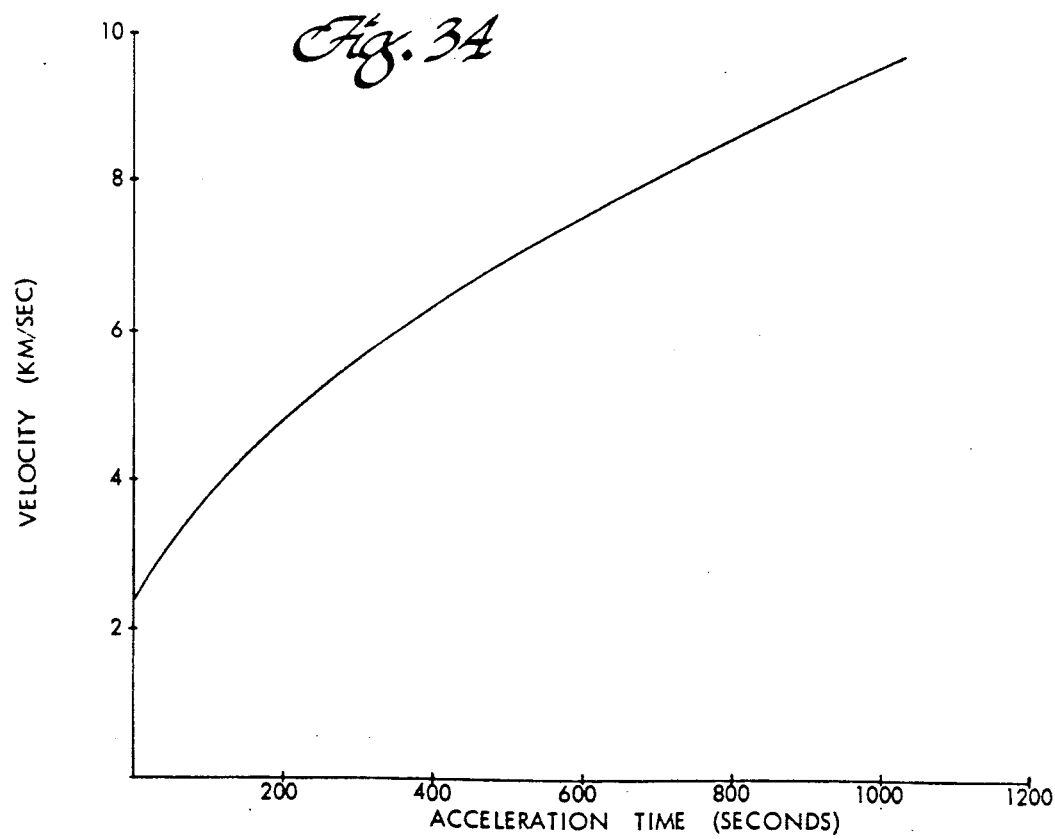
Figure 37:
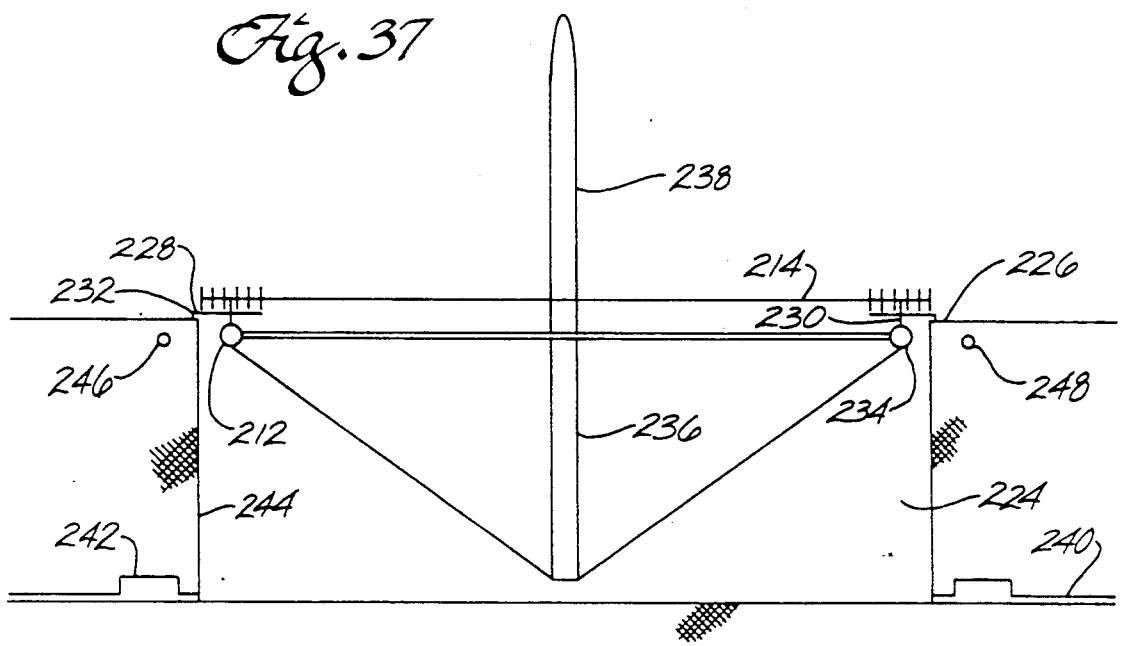
Figure 38:
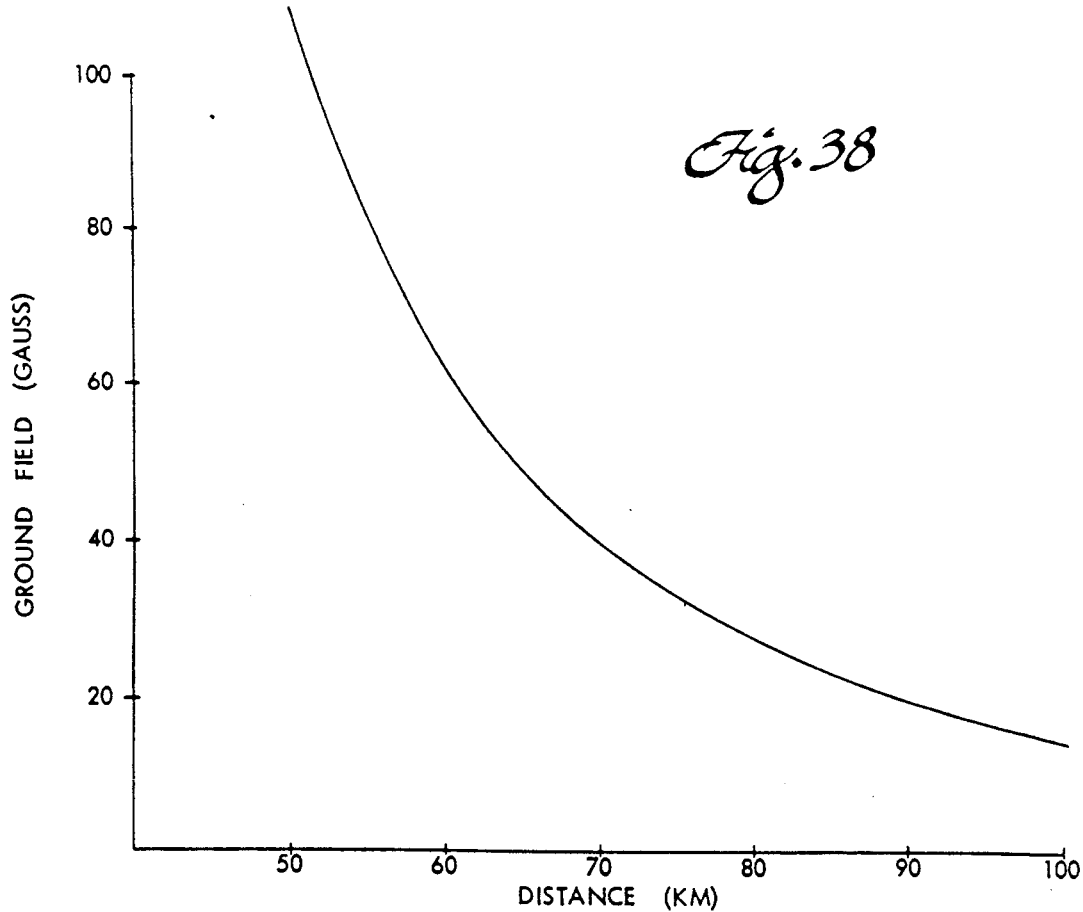
Figure 39:
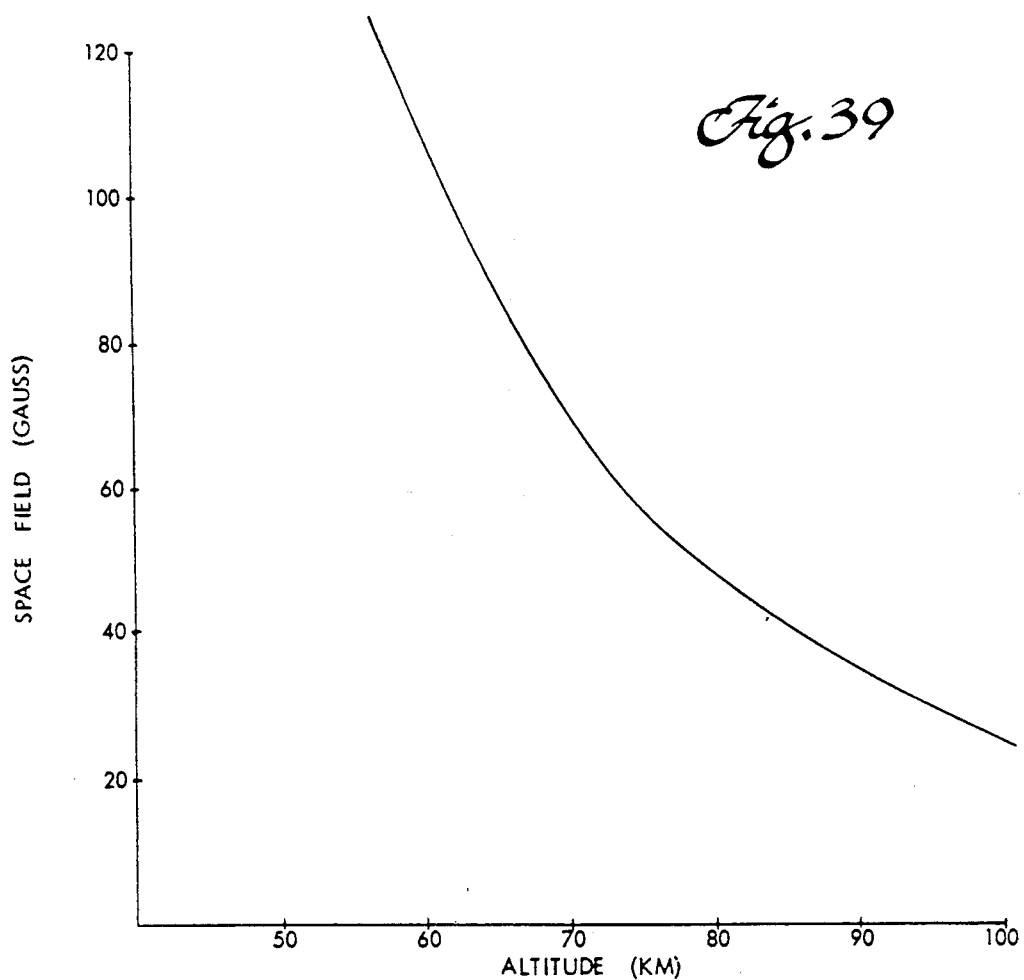
Figure 40:
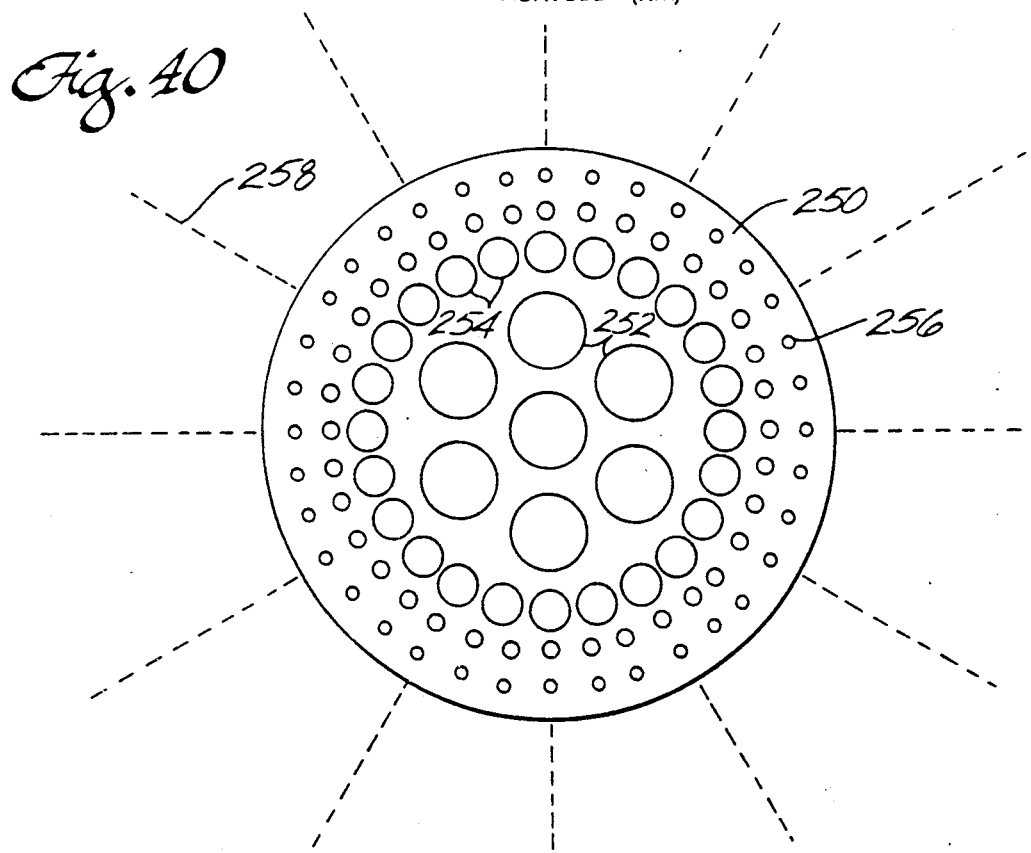

FIG. 29 describes the initial ascent trajectory of an electromagnetic ramjet after a vertical launch from the center of the field coils;

FIG. 30 shows the electromagnetic ramjet being sequentially accelerated along a 100 km high circular trajectory by a series of microwave transmitters positioned at 400 km intervals along the trajectory's ground track;

FIG. 31 is a graph of an electromagnetic ramjet's angle of inclination relative to its flight path versus velocity while accelerating a mass of 28,000,000 kg with a 1,200 GW microwave beam;

FIG. 32 is a graph of acceleration versus altitude of an electromagnetic ramjet's initial ascent trajectory to an altitude of 60 km propelled by magnetic repulsive forces generated by the field coils;

FIG. 33 is a graph of velocity versus acceleration distance for an electromagnetic ramjet accelerating a mass of 28,000,000 kg with a 1,200 GW microwave beam;

FIG. 34 is a graph of velocity versus time for an electromagnetic ramjet accelerating a mass of 28,000,000 kg with a 1,200 GW microwave beam;

FIG. 35 is a schematic longitudinal cross section of a fully assembled and manned 660 m diameter 25,000 ton toroidal space station attached to a 700 diameter electromagnetic ramjet that lifts the space station off the earth's surface and accelerates it to orbital velocity;

FIG. 36 is a transverse cross section of FIG. 35;

FIG. 37 is a schematic longitudinal cross section illustrating how the space station shown in FIG. 35 is launched from the earth's surface by the electromagnetic ramjet and initially accelerated to an altitude of 60 km by magnetic repulsive forces generated by the surrounding field coils;

FIG. 38 is a graph showing the magnetic field strength on the earth's surface generated by the field coils at various distances from the center;

FIG. 39 is a graph showing the magnetic field strength in space directly above the center of the field coils at various altitudes; and FIG. 40 is a schematic plan view of the central launching/landing complex inside the inner field coil with a plurality of individual circular launching/landing terminals for accommodating various electromagnetic ramjets with different diameters.

DESCRIPTION OF THE PREFERRED EMBODIMENT

The ramjet propulsion system disclosed herein is radically different from prior art ramjet propulsion systems in that it does not involve any thermodynamic processes and operates at very high altitudes. It uses electromagnetic energy to generate propulsive thrust instead of chemical energy obtained by burning fuel. Moreover, since this electromagnetic energy is converted directly into propulsive thrust without any intermediate thermalization stage, the input electromagnetic energy is converted into kinetic energy with nearly 100% efficiency. Since the ramjet operates in the ionosphere, aerodynamic drag is essentially zero. The electromagnetic energy is generated at a remote power generating plant and transmitted to the vehicle by a microwave beam. Consequently, it does not have any energy limitations. Since it does not have to accelerate any dead inertial mass such as an energy generating source or fuel load, it is capable of very high performance. The thrust generating mechanism involves converting the microwave power directly into magnetic repulsive forces generated by very low density atmospheric gas passing through the ramjet at high velocity. Consequently, unlike all prior art ramjet propulsion systems designed for operation within the earth's atmosphere, this electromagnetic ramjet propulsion system has no inherent velocity limitations. It is basically a giant electromagnetic accelerator that does not require a vacuum tube. Although it does require a partial vacuum environment, this environment is not provided artificially within a tube. Rather, it is obtained by operating the system at very high altitudes. Therefore, this accelerator has no size or payload mass limitations.

The underlying propulsion principles upon which the invention is based are made possible by the recent discoveries of superconducting material with critical temperatures, critical fields, and current densities significantly greater than previously believed possible. This fundamentally important technological breakthrough enables current carrying superconductors to be operated at liquid nitrogen temperature instead of much colder liquid helium temperature. Since liquid hydrogen is colder than liquid nitrogen and can be easily stored and maintained aboard space vehicles, it is possible to maintain extremely large superconducting coils in orbit that are capable of generating very large and intense magnetic fields indefinitely.

Figure 1:
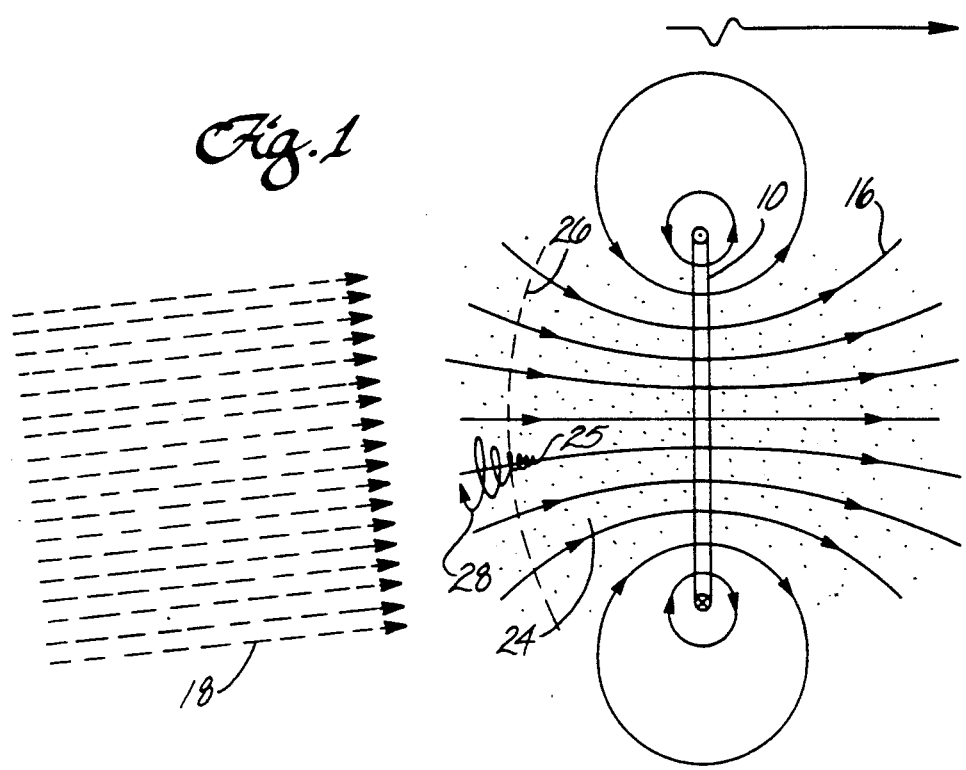
FIG. 1 is a schematic longitudinal cross section of an electromagnetic ramjet having a single superconducting dipole propulsion coil illustrating its basic operating principles.
Figure 2:
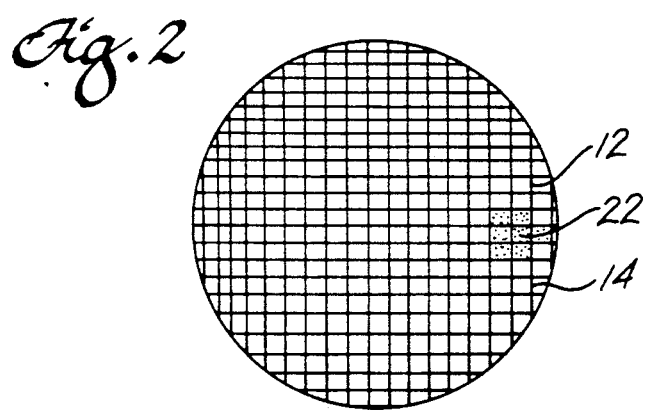
FIG. 2 is a schematic transverse cross section of a single coil electromagnetic ramjet illustrating its basic design features.

FIGS. 1 and 2 are schematic longitudinal and transverse cross sections of an electromagnetic ramjet with a single dipole coil illustrating its basic design and operating principles. As is illustrated in these figures, the ramjet is extremely simple and comprises a superconducting self-supporting dipole coil 10 several hundred meters in diameter. The dipole 10 moves through the rarified upper atmosphere at supersonic speed such that the plane of the dipole is nearly perpendicular to its velocity vector. A grid 12 of conducting wires 14 is mounted as a screen across the inside periphery of the dipole. This screen has two functions. It provides a means for ionizing the low density atmospheric gas passing through it at supersonic speed by generating small shock waves via collision processes; and it also serves as a microwave reflector which prevents the microwave beam from passing through the dipole. The wires 14 are mounted inside small stress bearing tubular filaments of fused silica glass (or some other suitable high temperature material) as thermal protection for the wire screen.

Figure 3:
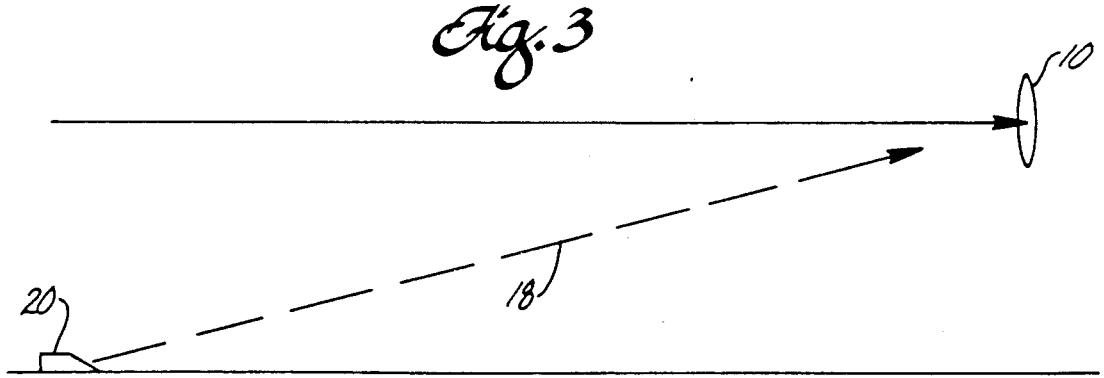
FIG. 3 is a schematic longitudinal perspective view illustrating a microwave transmitter on the earth's surface accelerating an electromagnetic ramjet by a high power microwave beam.

As is shown in FIG. 1, the superconducting dipole coil 10 is charged with electric current which generates a very large magnetic field 16. An ultra high power microwave beam 18, is transmitted to the dipole 10 into the magnetic field 16 from a ground based transmitter 20 located several hundred kilometers directly behind the dipole and on its ground track, FIG. 3. (In some embodiments, the microwave transmitter may be located in orbit.) The microwave beam 18 is plane polarized such that its electric field vector is perpendicular to the dipole's central magnetic field. When the low density atmospheric gas 22 passes through the screen 12 inside the dipole coil 10, a plurality of small shock waves are generated behind the screen 12. This system of multiple shock waves intersect a short distance behind the screen 12 and forms a low density cloud of ionized gas 24 moving away from the dipole 10 with a velocity approximately equal to the dipole's forward velocity through the atmosphere (i.e., the ramjet's intake velocity ) In order for the ramjet to generate forward propulsive thrust, the ionized gas cloud 24 must be accelerated away from the dipole with a relative velocity significantly greater than the intake velocity. This acceleration will be accomplished by the principle of electron cyclotron resonance. The electromagnetic acceleration mechanics of this principle can be understood by referring to FIG. 1.

The frequency of the microwave beam 18 is adjusted to produce electron cyclotron resonance with the free electrons 25 passing into a region 26 of the magnetic field of the dipole 10 located several meters behind the shock screen 12. This resonance frequence is given by the equation $$f = (B/2\pi)(e/m) \quad (1)$$

where the term $e/m$ denotes the charge to mass ratio of the electron which is $1.7592 \times 10^{11}$ coloumb per kg and where B denotes the field strength. When the free electrons 25 of the ionized gas 24 move into this region 26 they are rapidly accelerated in circular transverse paths 28 that are perpendicular to the magnetic field lines of induction 16. The free electrons are thus pumped into very high energy cyclotron orbits by the transverse electric field vector of the microwave beam that is oscillating at a frequency f. A strong coupling between the low density plasma cloud and the microwave beam is created resulting in the absorption of essentially all of the beam energy by the plasma cloud 24. But this absorption is not thermalization. Most of the energy is pumped into extremely high energy electron cyclotron orbits. Any gas passing through the dipole screen 12 that remains unionized, is ionized when it enters the resonance region 26.

The high energy orbiting electrons become strong magnetic dipoles by virtue of their circular motion. However, because of "Lenz's Law", their magnetic moments are aligned anti-parallel with the magnetic field. The magnetic field strength decreases with increasing distance from the dipole 10 giving rise to a strong magnetic gradient $\nabla B$. This gradient is felt by the electron dipoles j as a magnetic repulsive force which rapidly accelerates them away from the dipole 10. Although the remaining positively charged ions are not affected by the magnetic gradient $\nabla B$, the resulting charge separation accelerates them after the accelerating electrons. A magnetic repulsive recoil effect is then exerted on the dipole coil 10 thereby creating a propulsive reaction force. Eventually, the orbital energies of the electrons decay to relatively low levels thus converting their kinetic energy from transverse circular motion to directed linear motion. Basically, the orbiting electrons, in their aggregate, create a huge magnetic field behind the dipole coil 10 propelling the coil forward by magnetic repulsive forces. The inertia of the positively charged ions enables the repulsive forces generated on the dipole coil 10 to be very strong. With this underlying accelerating principle, it is possible to convert essentially 100% of the microwave beam power directly into magnetic propulsive thrust that is exerted on the superconducting dipole coil 10 by the accelerating gas cloud 24.

Figure 4:
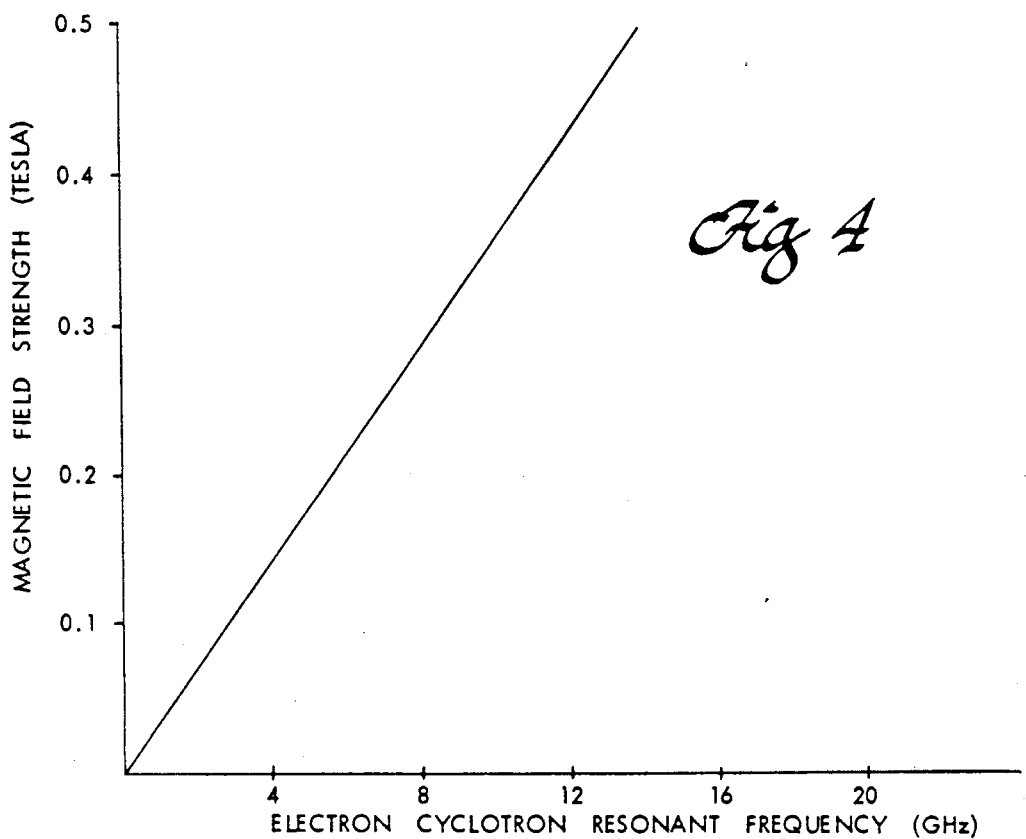
FIG. 4 is a graph of magnetic field strength B versus the electron cyclotron resonant frequency of a microwave beam propelling an electromagnetic ramjet.

FIG. 4 is a graph of magnetic field strength B versus the electron cyclotron resonant frequency f of a microwave beam propelling an electromagnetic ramjet given by equation (1).

Since the superconducting dipole coil which represents the ramjet is several hundred meters in diameter, the total mass flow rate of low density atmospheric gas passing through the coil is fairly high. Since the diameter of the microwave beam is equal to the diameter of the dipole coil, the beam power can reach levels of thousands of gigawatts. Consequently, this high altitude electromagnetic ramjet concept can generate propulsive thrust far beyond any prior art ramjet, rocket engine or any other propulsion system.

The technique of accelerating a low density plasma to high velocities by the principle of electron cyclotron resonance using microwave power as the energy source is usually applied in high energy physics laboratories concerned with the investigation of nuclear processes. The principle has also been studied as a means for accelerating and expelling propellant stored onboard a space vehicle for generating small amounts of propulsive thrust the microwave power is only on the order of a few kilowatts and generated onboard the vehicle. (See the article "Cyclotron Resonance Thruster Design Techniques," *AIAA Journal*, Vol. 4, No. 5, May 1966, pp. 835-840.) However, the principle of electron cyclotron resonance has never been considered as a means for accelerating atmospheric gas passing outside a vehicle in the form of a ramjet using microwave power transmitted to the vehicle from a remote power generating station.

Figure 5:
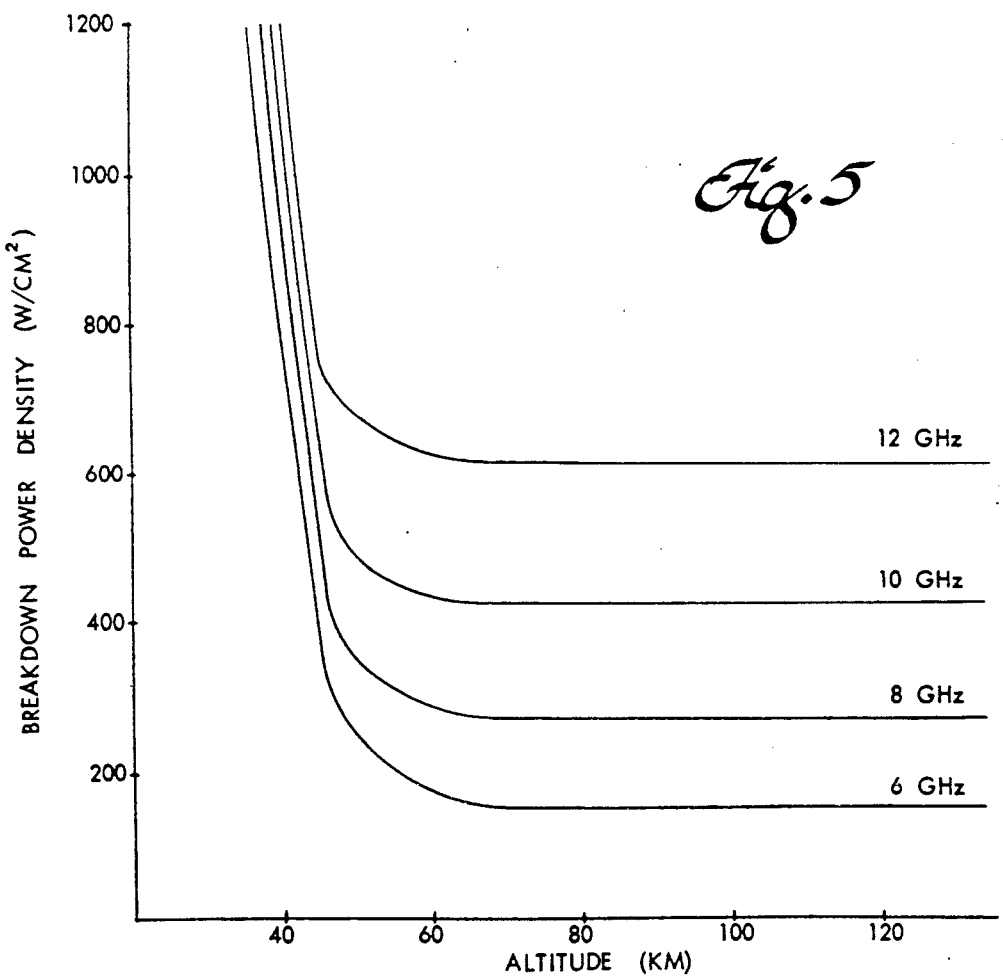
FIG. 5 is a parametric system of graphs illustrating the atmospheric breakdown power density for a microwave beam versus ambient atmospheric pressure and corresponding altitude for various frequencies.

The propulsive thrust F generated by the electromagnetic ramjet can be expressed as $$F = \frac{P}{V} \qquad (2)$$

where P is equal to the beam power and V is equal to the dipole velocity. Assuming that the diameter of the microwave beam is equal to the diameter of the propulsion dipole 10, the beam power P can be expressed as $$P = \pi R^2 p \qquad (3)$$

where R is equal to the dipole radius and $p$ is equal to the power density. The maximum power density $p_{max}$ of the microwave beam that can be transmitted to the dipole is limited by the breakdown limitations of the atmosphere. This maximum power density can be expressed as $$p_{max} = Cp^2[1 + (f/5.3 \times 10^9 p)^2 \qquad (4)$$

where p is equal to the ambient atmospheric pressure in Torr, and C is a constant equal to 119.38 W/(cm$^2$Torr$^2$). FIG. 5 is a parametric system of graphs of $p_{max}$ versus atmospheric pressure p corresponding to several microwave frequencies f. (The altitude corresponding to various values of atmospheric pressure is also shown in FIG. 5.) For a more detailed technical description of microwave breakdown in air at various pressures see "Breakdown Limitations on the Transmission of Microwave Power Through the Atmosphere," *IEEE Transactions On Antennas And Propagation*, Vol. 12, Nov. 1964, pp. 709-717, by W. E. Scharfman et al. FIG. 5 indicates that in order to obtain high power densities, the frequency f of the microwave beam should be as high as possible.

Figure 6:
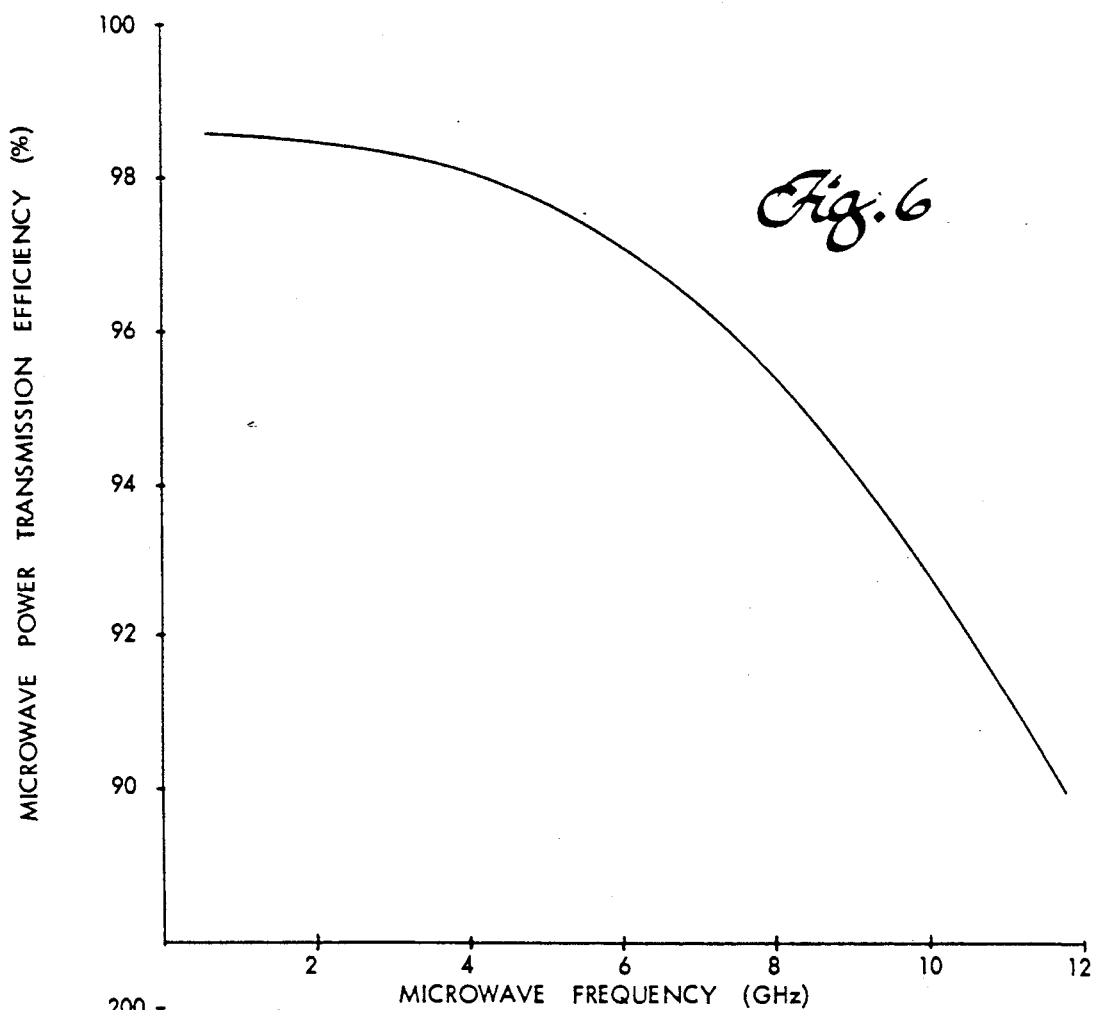
FIG. 6 is a graph illustrating the percentage of microwave power that is transmitted through the atmosphere corresponding to a beam elevation angle of 30° as a function of frequency on a rainy day with a precipitation rate of 2 mm/hr.

If the frequency of the microwave beam is too high, atmospheric attenuation begins to reduce the transmission efficiency of microwave power through the atmosphere. This is due to the absorption of microwave power by water vapor, oxygen, and various scattering processes. FIG. 6 is a graph showing the percentage of microwave power that is transmitted through the atmosphere with a beam elevation angle of 30° as a function of frequency during a cloud covered rainy day with a precipitation rate of 2 mm/hr. Thus, for example, at a frequency of 10 GHz, the microwave power transmission through the atmosphere with a beam elevation angle of 30° exceeds 95% even when it is raining with a precipitation rate of 2 mm/hr and total cloud cover. A laser beam operating at optical frequencies would be completely absorbed by the atmosphere under these conditions. A detailed technical description of atmospheric attenuation of microwave power can be found in the article, Atmospheric Attenuation of Microwave Power," *The Journal of Microwave Power*, Vol. 5, No. 4, Dec. 1970, pp. 269-278 by V. Falcone.

FIGS. 5 and 6 are important for determining the optimum operating frequency for the microwave beam. In order to be able to obtain a high power density $p$, the frequency should be as high as possible. However, if the frequency is too high, atmospheric attenuation will reduce the power transmission efficiency. Since it will be shown herein that the transmitter will be able to provide almost unlimited beam power, power losses due to atmospheric attenuation will be of secondary importance. Thus, the frequency selected for the preferred embodiment will be relatively high in order to obtain a high power density. A frequency f = 10 GHz will provide a power density of 425 W/cm$^2$ and is selected for the preferred embodiment. It should be noted however, that this frequency will still provide very high transmission efficiencies which, on a clear day, will approach 98% for beam elevation angles on the order of 30°.

Figure 7:
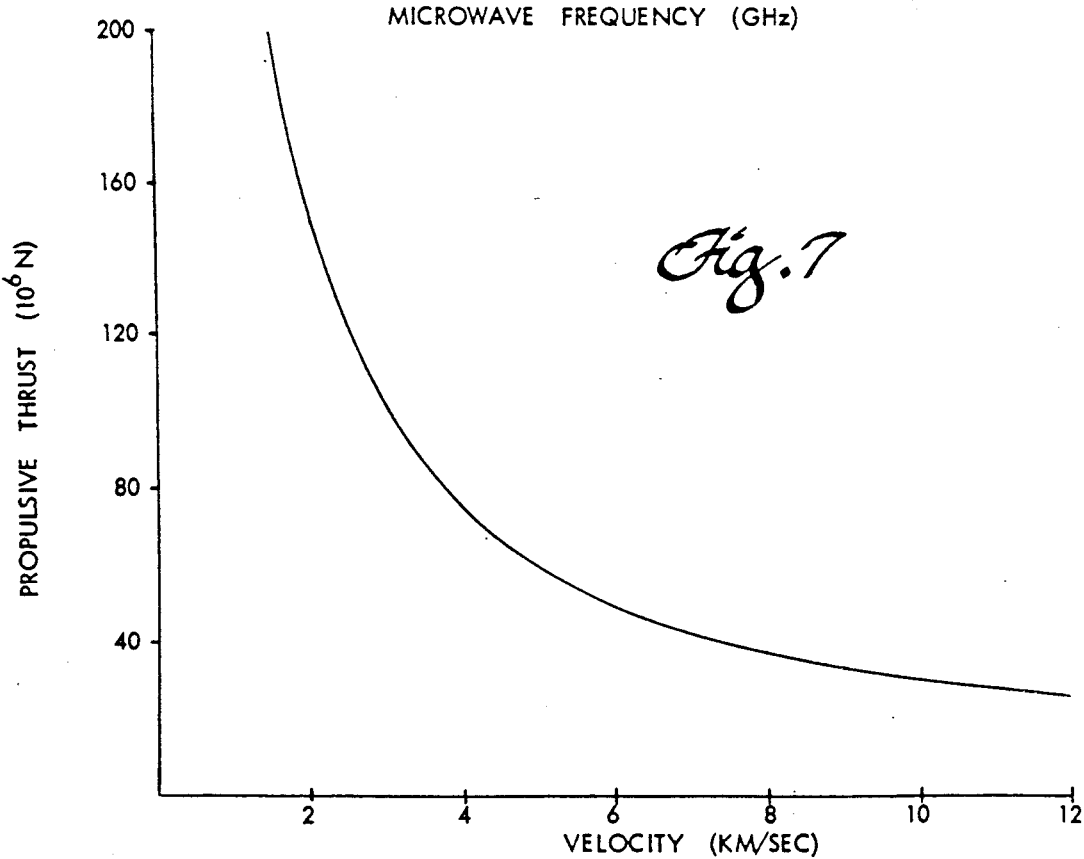
FIG. 7 is a graph of propulsive thrust F versus velocity V generated by an electromagnetic ramjet powered by a 300 GW microwave beam and operating with an efficiency of 100%.
Figure 17:
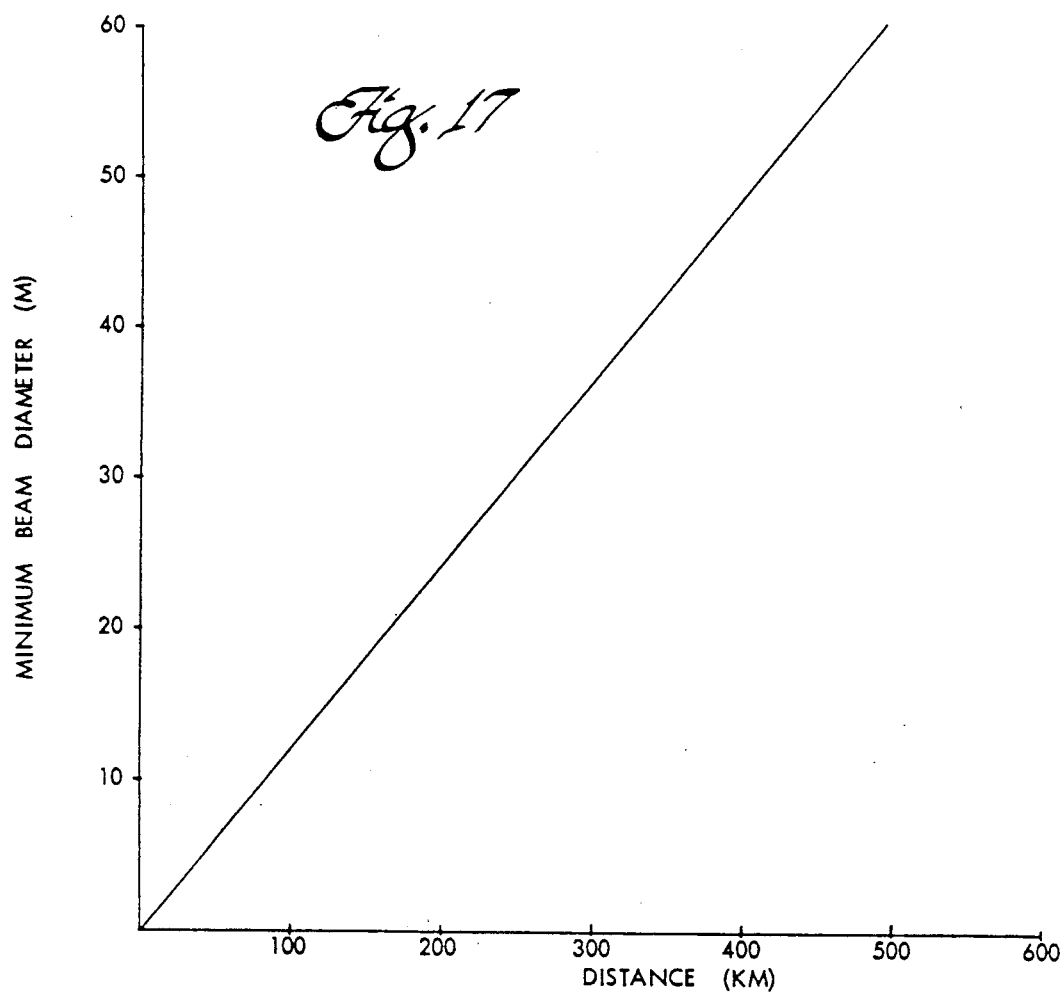
FIG. 17 is a graph of the minimum beam diameter $d_s$ versus transmission distance D corresponding to a phased array microwave transmitter with an effective transmitting aperture diameter of 600 m operating at a frequency of 10 GHz.

In order to comprehend the very high performance capabilities of the electromagnetic ramjet suppose R = 150 m and f = 10 GHz (f = 10$^{10}$). The maximum power density $p_{max}$ of the microwave beam operating at this frequency is 425 watts/cm$^2$. Hence, the maximum effective beam power that can be used to propel the ramjet will be 300 GW. This power is many orders of magnitude greater than any prior art beamed power propulsion concept—and this power is converted directly into propulsive thrust by electromagnetic processes with an efficiency of nearly 100%. FIG. 7 is a graph of propulsive thrust F versus velocity V that could be generated by the ramjet using 300 GW of propulsive power.

The reason why it is possible to operate the ramjet at these very high power levels is because of its huge dimensions—and these dimensions are possible because the superconducting propulsion coil can create and sustain enormous magnetic fields with a relatively small amount of material.

The most efficient operating altitudes of the electromagnetic ramjet (where the beam power to propulsive thrust conversion efficiency approaches 100%) is between 100 km and 120 km. At an altitude of 100 km the particle density of the atmosphere is about 10$^{13}$ molecules/cm$^3$ and the ramjet operation will be very nearly collisionless. Thus, there will be essentially zero thermalization and the ramjet operation will involve purely electromagnetic processes. Since altitudes on the order of 100 km are well within the ionosphere the ramjet can be viewed as "ionospheric ramjet."

It should be pointed out that the shock screen 12 used to ionize the molecules passing through the dipole coil 10 is not necessary at 100 km altitudes. The ionosphere at 100 km altitudes contains some fraction of the molecules that are already ionized by natural solar radiation. When the superconducting dipole coil 10 sweeps through this region with its large magnetic field, it acts as a giant ion scoop several kilometers in diameter which collects the ionized molecules and free electrons from all directions. Thus, the fraction of ionized molecules passing through the dipole is several orders of magnitude greater than the natural fraction at this altitude. When the free electrons pass into the electron cyclotron resonance region 26 (FIG. 1) behind the moving dipole coil and rapidly accelerated into expanding circular cyclotron orbits they will, in themselves, form an ionizing region, which will ionize most of the remaining unionized gas molecules passing through it in an avalanche effect. Although this process will reduce the overall beam power to propulsive thrust conversion efficiency of the ramjet, this reduction will only on the order of 2 or 3%.

At low altitudes below the ionosphere the fraction of ionized gas molecules is not large enough to start an ionizing process. The shock screen 12 therefore provides a means for generating a plasma source when the ramjet is moving at relatively low altitudes.

It should also be pointed out that the microwave generators could easily be designed to change frequency. This capability would allow the electromagnetic ramjet to be "fine tuned" from the ground while it is accelerating a payload to optimize its propulsive efficiency. It follows from equation (1) that by varying the frequency f of the microwave beam, it will be possible to move the resonance region of the orbiting electrons to give optimum performance. Consequently, in view of the large dimensions of the resonance region and the nearly perfect beam quality, it will be possible to operate the electromagnetic ramjet close to its theoretical performance limits.

One of the most important technical aspects of the invention is the fact that the superconducting dipole coil 10 is constructed with superconducting material having a relatively high critical temperature such that it can be maintained at liquid hydrogen temperature (18° K) instead of very low liquid helium temperature (4° K). FIGS. 8 and 9 illustrate the design and construction of a cryogenic Dewar system 30 that is designed to maintain the coil 10 at liquid hydrogen temperature. The system 30 comprises a double walled tube 32 that completely encloses the coil 10. A plurality of stand-off mounting struts 34 keep coil centered inside the tube 32. The tube 32 is filled with liquid hydrogen 36 such that the coil 10 is completely immersed in this cryogenic fluid at 18° K. The tube 32 and mounting struts 34 are constructed with material having very low thermal conductivity. The space 38 between the double walls of the tube 32 is filled with multiple layers of cryogenic thermal insulation 40. A plurality of larger mounting struts 42 are attached to the outer tube wall 44 and used for supporting an outer circular wing-like, high-speed airfoil 46 that completely encloses the Dewar 30.

FIGS. 10, 11, and 12 describe the detail design and construction of a high-speed airfoil 46 that is mounted around the coil 10 and its Dewar 30. As described above, the airfoil 46 is attached to the Dewar 30 by a plurality of supporting struts 42. Some portions of the airfoil 46 are equipped with movable aerodymamic control surfaces 48 that enable the ramjet propulsion system to be steered while traversing through the lower atmosphere at high velocity. The control surfaces 48 are moved by electrically driven servo motors 50 that are controlled by a guidance computer 52 and an inertial guidance system 54. A back-up radio control system 56 is provided to enable the control surfaces 48 to be controlled via radio signals transmitted from the launch site or from an orbiting satellite. A plurality of small orbiting maneuvering thrusters 58 (which could be high pressure vessels of compressed gas) are also provided for generating small amounts of propulsive thrust while traversing through the ionosphere (or while in orbit above the atmosphere). These thrusters 58 are controlled by the guidance system 54 and can also be used for providing lateral guidance when the propulsion system is moving at low velocities near the earth's surface. The airfoil 46 is also equipped with a plurality of high speed dive brakes 60 for providing additional decelerating propulsive thrust while traversing through the lower portions of the atmosphere. The dive brakes 60 are also controlled by the guidance system 54.

The airfoil 46 and the movable control surfaces 48 are constructed with high strength, high temperature composite material such as graphite fiber with negligible magnetic susceptibility. (See, "New World for Aerospace Composites," *Aerospace America*, Oct. 1985, pp. 36-42, by W. F. De Mario.) This protective high-speed airfoil 46 gives the ramjet propulsion system a fairly high lift to drag ratio which enables it to glide and maneuver a considerable distance through the lower atmosphere without any propulsive forces.

As is shown in FIGS. 10, 11, and 12, the airfoil 46 is designed with a small transverse cross section with a chord to thickness ratio of about 8 to 1. This design enables the total structural mass of the airfoil 46, including all of its internal components except the dipole coil 10, to have a total mass approximately equal to 25% of the coil mass. Thick blankets of evacuated multilayer cryogenic thermal insulation 62 are mounted along the inside walls 64 of the airfoil 46. Essentially all of the structure surrounding the coil 10 is constructed with material having very low magnetic susceptibility. Small superconducting magnetic shielding coils 66 are provided to shield various electron command and control systems from the magnetic field of the dipole 10.

The circular airfoil 46, all of its internal structure and operating systems, and the superconducting propulsion dipole 10 (along with its cryogenic Dewar system ) comprise a single-coil electromagnetic ramjet. It is a self-contained, automated reusable launch vehicle (i.e., accelerator) which is able to maneuver in space and traverse through the atmosphere in controlled flight and land vertically back at the launch site. For simplicity, FIGS. 1, 2, 3, 10, 11, and 12 illustrating the design and construction of the electromagnetic ramjet do not show the payload in order to keep the discussion focused on its operating principles.

Although the construction of a CW beamed power transmitter capable of generating a 300 GW laser beam at optical frequencies is well beyond the state of the art, it can be easily achieved at microwave frequencies. FIGS. 13 and 14 illustrate the design and construction of a giant phased array microwave transmitter 20. As is shown in FIG. 13, the transmitter 20 is rigidly mounted in a housing 68 with multiple radiating elements 70 having a broadside beam elevation angle of 30°. The beamed power electromagnetic ramjet propulsion system envisioned herein will require a plurality of microwave power transmitters. The first transmitter, located closest to the launch point, will have a broadside beam elevation angle of 45°. All other transmitters will be designed with a broadside beam elevation angle of 30°. In the preferred embodiment, the array 72 is circular (FIG. 14) with a diameter of 600 m. Each radiating element 70 (which comprises a beam launching horn) is fed CW microwave power via a waveguide 74. As is shown in FIG. 13 and in FIG. 15 (which is a plan vie of the transmitter) the waveguides 74 extend outward from the back of the array 72 in diverging directions for several hundred meters so as to provide some space between adjacent waveguide 74 that is large enough for access by technicians. These are where the phase shifters 76 are mounted. The microwave beam 18 is steered electronically by these phase shifters 76 which control the phase of the microwave power that is fed to the beam launching horns 70. FIG. 16 shows an enlarged longitudinal cross section of some of the beam launching horns 70 and the waveguides 74 that are connected to them. It is possible to design this microwave feed system with low loss waveguides such that over 99.9% of the microwave power fed into the system is transmitted.

In the preferred embodiment, the transmitting horns 70 and waveguides 74 have square transverse cross sections. The transmitting end of the horns 70 have aperture dimensions 4λ by 4λ where λ denotes the wavelength of the microwave beam. For the preferred frequency of 10 GHz, λ=3 cm. Hence, the end of each transmitting horn 70 has inside dimensions of 12 cm by 12 cm. The mounting of the array 72 is such that the spacing 78 between the inner walls of adjacent horns 70 is λ/2=1.5 cm so as to form a close-packed array with negligible sidelobes. This close-packing design of the array will enable essentially 100% of the radiated power to be contained in the main lobe which forms the microwave beam. With these dimensions, the array 72 will be composed of 15,514,038 separate beam launching horns 70 and a like number of waveguides 74 and phase shifters 76. Since the technology of microwave power transmission enables relatively small waveguides to convey very high levels of microwave power (because the power density can be as high as 1.2 MW/cm$^2$) over long distances with virtually zero loss, it is possible to achieve a total beam power of essentially any desired value by simply feeding a sufficient amount of microwave power into each individual waveguide. This is an important operating feature of the invention as it enables the electromagnetic ramjet to be designed to operate with essentially any desired level of microwave power. In the preferred embodiment of the invention, the microwave transmitters will be designed to transmit a maximum beam power of 10,000 $GW$ ($10^{13}$ watts). In order to obtain a maximum beam power of 10,000 GW, it is only necessary to feed 645 KW of microwave power into each individual waveguide 74. Since 645 KW microwave generators operating at 10 GHz are readily available as commercial "off the shelf items", the possibility of achieving a beam power of 10,000 GW (and much greater power) is very easy. It is just a matter of numbers. For example, since 1 MW amplitron microwave generators operating at 10 GHz (with an overall electric-to-microwave efficiency of 95%) are readily available and could be used to feed each waveguide 74, a beam power of over 15,500 GW could be achieved. (See, "High Power Microwave Generators of the Crossed-Field Type," *Journal of Microwave Power,* Vol. 5, No. 4, December 1970, pp. 245-259, by William Brown.) The reason why the waveguides 74 diverge and extend in back of the array for several hundred meters is to separate them to allow individual access and to enable the heat that is generated by the very small inefficiency losses to be carried off by various cooling systems.

The particular method adopted for generating the microwave power and feeding it into each waveguide will depend upon economics which is beyond the intended scope of this disclosure. However, it is instructive to identify a few of the possibilities. The first method involves connecting each waveguide 74 to its own separate microwave generator as described above. However, since the number of waveguides is so enormous, this method may be too expensive. Another method would be to generate several gigawatts of microwave power in single unit microwave generators and use the output to feed several thousand waveguides. In particular, a single microwave generator operating with an efficiency of 90% in the form of a 1.22 m long, 2.75 m diameter cylinder with a mass of only 5,400 kg would be capable of generating 10 GW of microwave power at 10 GHz. (See pages 176-180 of the paper, "Microwave Rocket Concept,"*International Astronautical Congress* Vol. 16, Athens, 1965 by J. Schad and J. Moriarity.) It would only require 1,000 of these units (each of which feeding 15,504 waveguides) to obtain the desired maximum 10,000 GW beam power. For definiteness, this is the method adopted herein. Thus, as shown in FIGS. 13 and 15, the 10 GW microwave generating units 80 are positioned at various locations, each of which are connected to 15,504 waveguides 74.

In order to dissipate the waste heat, a large cooling system 82 is provided. This cooling system 82 takes large quantities of water 84 from a nearby reservoir 86 and circulates it via conduits 88 around the microwave generators 80, phase shifters 76, and large portions of the waveguides 74 and beam launching horns 70. Since the transmitter will have to operate for only few minutes, the heat build up will not overwhelm the cooling system.

The electrical energy used to power the 1,000 microwave generators 80 is obtained from a large underground superconducting energy storage system 90. Such energy storage systems will be easily capable of supplying over 10,000 GW of DC electric current for the microwave generators 80 since superconducting inductor coils can be discharged at very high power levels. The electric current is fed to the generators 80 via superconducting power transmission lines 92 that are connected to the inductor 90 via superconducting on/off control switches 93. A large cryogenic cooling system 94 is provided for the inductor 90 and for the various superconducting transmission lines 92 and switches 93. Since an electromagnetic ramjet receiving propulsive power from a particular transmitter will usually be within range of the transmitter for less than 2 minutes, the total amount of inductive energy stored in the superconducting energy storage system could be easily achieved. It would require a storage capacity of about 350 GW-hr to provide 10,000 GW for 2 minutes. Such systems are well within engineering feasibility. (See for example, "Superconductive Energy Storage For Diurnal Use By Electric Utilities," *IEEE Transactions On Magnetics,* Vol. MAG-17, No. 1, January 1981, pp. 340-343 by R. Boom.) After the superconducting energy storage system is discharged by feeding current to the microwave generators 80 at very high power levels, it is recharged with current via other superconducting power transmission lines 96 at a much lower power level, but over a much longer time period. These recharging transmission lines could be connected to the field coils that are used to launch the ramjet vertically off the earth's surface. However, since some of the transmitters will be located several thousand kilometers from the launch point, it may be more practical to recharge the superconducting energy storage systems 90 by specially designed "stand-alone" power plants. A large superconducting MHD power plant would be ideal for this purpose because this type of power plant is very efficient and could be easily designed to operate on an intermittent basis with the capability of generating very large amounts of power. (See *Investigation of MHD Power Generation, Vol. II Integration With Cross-Field Microwave Devices,* RADC-TDR-62-464, Contract AF 30 (602)-2487, by W. C. Brown.) For example, such a power plant could be designed to generate 100 GW of power for 3½ hours which would be sufficient to recharge a completely discharged superconducting energy storage system 90. However, since the first transmitter will be located near the field coils, the electric current it uses to power its microwave generators will be taken directly from the superconducting field coils.

In this case, the inductive energy storage system for the transmitter would be the field coils themselves and thus there would be no need for a separate system 90.

There is another method for operating the microwave power generation and transmission system that may be the most economical. This method is based upon taking maximum advantage of the enormous microwave power that can be efficiently transmitted through circular large-diameter pressurized gas high frequency waveguides. For example, if d (meters) denotes the diameter of such a waveguide, the microwave power P (gigawatts) that could be transmitted through it is given approximately by $$P = (5d)^2 \; GW \tag{5}$$

(See, "Economic Feasibility of Microwave Power Transmission in Circular Waveguide," Ch. 3.6, pp. 256–269, D. Dunn and W. Loewenstern, Jr., *Microwave Power Engineering*, Vol. 1, Academic Press, 1968, E. Okress, ed.) Consequently, a waveguide of this type having a diameter of only 14.14 m (46.39 ft) would be capable of transmitting 5,000 GW. Two such waveguides would be capable of transmitting the maximum desired microwave power. Thus, instead of having to generate 10,000 GW of microwave power at each transmitter, it could be generated at the first transmitter (via the generators 80) and fed to the other transmitters sequentially by a pair of these giant waveguides mounted in underground tunnels that are connected to all of the transmitters located within the continental United States. The process of turning off the microwave power at one transmitter and turning it on at the next transmitter would simply involve switching the power flowing through the waveguides from one transmitter to the next transmitter. Consequently, with this method, there would be no need for any microwave generators 80 or superconducting energy storage systems 90 at these transmitters. The microwave power would be fed directly into the small waveguides 74 that feed it past the phase shifters 76 to the beam launching horns 70 at each phased array transmitter.

Although the phased array microwave transmitter may appear to be a very complex structure and operating system, it is, in reality, a simple bee-hive type housing with millions of waveguides. Since there are no moving parts, there is nothing to ware out. It would not require very much maintenance and it would be essentially 100% reliable. The economics of automated mass production techniques could be employed to reduce the total cost of the array.

As pointed out above, the microwave beam 18 is steered electronically by controlling the phase of each radiating element 70 in the array by the phase shifters 76. Each of these phase shifters 76 are controlled by a beam steering computer 98 via electric conduits 100. This computer 98 generates the steering commands such that the beam is automatically pointed at the electromagnetic ramjet as it traverses through the ionosphere several hundred kilometers away. The phase shifters 76 also enable the beam to be focused on the dipole such that the beam diameter is always maintained exactly equal to the dipole diameter as it moves away from the transmitter. An excellent technical exposition on the design and operating principals of electronically steered phased array microwave transmitters is given in the book: *Theory And Analysis Of Phased Array Antennas*, John Wiley & Sons, Inc., 1972 by N. Amitay et al.

The focused minimum possible diameter $d_s$ of the microwave beam at a distance D is given by the formula $$d_s = 2.44 \; D \; (\lambda/d_t) \tag{5}$$

where $d_t$ is equal to the diameter of the transmitting antenna, which is, in the preferred embodiment, equal to 600 m. Since $\lambda = 0.03$ m, the minimum possible beam diameter $d_s$ at a distance D = 2,459 km ($2.5 \times 10^6$ m) is 300 m. Consequently, the effective operational range of this transmitter when beaming propulsive power to an electromagnetic ramjet with a diameter of 300 m is 2,459 km. FIG. is a graph of $d_s$ versus D corresponding to this transmitter where $\lambda = 0.03$ m, an dt = 600 m. Since the maximum required distance will only be about 500 km (which corresponds to a ramjet altitude of 100 km, and a beam elevation angle of 10°) this 2,459 km range is much more than is actually required. The minimum beam diameter $d_s$ for this transmitter at the maximum 500 km range is 61 m. Consequently, in order to operate this transmitter at maximum power transmission efficiency (where the beam diameter is always equal to the smallest dipole diameter) the dipole diameter must be equal to or greater than 61 m. In order not to exceed the maximum power density of 425 W/cm² (so as to avoid atmospheric breakdown) the maximum beam power that could be transmitted to an electromagnetic ramjet with this diameter is 12.42 GW (which is only 0.12% of the transmitter's maximum power generating capability of 10,000 GW).

Figure 18:
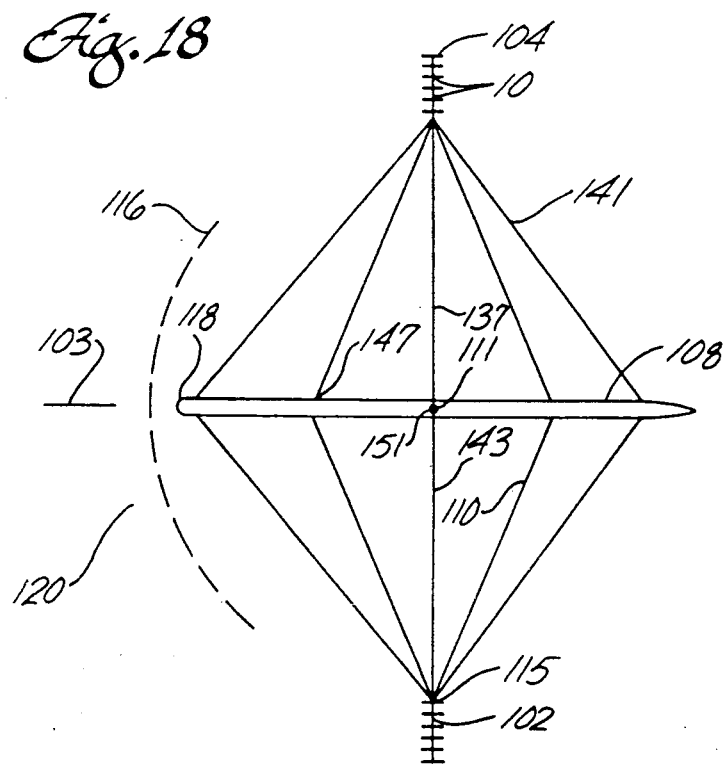
FIG. 18 is a schematic longitudinal cross section illustrating the design and construction of a multiple-coil electromagnetic ramjet with a cylindrical central body containing the payload.

As pointed above, the actual design of the electromagnetic ramjet will comprise not one but several superconducting dipole coils. This enables the effective magnetic field of the central region (i.e., the electron cyclotron resonance region) to be increased by the superposition of the magnetic fields generated by all the dipoles, thereby significantly increasing the propulsive thrust. The diameter of the microwave beam is continuously focused so as to be equal to that of the inner most dipole coil. FIGS. 18 and 19 are schematic longitudinal and transverse cross sections of a typical electromagnetic ramjet 102 with six concentric coplanar superconducting dipole coils 10 mounted inside circular concentric airfoils 104. (These airfoils 104 are essentially identical to the airfoil 46 described in FIGS. 10, 11 and 12.) The concentric circular dipole airfoils 104 are maintained in rigid, spaced apart positions relative to each other by a secondary system of straight radial airfoils 106 that are mounted between adjacent dipole airfoils 104.

A cylindrical central body 108, (i.e., fuselage), which represents the ramjet's payload, is mounted along the central longitudinal axis of the dipole via a plurality of cables 110 made of very high strength, high temperature material (such as fused silica glass fibers). The central body 108 has a length less than the diameter of the inner airfoil 115 and contains several large in dependent cargo bays for the payload. It is mounted such that its center of mass 111 coincides with the center of mass of the ramjet 102 (which is at the geometrical center of the dipole coils). As is shown in FIG. 19, the transverse cross sectional area 112 of the central body 108 is a small fraction of the area 114 of the inner airfoil 115. Therefore, its presence inside the center of the electromagnetic ramjet does not restrict the air flowing through it and does not reduce its thrust generating capabilities. The electron cyclotron resonance region 116 of the ramjet is designed to be behind the end 118 of the central body 108 such that the central body 108 is outside the accelerating region 120 of the ionized atmospheric gas passing through the ramjet and does not interfere with it. Unlike prior art ramjet propulsion systems that are mounted inside a fuselage or attached to wings (such as the "scramjets" proposed for the ground-to-orbit aerospace plane), the electromagnetic ramjet proposed herein is so huge that the entire fuselage of the vehicle is mounted inside the ramjet and the "wings" become the external structure of the ramjet itself.

FIG. 20 is an enlarged schematic longitudinal view of the central body 108 illustrating a plurality of large aerodynamic dive brakes 122 that are used to assist in decelerating the ramjet as it traverses back through the atmosphere while returning to the launch site on the earth's surface. The rear of the central body 108 is fitted with large hemispherical doors 124 made of high temperature material that provides thermal protection during the high-speed descent through the atmosphere back to the launch site. The front 126 of the central body 108 has a streamlined shape to reduce aerodynamic drag while accelerating to orbit through the atmosphere. Large portions of the inside walls of the central body 108 are fitted with superconducting shielding coils 127 to prevent the magnetic field generated by the ramjet's dipole coils from entering the central body.

FIG. 21 is a schematic transverse cross section of the rear of the central body directly behind the hemispherical thermal doors 124 illustrating the exhaust duct 128 of a very large multigigawatt electron cyclotron resonance (ECR) accelerator 130, surrounded by the exhaust nozzles 131 of twelve high thrust chemical rocket engines 133 using propellant 135 stored inside the central body 108. These engines 130, 133 provide the vehicle with a considerable amount of orbiting maneuvering propulsion that is used after the primary ramjet propulsion system accelerates the vehicle to a desired launch velocity. For example, this auxiliary propulsion system can be used for plane changing maneuvers and for circularizing the vehicle in a desired circular orbit. Since the electromagnetic ramjet propulsion system is capable of accelerating the vehicle through the ionosphere to lunar transfer velocities, this self-contained propulsion system enables the vehicle to decelerate into lunar orbit, unload cargo, and accelerate back to earth. By constructing a plurality of superconducting field coils on the moon's surface, the ramjet (and its payload) will be able to land on its surface and be catapulted back to earth via magnetic repulsive forces, thereby providing direct surface-to-surface transportation between the earth and the moon for passengers and/or cargo. But before this magnetic propulsion system could be constructed on the moon, it will be necessary to perform lunar propulsive maneuvers using the conventional reaction principle of rocket propulsion.

The electrical energy used to operate the ECR engine will be obtained from the ramjet's superconducting dipole coils 109 which are utilized as a large inductive energy storage system. Since these dipole coils 109 will have to be nearly completely discharged before the ramjet can be returned back to the launch site in order to be properly decelerated by the magnetic repulsive forces of the field coils, the utilization of this stored inductive energy for maneuvering propulsion is very convenient. (Since the total mass of the returning vehicle will be significantly lower than the launch mass, it is necessary to reduce the magnetic field of the returning ramjet so as to reduce the magnetic repulsive forces generated by the field coils and allow the ramjet to land.) For a detailed technical description of the ECR engine see my paper "Generalized Theory of Rocket Propulsion for Future Space Travel," AIAA *Journal of Propulsion and Power*, Vol. 3, No. 4, July-August 1987, pp. 320–328.

When the electromagnetic ramjet is being accelerated by the microwave beam, the intensity of the repulsive magnetic field generated by the free electrons moving in their resonant cyclotron orbits behind the ramjet will be several orders of magnitude greater than the intensity of the earth's natural magnetic field. Consequently, during this time, the earth's natural magnetic field will have no effect on the ramjet. However, when the microwave propulsion is terminated, the earth's natural magnetic field will exert a magnetic torque on the dipole coils that will force the dipole plane of the ramjet to remain oriented perpendicular to the earth's magnetic field. Therefore, the central body 108 is mounted on the ramjet 102 such that after the microwave propulsion is terminated and the vehicle is in orbit, the central body 108 will be free to rotate 360° around a rotation axis 137 that passes through its center, perpendicular to its longitudinal axis 103 which extends along the diameter of the circular airfoils 104. This central rotation axis 137 is a tubular beam 137 mounted inside co-linear radial airfoils 139 that are attached to the circular airfoils 104. A plurality of co-planer supporting cables 141 (FIG. 18) extending from the central body 108 are attached to the rotation axis 137 thereby providing additional support for the central body 108 while the central body 108 rotates around the rotation axis 137. A plurality of superconducting cables 143 are mounted inside the central beam 137 and enable electric current taken from the dipole coils 109 to pass into the central body 108 and fed into the ECR engine 130.

When the ramjet is being accelerated by the field coils, and then by the microwave beams, the thrust forces generated by the dipole coils 109 will be very great. In order to transmit these thrust forces to the central body 10 without causing any significant coil deformations, a large number of supporting cables 145 are mounted at close intervals around each circular airfoil 104 (FIG. 19) that are attached to various bulkheads 147 (FIG. 18) on the central body 108. After the microwave propulsion is terminated, those supporting cables 149 that are not attached to the rotation axis 137 are detached from the airfoils 104 and withdrawn into the central body 108 thereby allowing the central body to rotate freely around the rotation axis 137. The reflector grid 12 is also disconnected from the inner airfoil 115 and withdrawn into the central body 108. Although the dipole plane must always remain perpendicular to the earth's magnetic field, the longitudinal axis 103 of the central body 108 can be pointed in any direction by rolling the vehicle around the longitudinal axis 103 and by rotating the central body 108 around the rotation axis 137. Consequently, the propulsion system of the central body 108 can generate propulsive thrust in any desired direction while the coil plane remains perpendicular to the earth's magnetic field and such that the thrust vector always passes through the vehicle's center of mass. A large attitude control moment gyro system 151 is mounted at the center of mass 111 inside the central body 108 (FIG. 20) in order to carry out these rolling and rotating movements.

When the vehicle is preparing to return to the earth's surface prior to reentering the atmosphere, the central body 108 is rotated around the rotation axis 137 such that the longitudinal central axis 103 of the central body 108 is aligned with the longitudinal central axis of the ramjet 102. The alignment is such that the hemispherical doors 124 on the rear of the central body 108 are heading into the direction of motion. Since the dipole coils 109 are nearly discharged (which will be required when returning to earth) the magnetic torque exerted by the earth's natural magnetic field will be relatively weak and could be cancelled by the attitude control system. However, when the ramjet approaches to within a few hundred kilometers of the launch site, the magnetic field generated by the field coils will become stronger than the earth's natural magnetic field. This will create a new and stronger magnetic torque that will keep the dipole plane perpendicular to the magnet field of the field coils and this is precisely what is required during the final descent to the landing area.

Figure 22:
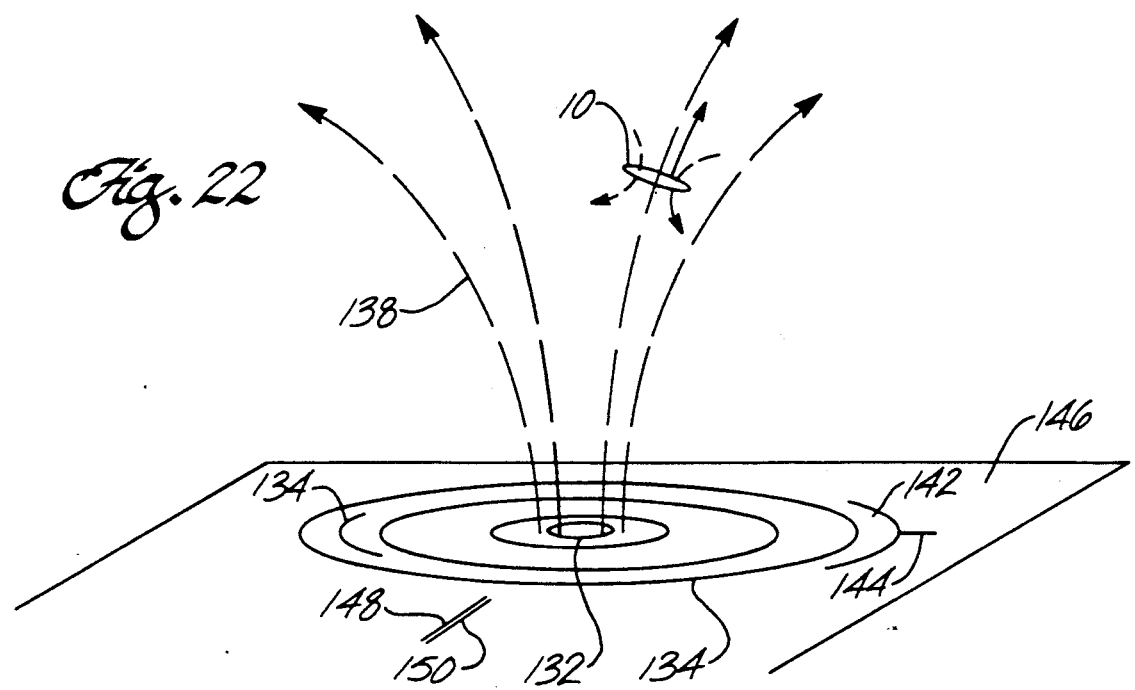
FIG. 22 is a schematic perspective view showing a superconducting dipole coil of an electromagnetic ramjet accelerating away from a plurality of coaxial field coils buried beneath the earth's surface by magnetic repulsive forces.
Figure 23:
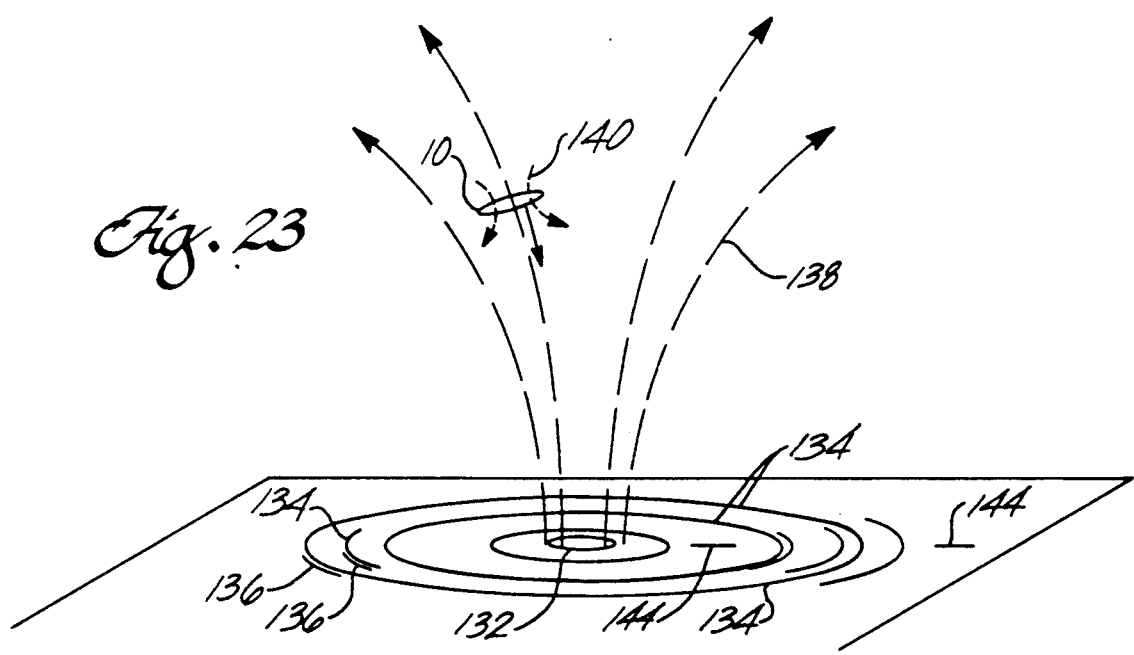
FIG. 23 is a schematic perspective view showing a superconducting dipole coil of an electromagnetic ramjet being decelerated during its return to the launching site via magnetic repulsive forces generated by the field coils.

As described above, the electromagnetic ramjet, along with its payload, is launched vertically from the earth's surface and accelerated to supersonic speed at high altitude by magnetic repulsive forces generated by a plurality of coaxial superconducting field coils several kilometers in diameter embedded beneath the earth's surface. Since the superconducting dipole coils of the electromagnetic ramjet generate such a huge magnetic field (when fully charged), this field is utilized to initially lift the vehicle off the earth's surface and to accelerate it to an altitude where the ramjet can begin operating by the microwave beam. Thus, after the vehicle reaches a sufficiently high altitude, the electromagnetic ramjet propulsion system is started using microwave power transmitted from the earth's surface which accelerates the vehicle to orbital velocity. After the payload is removed from the central body, the vehicle is decelerated back to the launch site by continuous aerodynamic braking while gliding through the upper atmosphere at high altitudes over extended distances gradually descending to lower altitudes and landing vertically at the launch site with final decelerating thrust provided by magnetic repulsive forces generated by the same field coils used to launch the vehicle. These launching and landing methods are illustrated in FIGS. 22 and 23 respectively. For simplicity, the ramjet appears as one dipole propulsion coil in these figures and the central body is omitted.

As is illustrated in FIG. 22, the dipole coil 10 of an electromagnetic ramjet accelerated vertically from an annular launching platform 132 by magnetic repulsive forces generated by a plurality of superconducting field coils 134 (which are also dipoles) mounted inside circular coaxial underground tunnels 136 in a remote region. These field coils 134 generate a resultant magnetic field 138 (represented by the vector summation or "superposition" of the individual magnetic fields) which opposes the magnetic field 140 generated by the propulsion dipole 10 which has opposite polarity. This results in a magnetic repulsive force exerted on the propulsion coil 10, and magnetic repulsive forces exerted on the field coils 134. Multiple arrays 142 of photovoltaic solar cells are mounted around the outer perimeter of the field coils for generating electrical energy. This electrical energy is used to charge up the superconducting field coils. As described above, the field coils are also utilized as a giant superconducting inductive energy storage system for supplying current to the microwave generators at the first transmitter. A plurality of underground superconducting power transmission lines 144 are provided for transferring excess electrical energy not needed to operate the propulsion system to the national intertie power grid for distribution across the United States.

FIG. 23 is a schematic perspective view showing how a superconducting propulsion coil 10 is decelerated back to the launch site by the stationary field coils 134 embedded beneath the earth's surface 146. The inductive coupling between the field coils 134 and the magnetically decelerated propulsion coil 10 enable a portion of the potential and kinetic energy of the coil 10 to be reconverted into electrical energy when the coil 10 is brought to rest back on the launching platform 132. This inductive coupling appears as an increasing repulsive magnetic field generated by the dipole coil 10 when approaching the field coils that generate strong magnetic repulsive forces decelerating the coil and enabling it to lose all of its velocity at the moment of contact with the earth's surface in the center of the field coils. This is a beautiful situation as it allows the propulsion dipole 10 to be automatically partially recharged with current that is used to launch the next payload. However, a great deal of additional current must be fed into the dipole coil because the launch mass will be many times greater than the return mass. But the cost of this additional inductive energy that must be added to the propulsion coil will be zero since the solar arrays are conducted to be an integral part of the entire system.

Payloads are brought to the launch site via an underground access tunnel 148. The surrounding walls of this tunnel 148 are fitted with superconducting shielding coils 150 to prevent the magnetic field 138 generated by the field coils 134 from entering the access tunnel 148.

Figure 24:
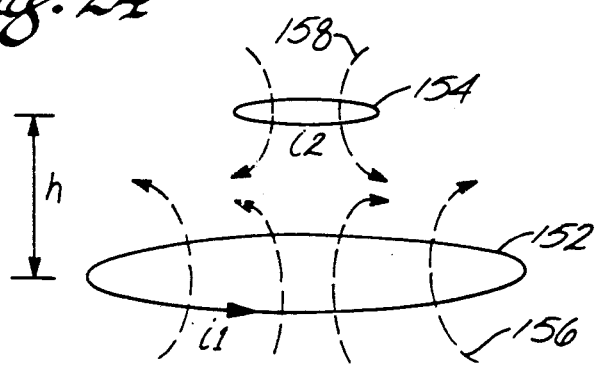
FIG. 24 is a schematic perspective view illustrating the magnetic repulsive force between two parallel coaxial current carrying coils.

In order to demonstrate the basic engineering feasibility of lifting the electromagnetic ramjet off the earth's surface (along with its payload) and accelerating it to very high altitude via magnetic repulsive forces generated by a plurality of superconducting field coils embedded beneath the earth's surface, it is necessary to conduct a mathematical investigation. FIG. 24 illustrates two parallel coaxial circular coils 152, 154 with radii $R_1$ and $R_2$ separated by a distance h and carrying currents $i_1$ and $i_2$ in opposite directions respectively. Hence, the corresponding magnetic fields 156, 158 generated by the currents $i_1$ and $i_2$ have opposite directions, and the coils are therefore repelled by a magnetic repulsive force F. The exact mathematical expression for this repulsive force is given by $$F = \frac{\mu_0 i_1 i_2 h}{\sqrt{h^2 + (R_1 + R_2)^2}} \left[ \left( \frac{R_1^2 + R_2^2 + h^2}{(R_1 - R_2)^2 + h^2} \right) E_2 - E_1 \right] \quad (6)$$

where $E_1$ and $E_2$ and the complete elliptic integrals of the first and second kinds, respectively given by $$E_1 = \int_0^{\pi/2} \frac{dx}{\sqrt{1 - k^2 \sin^2 x}}$$

and $$E_2 = \int_0^{\pi/2} \sqrt{1 - k^2 \sin^2 x} \, dx$$

where

-continued $$k^2 = \frac{4R_1R_2}{h^2 + (R_1 + R_2)^2}$$

If $R_1 >> R_2$, equation (6) can be expressed to a good approximation by the equation $$F = \frac{3\pi\mu_o R_1^2 R_2^2 i_1 i_2 h}{2(R_1^2 + h^2)^{2.5}} \quad (7)$$

where $\mu_o = 4\pi \times 10^{-7}$ henry/m (MKS units are used). See, *Introduction to Electromagnetic Fields And Waves*, Addison-Wesley Publishing Company, 1968, pp. 219-220, by E. V. Bohn. It is important to point out the fact that equation (7) demonstrates that the propulsive force F acting on the second coil 154 increases with the square of its radius $R_2$.

Suppose that the first coil 152 (field coil) is at rest on the earth's surface and the second coil 154 (propulsion coil) is being repelled above it by the magnetic repulsive force F. The downward force of gravity W acting on the second coil 154 is equal to $m_2 g$ where $m_2$ is equal to its mass and $g = 9.81$ m/sec$^2$ is equal to the average gravitational acceleration at the earth's surface. If the second coil 154 has a mass density $\rho$ and a current density J, the thrust to weight ratio F/W for the magnetically repelled coil 154 can be expressed as $$\frac{F}{W} = \frac{3\mu_o R_1^2 i_1 R_2 J h}{4g\rho(R_1^2 + h^2)^{2.5}} \quad (8)$$

It is apparent from this equation that the thrust to weight ratio of the magnetically repelled coil 154 can be increased by increasing its radius $R_2$ and its current density J. If the coils 152, 154 are superconducting, the values of $i_1$ and J can be made very large. Moreover, by utilizing superconducting coils, all internal electrical resistance vanishes, and the currents $i_1$ and $i_2$ do not have to be sustained by any external power source to make up for resistive losses.

There exists the practical problem of charging the second coil 154 with current $i_2$ without it being catapulted away from the first coil 152 (which is assumed to be fully charged with current $i_1$) before the second coil 154 can be fully charged. However, in view of equation (8), there is no upward thrust exerted on the second coil when $h = 0$. In order for the coil 154 to be magnetically repelled away from the field coil 152, it must have some relatively small initial altitude $h_o$ where F/W = 1. Thus, the second coil 154 can be charged with its current $i_2$ while resting on the earth's surface (at $h = 0$) in the center of the larger field coil 152.

Let $B_1$ denote the magnetic field strength generated by the first coil 152 at its center. Hence $$B_1 = \frac{\mu_o i_1}{2R_1} \quad (9)$$

If $A_2$ denotes the area of the second coil 154, its magnetic dipole moment $M_2 = i_2 A_2$. Therefore, since $A_2 = \pi R_2^2$, the magnetic dipole moment $M_2$ of the second coil 154 can be expressed as $$M_2 = i_2 \pi R_2^2 \quad (10)$$

If the second coil 154 is charged with current $i_2$ when it is on the earth's surface in the center of the field coil 152, its magnetic potential energy $E_m$, which is equal to $B_1 M_2$, can be expressed as $$E_m = \frac{\mu_o \pi i_1 i_2 R_2^2}{2R_1} \quad (11)$$

This magnetic potential energy $E_m$ is converted into kinetic and potential energy by the second coil when it accelerates away from the first coil (which remains stationary). The mathematical expression of this energy represented by equation (11) clearly demonstrates that an enormous amount of magnetic potential energy $E_m$ can be fed into the second coil (by charging it with current $i_2$) if the coil is constructed with a very large radius $R_2$. This method of launching the ramjet by magnetic repulsive forces involves the recognition (through equations 7, 8 and 11) that enormous amounts to stored propulsive energy $E_m$ and propulsive thrust F can be achieved with the principle of magnetic repulsion by utilizing superconducting coils and scaling up their physical dimensions many orders of magnitude—far beyond anything previously contemplated. By constructing a superconducting field coil 152 with a radius of several kilometers and charging it with an enormous current $i_1$, it is possible to construct the superconducting propulsion coil 154 with a radius of hundreds of meters and charge it with current $i_2$ to obtain an initial magnetic launch energy $E_m$ far greater than the initial chemical launch energy contained in the propellant of any prior art chemically propelled launch vehicle. In fact, equation (11) shows that, for all practical purposes, there is virtually no limit on the amount of launch energy $E_m$ than can be obtained for the magnetically propelled coil—and this launch energy $E_m$ will be converted into kinetic and potential energy with an efficiency of nearly 100% compared to only about 2% for chemically propelled launch vehicles. (Almost all of the initial chemical launch energy of conventional rocket propelled launch vehicles is wasted by having to lift and accelerate the enormous propelled load.)

In order to better understand this magnetic propulsion concept, it may be helpful to consider a simple numerical example. Suppose the field coil 152 has a current $i_1 = 1.5 \times 10^9$ amp and a radius $R_1 = 10,000$ m. Suppose the current density of the second coil 154 is $J = 5 \times 10^8$ amp/m$^2$ and has a radius $R_2 = 1,000$ m with a mass density $\rho = 3,000$ kg/m$^3$. At an altitude $h = 10,000$ m (32,800 ft) the thrust to weight ratio for the magnetically repelled coil 154 would be equal to 42.46. Thus, at this altitude, the coil 154 would be accelerating upward by the magnetic repulsive force with an acceleration of 41.46 g and would be moving with a velocity of 3.156 km/sec (7,059 MPH or Mach 10,2).

The corresponding velocity V at any altitude h can be calculated from the equation $$V = \{C[(R_1^2 + h_o^2)^{-1.5} - (R_1^2 + h^2)^{-1.5}] - 2G[(r_e + h_o)^{-1} - (R_e + h)^{-1}]\}^{\frac{1}{2}} \quad (12)$$

where $$C = \frac{\mu_o R_1^2 i_1 R_2 J}{2\rho}$$

and $G=3.981\times 10^{14}$ m$^3$/sec$^2$ (earth's gravitational constant) $R_e=6,371,315$ m (earth's mean radius) and $h_o$ is equal to the launch altitude (which is equal to the initial height where F/W=1). For the above example $h_o=41.16$ m and $C=1.571\times 10^{19}$ m$^5$/sec$^2$. The coil would be accelerated to a maximum altitude of 916 km. The altitude where the magnetic repulsive force is equal to the gravitational force (F/W=1) is 37.73 km (123,800 ft). This altitude could be sustained indefinitely by the propulsion coil without expending any energy.

This simple example demonstrates the very powerful propulsive forces than can be generated by magnetic repulsion when large superconducting coils are used. These propulsive forces are significantly greater than that which can be generated by conventional rocket engines. The most important fact however, that has profound importance in the field of space travel, is that these powerful propulsive forces are generated without using any propellant or any power generating system on the propulsion coil.

Before proceeding, it should be pointed out that although the construction of a 20 km diameter superconducting field coil would be expensive, it would cost significantly less than the $3 billion cost of the Superconducting Super Collider underground particle accelerator, with a diameter of 60 km that is being designed and constructed for high energy physics research. (See "The SSC: A Machine For The Nineties," *Physics Today*, March 1985, pp. 28–37, by S. Gladshow and L. M. Lederman). Using mass production techniques for manufacturing the superconducter, the cost of installing a 20 km diameter field coil could probably be kept to about $10 million per kilometer or $625 million. Thus, the concept of magnetic propulsion introduced herein is well within economic feasibility.

It follows from equation (8) that the thrust to weight ratio F/W of the propulsion dipole 154 can be increased by maximizing the product $R_2J$. But the radius $R_2$ and current density J are not independent variables. They are related by the mechanical stress limitations generated by magnetic forces. Any current carrying conductor generates a magnetic field. This magnetic field generates $\vec{J}\times\vec{B}$ Lorentz forces on the conductor which, in turn, generates various mechanical stresses that must be contained by some supporting mass. In the case of superconducting propulsion coils described herein, the conductor itself is designed to contain these forces. Thus, in order to minimize the mass of a propulsion coil it will be designed to be a self supporting superconducting dipole. The stresses are contained by the superconducting cable used to construct the dipole.

The inductive energy E of a superconducting coil carrying a current i with self inductance L is given by the equation $$E = \tfrac{1}{2}Li^2 \tag{13}$$

Figure 25:
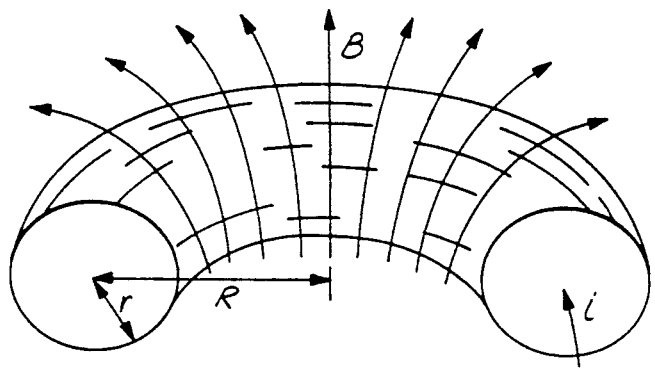
FIG. 25 is a perspective view of half of a dipole coil showing its relative geometrical relationships.

The self inductance of a dipole coil with major radiums R and minor radius r (FIG. 25) is given by $$L = \mu_o R[\log(8R/r) - 1.75] \tag{14}$$

Consequently, the total radial outward force F acting on the dipole is $$F = \frac{\partial E}{\partial R} = \tfrac{1}{2}i^2\frac{\partial L}{\partial R}$$
$$= \tfrac{1}{2}i^2\mu_o[\log(8R/r) - .75]$$

where i denotes the total current flowing through the coil's total cross sectional area $A_t$. If $F_t$ denotes the total tension in the coil, its stress $\sigma = F_t/A_t = F_t/\pi r^2$. Consequently, since $F_t = F/2\pi$, it follows that $$F_t = \frac{F}{2\pi} = \frac{i^2}{4\pi}\mu_o[\log(8R/r) - .75] = \pi r^2\sigma \tag{15}$$

The magnetic filed $B_o$ at the center of the dipole is given by $$B_o = \frac{\mu_o i}{2R} \tag{16}$$

and the maximum magnetic filed $B_m$ which occurs on the surface of the dipole closest to the center, is given by $$B_m = \frac{\mu_o i}{2\pi r} \tag{17}$$

Consequently, since the aspect ratio $\gamma = R/r$, equation (15) can be expressed as $$B_o^2\gamma^2[\log(8\gamma)-0.75] = \sigma\pi^2\mu_2 \tag{18}$$

Since the current i is related to the current density J by $i = JA_t = J\pi r^2$, it follows from equation (16) that $$JR = \frac{2B_o\gamma^2}{\pi\mu_o} \tag{19}$$

Hence, in view of equation (18) it follows that $$JR = 2(\sigma/\mu_o)^{\frac{1}{2}}[\gamma/(\log(8\gamma)-0.75)^{\frac{1}{2}}] \tag{20}$$

This equation is of fundamental importance because it relates the product JR to the tensile strength $\sigma$ of the superconducting cable and the aspect ratio $\gamma$ of the propulsion dipole.

Figure 26:
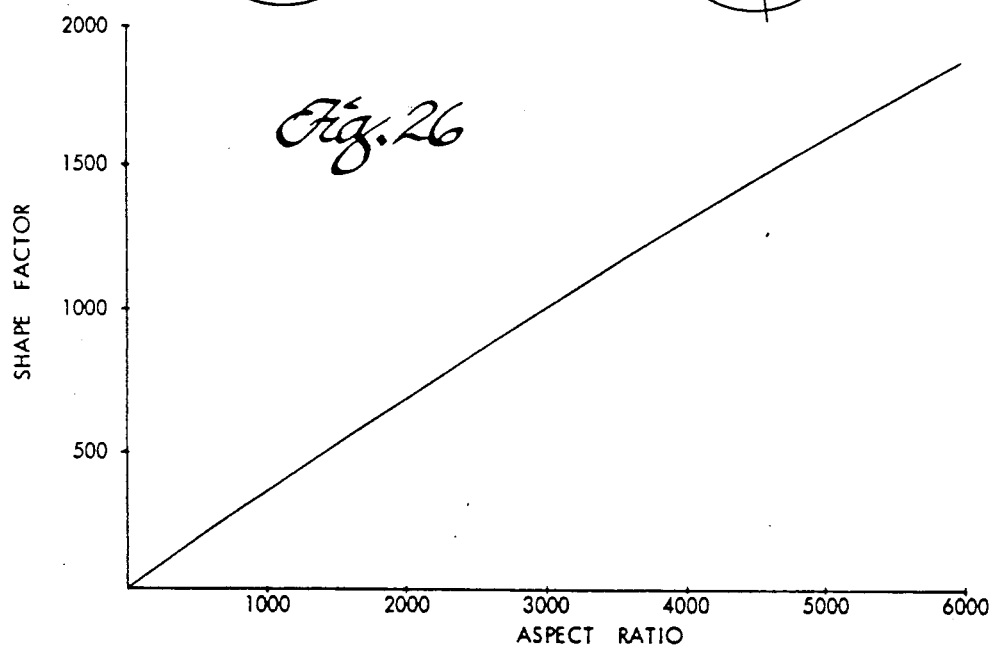
FIG. 26 is a graph of a propulsion coil's shape factor versus its aspect ratio.

The function $F(\gamma)$ in the brackets of equation (20) defined by $$F(\gamma) = \gamma/[\log(8\gamma)-0.75]^{\frac{1}{2}} \tag{21}$$

is dependent only on $\gamma$ and hence the shape of the dipole (i.e., only on the relative thickness of its cross section). It will therefore be called the "shape factor". A graph of this function is shown in FIG. 26. It is very nearly equal to a straight line with a slope of 0.3. Hence, the product JR can be expressed to a good approximation by the equation $$JR = .600\,\gamma\sqrt{\sigma/\mu_o} \tag{22}$$

This equation clearly demonstrates that the value of JR can be increased to large values by increasing the aspect ratio $\gamma$ of the dipole and by constructing the superconducting cable of the dipole with a very high tensile strength $\sigma$.

The aspect ratio $\gamma$ of a dipole coil can also be determined to a good approximation by the equation $$\gamma = \frac{.3\pi \sqrt{\sigma\mu_o}}{B_o} \qquad (23)$$

which follows from equation (18) using the approximately $F(\gamma)=0.3\gamma$. However, it should be emphasized that the exact value of $\gamma$ corresponding to a central field $B_o$ is obtained by solving equation (18).

In view of equations (8) and (22) the thrust to weight ratio F/W of the dipole can be maximized by constructing the superconducting cable with a high strength to density ratio $\sigma/\rho$. The fabrication of such a cable is disclosed in my U.S. Pat. No. 4,078,747 filed June 2, 1975 entitled "Orbiting Solar Power Station." Basically this fabrication method involves reinforcing high strength, low density, superconducting cable previously fabricated by vapor depositing a thin layer of superconducting material onto high strength carbon fibers, with a tensile strength of $0.28 \times 10^{10}$ N/m², with super high strength fused silica glass fibers, with a tensil strength of $1.4 \times 10^{10}$ N/m². However, by using new high temperature ceramic superconducting material, the superconducting layer can be vapor deposited directly onto the fused silica glass fibers thereby eliminating the need for any carbon fibers. The technique of vapor depositing superconducting material onto high strength fibers is discussion in the article "Superconducting Properties of Thin Film Niobium Carbonitrides on Carbon Fibers," *IEEE Transactions on Magnetics*, Vol. Mag-11, No. 2, March 1975, pp. 185-188 by G. E. Pilce et al. Since experiments involving high temperature ceramic superconducting material indicate that such material is intrinsically stable, there is no need for any stabilizer material such as copper or aluminum. The resulting tension bearing superconducting cable fabricated by this technique will have a tensil strength $\sigma = 1.4 \times 10^{10}$ N/m², and a mass density $\rho = 2,160$ kg/m³. This is the cable that will be used to construct the superconducting propulsion dipole.

In view of equation (1), the magnetic field $B_o$ at the center of the dipole coil 10 is determined by the electron cyclotron resonance frequency f of the microwave beam. Hence $$B_o = 2\pi f(m/e) \qquad (24)$$

Therefore, since $f = 10^{10}$ (10 GHz) it follows this equation that $B_o = 0.3572$ T. Consequently, when this value is substituted into equation (18), with $\sigma = 1.4 \times 10^{10}$ N/m², the resulting aspect ratio $\gamma = 429,094$.

If the major radius $R_2$ of the propulsion dipole were 300 m, the minor radius $r_2$(see FIG. 25) would be $R_2/\gamma = 0.6991$ m. Since the density $\rho$ of the coil is 2,160 kg/m³, the total coil mass would be equal to 6,252,000 kg. This can be significantly reduced by employing multiple dipole coils. Thus, in the preferred embodiment of the electromagnetic ramjet, the magnetic field is generated by six dipole coils instead of one, and each coil generates an equal field strength at the center. Therefore, the magnetic field generated at the center of each coil will be equal to $B_o/6 = 0.0595$ T. When this value is substituted into equation (18) the resulting aspect ratio $\gamma$ is 2,324.1, which is a factor of 5.416 times greater than that of a single coil. Therefore, in view of equations (8) and (22) the thrust to weight ratio F/W of each of the six dipole coils will be increased by a factor of 5.416 over that of the single dipole. If the radii of these six dipole coils were 300 m, 310 m, 320 m, 330 m, 340 m and 350 m, the total mass would be 1,629,300 kg which represents a reduction by a factor of 3.8 over the single dipole design. The minor radius $r_2$ of the inner dipole would be 300 m/2,324.1 = 0.129 m (12.9 cm or 5.1 in) and the minor radius of the outer coil would be 350 m/2,324.1 = 0.151 m.

The general formula for calculating the total coil mass $m_c$ of an electromagnetic ramjet with n dipole coils with equal aspect ratio is $$m_c = \frac{2\pi^2 \rho}{\gamma^2} \sum_{j=1}^{n} R_{2j}^3 \qquad (25)$$

The magnetic launch energy $E_m$ of the dipoles of an electromagnetic ramjet can be arbitrarily increased to any desired value without increasing its size or current by simply increasing the current $i_1$ in the field coils and/or by simply increasing the number of field coils. Since the field coils remain stationary on earth, their mass is of no consequence. Moreover, they do not have to be self-supporting as in the case of the propulsion dipoles. Since they will be embedded in underground tunnels the stresses could be supported by the surrounding earth itself.

In the preferred embodiment of the invention, there will be many (coaxial) field coils instead of only one. In view of the principle of field superposition where the effective propulsive field is equal to the vector sum of the individual fields, the propulsive thrust and energy can be increased to achieve unlimited values by simply increasing the number of field coils—which can be easily accomplished since the field coils remain fixed in underground tunnels. In this case, the thrust to weight ratio given by equation (8) becomes $$\frac{F}{W} = \left(\frac{3\mu_o R_2 J h}{4g\rho}\right) \sum_{j=1}^{n} \frac{i_{1j} R_{1j}^2}{(R_{1j}^2 + h^2)^{2.5}} \qquad (26)$$

where $R_{1j}$ is equal to the radius of the j'th field coil and there are n field coils altogether. The current in each field coil is equal to $i_{ij}$. In view of equation (20) the product $R_2 J$ will be equal for each individual dipole coil of a ramjet since the aspect ratio $\gamma$ is constant. Therefore, the thrust to weight ratio for each dipole will be equal regardless of their radii.

The thrust to weight ratio of a multiple coil electromagnetic ramjet with coil mass $m_c$ propelled by multiple field coils is given by $$\frac{F}{W} = \left(\frac{3\mu_o h M^2}{2g m_c}\right) \sum_{j=1}^{n} \frac{i_{1j} R_{1j}^2}{(R_{1j}^2 + h^2)^{2.5}} \qquad (27)$$

where $M_2$ is equal to the total magnetic dipole moment of the ramjet.

The total magnetic dipole moment $M_2$ of a multiple coil electromagnetic ramjet is equal to the summation of the individual dipole moments $M_{2j}$ of each coil. Hence $$M_2 = \sum_{j=1}^{n} M_{2j} = \sum_{j=1}^{n} i_{2j} \pi R_{2j}^2$$

The current $i_{2j}$ flowing through the j'th coil is equal to its density $J_j$ multiplied by its transverse cross sectional area $A_{tj}$ which is equal to $\pi r_{2j}^2$ where $r_{2j}$ is equal to the coil's minor radius. Since $r_{2j}=R_{2j}/\gamma$, the current $i_j$ can be expressed as $$i_j = \frac{\pi(J_j R_{2j}) R_{2j}}{\gamma^2}$$

However, in view of equation (20), the value of $J_j R_{2j}$ is the same for each coil. Consequently, the total magnetic dipole moment of the ramjet can be expressed as $$M_2 = \frac{2\pi^2}{\gamma} \left[ \frac{\sigma}{\mu_o[\log(8\gamma) - .75]} \right]^{\frac{1}{2}} \sum_{j=1}^{n} R_{2j}^3 \quad (28)$$

The magnetic dipole moment $M_2$ of the ramjet with six propulsion coils given in the example above with radii $R_{2j}$ equal to 300 m, 310 m, 320 m, 340 m, 350 m will be equal to $6.18179 \times 10^{13}$ amp m². The magnetic dipole moment corresponding to the ramjet with a single coil with radius 300 m would be $4.82220 \times 10^{13}$ amp m².

The velocity V of the ramjet at any altitude h can be calculated by $$V = \left\{ C_o \sum_{j=1}^{n} i_{1j} R_{1j}^2 \left[ (R_{1j}^2 + h_o^2)^{-1.5} - (R_{1j}^2 + h^2)^{-1.5} \right] - 2G[(R_e - h_o)^{-1} - (R_e + h)^{-1}] \right\}^{\frac{1}{2}}$$

where $$C_o = \frac{\gamma}{\rho} \left[ \frac{\sigma \mu_o}{\log(8\gamma) - .75} \right]^{\frac{1}{2}} \approx \frac{.3\gamma (\mu_o \sigma)^{\frac{1}{2}}}{\rho}$$

When using the formula for determining the ascent velocity of an electromagnetic ramjet carrying a payload, the density $\rho$ has to be multiplied by the mass ratio $m_t m_c$ where $m_t$ the total vehicle mass and $m_c$ is the total coil mass.

The total magnetic potential energy $E_m$ of the propulsion dipole is equal to $$M_2 \sum_{j=1}^{n} B_{1j}$$

where $B_{1j}$ is equal to the magnetic field strength at the center of the j'th coil generated by the j'th coil, and where $M_2$ is equal to the total magnetic dipole moment of the ramjet.

Let $B_1$ denote the central magnetic field strength generated by the field coils at the launch altitude $h_o$ where the thrust to weight ratio $F/w=1$. This altitude $h_o$ represents the initial height above the plane of the field coils. Since the launch altitude above the earth's surface is assumed to be o, the field coils are installed in underground tunnels at a depth equal to $h_o$. Therefore, the strength of the magnetic field due to the field coils at the earth's surface is given by $$B_1 = \frac{1}{2} \mu_o \sum_{j=1}^{n} \frac{i_{1j} R_{1j}^2}{(R_{1j}^2 + h_o^2)^{1.5}} \quad (29)$$

Consequently, the initial magnetic launch energy $E_m$ of the electromagnetic ramjet (which is equal to $M_2 B_1$) can be expressed as $$E_m = \frac{1}{2} \mu_o M_2 S_1 \quad (30)$$

where $$S_1 = \sum_{j=1}^{n} \frac{i_{1j} R_{1j}^2}{(R_{1j}^2 + h_o^2)^{1.5}} \quad (31)$$

The magnetic inductive energy $E_c$ stored in a multiple coil electromagnetic ramjet is given by $$E_c = \frac{1}{2} \sum_{j=1}^{n} L_j i_{2j}^2$$

where $L_j$ denotes the self-inductance of the j'th dipole coil given by equation (14). Since $i_{2j}=\pi R_{2j}(JR_{2j})/\gamma^2$, it follows from equations (14) and (18) that the ramjet's inductive energy $E_c$ can be expressed by $$E_c = \frac{2\pi^2 \sigma}{\gamma^2} \left[ \frac{\log(8\gamma) - 1.75}{\log(8\gamma) - 0.75} \right] \sum_{j=1}^{n} R_{2j}^3 \quad (32)$$

As described above, this stored inductive energy will be used for maneuvering the vehicle outside the earth's atmosphere by the onboard ECR engine after the ramjet propulsion system accelerates the vehicle to the required launch velocity.

Since the superconducting field coils are stationary and embedded in underground tunnels, the mechanical stress generated by their magnetic fields can be contained by the surrounding structure and supported by the earth itself. Thus, by eliminating the stress limitations on the field coils, the field coils can be designed to carry significantly more current than the propulsion coils (i.e., the current density J of the field coils can be designed to be much greater than that of the propulsion coils). Although the actual current densities $J_o$ of the current carrying superconductor will be about the same for propulsion coils and field coils, the conductor to non-conductor cross sectional area ratio of the field coils will be much greater than that of the propulsion coils.

Figure 27:
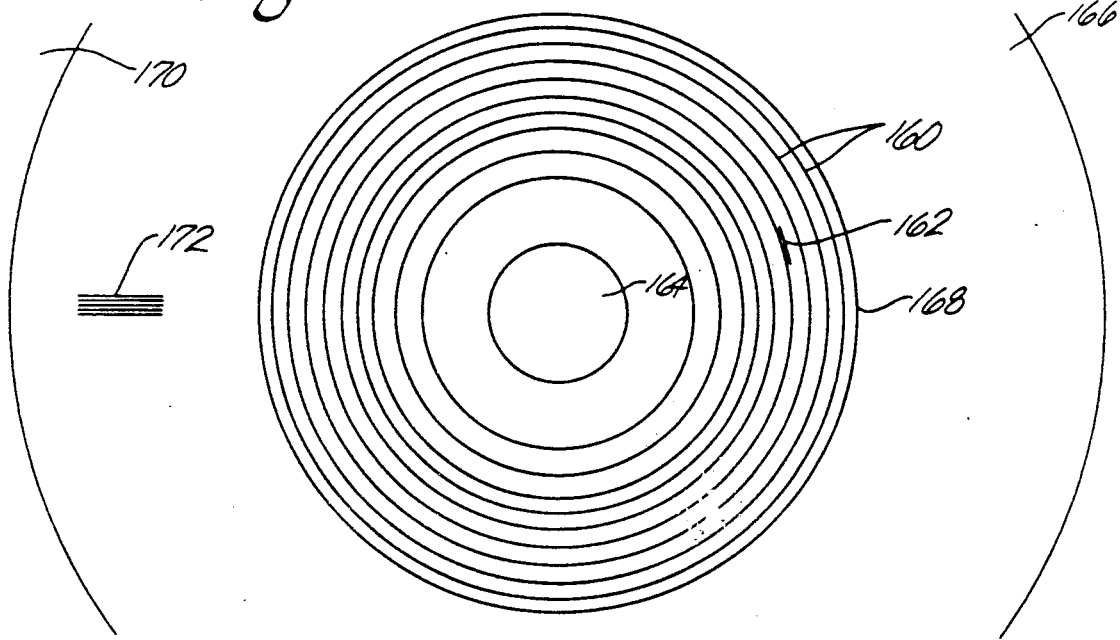
FIG. 27 is a schematic plan view illustrating the field coils in the preferred embodiment and a plurality of annular arrays of photovoltaic solar cells for generating electrical energy.

In order to take advantage of the very favorable scaling laws that are inherent in the magnetic launching system disclosed herein, the preferred embodiment will be very large. In the preferred embodiment there will be ten superconducting field coils 160 (FIG. 27) mounted coaxially in underground tunnels 162 with increasing radii $R_{ij}$ (j=1,2, ..., 10).

In order to obtain a more uniform acceleration for the initial ascent trajectory, these field coils 160 will be concentrated toward the outer coil with a gradually decreasing spacing between adjacent coils determined by the function $2 \times 10^7/R$. Consequently, the radii $R_{ij}$ of the ten field coils will be equal to 10,000 m, 12,000 m, 13,667 m, 15,130 m, 16,452 m, 17,668 m, 18,800 m, 19,864 m, 20,871 m, and 21,829 m. These field coils will all be designed to carry a current $i_{ij}$ equal to $1.5 \times 10^9$ amp. Since the field coils will cover a circular region 44 km (27 miles) in diameter, it will be constructed in some remote, and relatively flat area within the western part of continental United States. (One remote desert region in the north west corner of the state of Nevada would be ideal.) A relatively flat circular central region 164 is provided with a diameter of 10 km, that serves as the launching and landing region The strength of the magnetic field in this region will be 0.6 T (6,000 Gauss).

By employing large scale production facilities, the cost of manufacturing the field coils will be relatively low. For example, studies by John Gilman, at the Lawrence Berkeley Laboratory in Berkeley, Calif. have shown that new ceramic oxide high temperature superconducting material could be mass produced at a cost of only $20/ton if the rate of production were 500,000 ton per year. This cost could be reduced to $2/ton by producing 50,000,000 tons/year. See the article, "The Commercial Potential Of High-$T_c$ Superconductors," *Physics Today*, March 1988, by J. J. Gilman. The cost of producing fused silica glass (which would represent most of the mass of the propulsion coils) could be manufactured at a much lower cost. The underground tunnels would have a maximum depth of about 500 m and could be rapidly excavated by employing ten high speed tunnel boring machines operating simultaneously. The required tunnel diameter would be about 12 or 13 m. The construction of the coils could proceed by automated winding machines that continuously travel around each tunnel with spools of superconducting cable that build up each coil to the required thickness.

Since the local magnetic field on the earth's surface in an annular region 166 surrounding the outer field coil 168 will be many times greater than the earth's natural magnetic field, it will be kept isolated from the more distant surrounding region 170 where the field is not as great. In order to make good use of this isolated region 166, it will be used for generating electric energy via photovoltaic solar arrays. The presence of a magnetic field does not affect the operation of photovoltaic solar cells. Thus, in the preferred embodiment of the invention, a huge annular array 172 of solar cells, 18 km wide with an inner radius of 22 km, and an outer radius of 40 km, is constructed around the outer field coil 168 for generating bulk electric power. This array 172 will cover a total land area of about 3,500 km².

The solar array 172 can be constructed from long continuous sheets of thin film amorphous silicon cells and mounted in rigid, 10 m long by 3 m wide modules produced in huge automated factories to reduce unit cost. The raw materials needed for the production, namely silicon, is the second-most abundant element on earth. Hence, by increasing the scale of the production facilities, it should be possible to construct the array with a unit cost of about $30/m². (See "Photovoltaic Power," *Scientific American* April 1987, pp. 87-92, by Y. Hamakawa.) Thus, the total cost of the array will be about $100 billion with an average operating efficiency of 15% the total amount of electric power that could be generated by the system is 526 GW. Since the solar array can only generate electric power during the daylight hours, the average daily power output of the system will be about 100 GW. This represents about 30% of the entire electric generating capacity of the United States and is much more than required to operate the transportation system. Thus, the complete ground to orbit transportation system envisioned herein also represents a giant solar-electric power generating plant. Since this electric generating system does not burn any combustible or nuclear fuel, and has no moving parts, it would require very little maintenance and it could remain operating indefinitely. The operating cost would be nearly zero. A large portion of the excess power could be fed into the existing U.S. electric power intertie grid for distribution throughout the United States and Canada. Large portions could also be fed into Mexico and other countries via superconducting power transmission lines. This electric power generating capability of the system would therefore enable many thermal electric power plants to be dismantled thereby eliminating atmospheric and thermal pollution caused by these plants. It would also have a substantial beneficial effect on the total U.S, economy since it would not only reduce the national balance of payments, but reverse it on a colossal scale.

The initial construction cost of $100 billion for the array could be recovered by the commercial sale of the electric power generated therefrom. For example, if the average output of the array is 50 GW per year, and if the average commercial sale of the electrical energy is 10¢/KW-hr, the amount of income revenue that could be generated by the array over a one year time period would $44 billion. At this rate the entire cost of the array could be paid in less than 3 years time.

Figure 28:
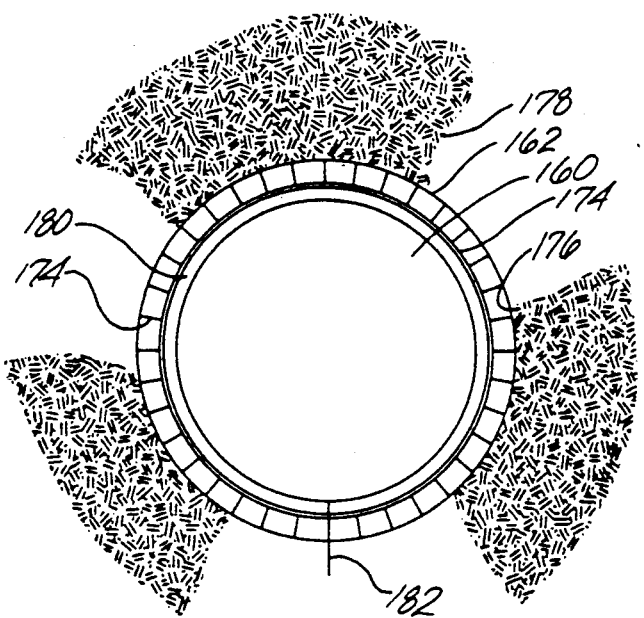
FIG. 28 is a schematic transverse cross section illustrating a superconducting field coil mounted inside an underground tunnel.

Since the solar array 172 can only generate electric power during the daylight hours, the field coils 160 will be utilized as a giant underground superconducting inductive energy storage system for accumulating part of the electrical energy generated during the daylight hours so that it can be released into the power distribution system during the non-daylight hours. Thus, the field coils serves as a giant inductive energy storage system and load leveling system that allows electric power to be fed into the distribution system at any desired rate, 24 hours per day. Since the total amount of inductive energy stored in the field coils is so great, the amount of additional energy put into the system (or withdrawn from the system) represented by the output of the array over five or six days operation is relatively small and will not cause any significant change in the magnetic field. A portion of the inductive energy of the field coils could also be used in national defense. In particular, it could be used for instantly energizing various directed energy weapon systems in a national emergency. This capability would be extremely valuable to our country's critically important SDI program since the engineering feasibility of such beam weapon systems depends largely upon the availability of a sufficiently large power source FIG. 28 is a schematic transverse cross section of a superconducting field coil 160 mounted inside an underground tunnel 162 and supported by a surrounding structure 174. This structure 174 is itself supported by the tunnel walls 176 and the surrounding earth 178. A liquefied nitrogen cryogenic Dewar system 180 is provided for maintaining the coil 160 at liquefied nitrogen temperatures. The coil's minor radius r is designed to be 5.0 m. Hence, it follows from equation (17) that the maximum magnetic field $B_m$ on the surface of the coil will be 60 T. The coil's current density $J = i_1/(\pi r^2) = 1.9099 \times 10^7$ amp/m². (Since the actual current carrying superconducting material will represent about 25% of the superconductor will be about $7.6 \times 10^7$ amp/m²). Current is fed into and withdrawn drawn from the field coils 160 by a plurality of superconducting power transmission mission lines 182 that are connected to the solar array 172; to the microwave power generators of the first transmitter; and to the national intertie power grid.

After the solar array is constructed, the electrical energy generated therefrom would first be used to charge up the ten field coils. If $L_j$ denotes the inductance of the j'th field coil which carries a current $i_1=1.5\times 10^9$ amp, the total electrical energy $E_c$ that would have to be fed into the field coils to charge up the system is given by $$E_c = \tfrac{1}{2} i_1^2 \sum_{j=1}^{n} L_j$$

where $$L_j = \mu_o R_j [\log(8R_j/r) - 1.75]$$

The radius r of each coil is equal to 5 m. Consequently, $E_c=1.98982\times 10^{18}$ Joules. Assuming that the solar array generates an average output of 50 GW per day, it would require a total of 460.61 days (1.26 years) to charge up the field coils. Although this charging time is fairly long, it is reasonable. It would represent an enormous energy reservoir. After the charging up process is completed, almost all of the power generated by the array could be sold to commercial utility companies to generate vast amounts of revenue that could continue indefinitely with very little operating expense.

The total specific energy $\hat{E}_o$ of the electromagnetic ramjet at any velocity V and altitude h above the plane of the field coils is equal to the sum of its kinetic and gravitational potential energy which is given by $$\hat{E}_o = \tfrac{1}{2} V^2 + G\left[\frac{1}{R_e} - \frac{1}{R_e + (h - h_o)}\right] \quad (33)$$

The field coils 160 are designed to lift and magnetically accelerate the ramjet to high altitude at supersonic speed where the atmospheric pressure is sufficiently low to allow the electromagnetic ramjet propulsion system to begin operating with the microwave beam. This altitude will be about 60 km (200,000 ft) where the pressure is 0.2 Torr. Since sonic velocity (Mach 1.0) is about 320 m/sec at this altitude, a velocity of 1,200 m/sec (Mach 3.75) will be sufficient to start the ramjet. Consequently, the specific energy $\hat{E}_o$ corresponding to this end point of the boost phase of the launch trajectory is $1.302928\times 10^6$ Joules/kg (which is obtained from equation (33) with h=60,500 m and $h_o=500$ m.) The altitude above the earth's surface is equal to $h=h_o=60,000$ m.

The total initial specific magnetic launch energy $E_m$ that the ramjet must have in order to lift the vehicle from the earth's surface and accelerate it to the initial point for microwave propulsion is $$\hat{E}_m = \hat{E}_o + \hat{\Delta}_m \quad (34)$$

where $\hat{\Delta}_m$ is equal to the specific magnetic potential energy at an altitude of 60 km. If this altitude is significantly greater than the diameter of the outer field coil, then $\hat{\Delta}_m \approx 0$. However, since this is not the case for the preferred embodiment, $\hat{\Delta}_m$ cannot be ignored. If the total launch mass is $m_t$, then $\hat{\Delta}_m$ can be expressed as $$\hat{\Delta}_m = \frac{\mu_o M_2 S_2}{2 m_t} \quad (35)$$

where $$S_2 = \sum_{j=1}^{n} \frac{i_{1j} R_{1j}^2}{(R_{1j}^2 + h^2)^{1.5}} \quad (36)$$

The required magnetic launch energy $E_m = m_t \hat{E}_m$. Consequently, in view of equation (30), the total launch mass $m_t$ can be expressed as $$m_t = \frac{\mu_o M_2 (S_1 - S_2)}{2 E_o} \quad (37)$$

For the field coils described in the preferred embodiment $h_o=500$ m and $S_1=9.54098\times 10^5$ amp/m and $S_2=1.41324\times 10^4$ amp/m. The magnetic dipole moment $M_2$ corresponding to the six coil electromagnetic ramjet described above is $6.18179\times 10^{13}$ amp m². When these values are substituted into equation (37) the total launch mass $m_t$ is equal to 27,928,651 kg (61,582,675 lbs or 30,791 tons).

Since the total mass of the six dipole coils comprising the electromagnetic ramjet is only 1,639,300 kg, this total launch mass is 17.036 times greater than the total coil mass. Thus, the weight lifting capability of the ramjet's superconducting dipole coils is truly enormous. This launch mass is many times greater than the largest mass ever launched from the earth's surface.

In order to understand how great this launch mass really is, it is helpful to make a comparison—it is actually greater than an average World War II Battleship or an Essex class aircraft carrier. Moreover, all of this launch mass will be accelerated into orbit (or to the moon) by the electromagnetic processes system. Since this will be accomplished by electromagnetic processes by converting electric power into propulsive thrust (with an efficiency approaching 100%) using electrical energy generated by the solar array, the cost will be zero. (Since the electromagnetic ramjet operates in the ionosphere at very high altitudes, the drag forces are essentially zero.)

The total amount of inductive energy that is taken out of the field coils to launch the vehicle will be equal to $m_t \hat{E}_o = 3.6389\times 10^{13}$ Joules. Since this amount of inductive energy represents less than 0.002% of the total inductive energy stored in the field coils, the launch will have virtually no effect on its magnetic field. Moreover, if the solar array is used to replace this energy with a power of 100 GW, it would only require 364 seconds (6.06 minutes).

By combining equations (25), (28), and (37), the "mass ratio" $m_t/m_c$ of the electromagnetic ramjet that is launched by the field coils can be expressed as $$\frac{m_t}{m_c} = \frac{\gamma(S_1 - S_2)}{2\hat{E}_o \rho}\left[\frac{\mu_o \sigma}{\log(8\gamma) - .75}\right]^{\tfrac{1}{8}} \quad (38)$$

which, in view of equation (21) can be expressed to a good approximation by $$\frac{m_t}{m_c} = \frac{.15\gamma(S_1 - S_2)(\mu_o \sigma)^{\tfrac{1}{2}}}{\rho \hat{E}_o} \quad (39)$$

Since the parameters $\sigma$, $\rho$, and $E_o$ are fixed constants, the mass ratio of the ramjet depends only upon the aspect ratio $\gamma$ of its dipole coils. Thus, the mass ratio (weight lifting capability of the ramjet) can be arbitrarily increased to any desired value by increasing the aspect ratio. (For the magnetic propulsion concept introduced herein, the efficiency of the propulsion system increases with increasing mass ratio instead of decreasing with mass ratio as in prior art rocket propulsion systems.)

The velocity V along the initial ascent trajectory at any altitude high above the plane of the field coils can be expressed by the equation $$V = \left( \frac{\mu_o M_2 (S_1 - S_2)}{m_t} - 2G \left[ \frac{1}{R_e} - \frac{1}{R_e + (h - h_o)} \right] \right)^{\frac{1}{2}} \quad (40)$$

The initial ascent trajectory 184 (FIG. 29) of the ramjet 186 into the ionosphere will be along a curve of magnetic induction generated by the field coils 188. This trajectory 184 is vertical at the launch point 190 and becomes parallel to the earth's surface 192 at an altitude of 100 km. However, when the ramjet 186 reaches an altitude of 60 km, the microwave beam from the first transmitter 194 is turned on and the vehicle is propelled by the combined thrust of the field coils 188 and the microwave beam. As the vehicle is accelerated further away from the field coils 188, their propulsive effect gradually decreases. When the vehicle is ascending from the launch point 190 along the ascent trajectory 184 propelled by the magnetic repulsive force of the field coils 188, the longitudinal central axis of the ramjet is maintained tangent to the ascent trajectory (i.e., tangent to the line of magnetic induction) so as to generate maximum repulsive thrust from the field coils.

Omitting the mathematical details it can be shown that a line of magnetic induction generated by the field coils passing through its center will follow a curve that can be represented in polar coordinates by the equation $r = C \sin^2\theta$ 8 where C is a constant. The vertical line passing through the center 190 of the field coils 188 represents the polar axis where $\theta = 0$. The condition that this curve be horizontal to the earth's surface 192 at an altitude of 100 km determines the value of C to be equal to 259.808 km. At this point $\theta = 54.736°$ and $r = 173.207$ km. The curve defined by the equation $r = 259.808 \sin^2\theta$ therefore defines the ascent trajectory from the launch point 190 to the point 196 where it reaches an altitude of 100 km. After the vehicle reaches 100 km, its trajectory remains circular at this altitude until the microwave propulsion is terminated.

When the altitude of the vehicle reaches 60 km, $\theta = 31.330°$, $r = 70.242$ km and the ground track 198 is 36.352 km east of the launch point 190. This is the location of the first microwave transmitter 194. Thus, as is shown in FIG. 29, initially the microwave beam 200 will be pointing vertically upward into the inner dipole coil. The tangent line to the ascent trajectory 184 when the vehicle is directly over the first transmitter makes an angle $\phi = 48.258°$ with the verticle. In order to cancel out the gravitational force acting on the vehicle, the ramjet's thrust vector will have to be inclined upward at an angle $\alpha = 14.968°$ to this tangent line. Hence, the angle between the dipole axis and the incident microwave beam will be $\phi - \alpha = 33.290°$. If the radius of the ramjet's inner dipole coil is $R_{21}$, the initial beam diameter $d_s$ will be equal to $2R_{21} \cos(\phi - \alpha) = 2R_{21} \times 0.8359$ which is nearly equal to the dipole's diameter $2R_{21}$. However, it should be noted that since the electric field vector of the microwave beam 200 is polarized to oscillate in a plane perpendicular to the central magnetic field lines of the ramjet, a strong coupling will result between the microwave beam and the free electrons passing through the resonance region which will pump them into very high energy electron cyclotron resonance orbits without requiring the beam to have a zero angle of incidence. Since the vehicle will be moving at a relatively slow initial velocity (1,200 m/sec) when the microwave propulsion begins, equation (2) shows that the initial beam power P does not have to be very high in order to achieve high propulsive thrust F.

As the vehicle passes over and begins to recede from the first transmitter 194, (FIG. 29) the angle of incidence between the microwave beam and dipole axis begins to decrease thereby enabling the beam diameter to be larger for greater propulsive power. When the vehicle reaches an altitude of 100 km, the vehicle will be 144.845 km from the first transmitter 194, and the beam elevation angle relative to the local horizon will be 43.192°. At this point 196, the dipole axis is inclined to its circular flight path by an angle $\alpha \approx 25°$ so as to provide an upward component for the thrust vector. Thus, the beam diameter $d_s$ at this point 196 will be equal to $2R_{21} \cos(43.192 - \alpha) = 2R_{21} \times 0.95$ which is essentially equal to the inner dipole diameter. Since the vehicle will be moving at suborbital velocities, this upward thrust component will be necessary to maintain the vehicle's altitude. This vehicle flight attitude will also enable the microwave beam to have a nearly zero angle of incidence with the dipole axis thereby allowing a maximum beam diameter and hence maximum power transmission.

The first transmitter 194 continues to transmit prepulsive power until the elevation angle $\epsilon$ of the microwave beam 200 decreases to 10° relative to the local horizon. At this time, the first transmitter 194 is 477.398 km from the vehicle 202 (FIG. 30) and 463.288 km from its ground track 198. At this instant, the first transmitter 194 is turned off and the second transmitter 204 is turned on such that there is no interruption of propulsive power transmitted to the ramjet. In the preferred embodiment, the second transmitter 204 is located 400 km from the first transmitter 194 such that the initial beam elevation angle $\epsilon_1$ of the second transmitter is 57.184° and the range is 118.609 km. As in the case of the first transmitter 194, the second transmitter 204 continues to transmit microwave power until its beam elevation angle $\epsilon_2$ decreases to 10° and the range is 477.398 km. At this instant, the second transmitter 204 is turned off and the third transmitter 206, located 400 km further along the vehicle's ground track, is turned on. The vehicle is accelerated a distance of 406.278 km along its circular flight path 208 while being accelerated by the second microwave transmitter 204. All succeeding transmitters operate with these same characteristics (i.e., maximum power transmission, and initial and terminal beam elevation angles $\epsilon_1, \epsilon_2$ of 57.184° and 10° respectively; beginning and ending beam transmission distances $D_1, D_2$ of 118.609 km and 477.398 km respectively; and a vehicle acceleration distance $s_{12}$ of 406.278 km).

When the second transmitter 204 stops transmitting its propulsive power, the third transmitter 206 takes over in a precisely synchronized power relay operation such that the propulsive thrust generated by the electromagnetic jet is a smooth and continuous process that may involve many transmitters over a very long acceleration flight path 208. This process of transmitting the microwave power by utilizing a series of transmitters 209 positioned at 400 km intervals along the vehicle's ground track 210 continues until the vehicle reaches the required orbital velocity. The ascent, magnetically propelled trajectory, and the microwave propelled trajectory are always assumed to have the same azimuth so that the ground track 210 for each launch remains unchanged. (However, the altitudes may vary to obtain optimal propulsion efficiency.)

In the case of very massive payloads as in the above numerical example, the electromagnet ramjet will require a long acceleration time that extends over several thousand kilometers in order to reach orbital velocities. The flight path 208 (FIG. 30) will take it directly over a large number of microwave power transmitters that are located at 400 km intervals along the ground track. Assuming that the launch point is located in the north east corner of Nevada, the ground track will follow a southeasterly great circle arc across the United States and across the state of Florida. Since the system will be capable of generating extremely high launch velocities if the acceleration path is extended over long distances, the preferred embodiment will be designed to take maximum advantage of this operating feature. Consequently, in the preferred embodiment there will be 17 microwave transmitters constructed along a 6,800 km long ground track that begins in the north east corner of Nevada and extends southeasterly across the United States and West Indies, with the last transmitter located on Barbados Island. Six of the transmitters will be located on a chain of small islands in the West Indies. Since the unit cost of each transmitter system will decrease because of the economics of mass construction, the total cost of these transmitters should not exceed $30 billion.

At this point it is necessary to digress a moment to demonstrate some important operating characteristics of the electromagnetic ramjet. As pointed out above, in order for the vehicle to maintain an altitude of 100 km while it being accelerated by the microwave beam, the thrust vector $\vec{F}_p$ generated by the ramjet must be inclined at some angle $\alpha$ relative to the vehicle's circular flight path in order to cancel out the downward force of gravity. In particular, the vertical upward component $F_{up}$ of the vehicle's thrust vector $\vec{F}_p$ together with the upward centrifugal force $F_c$ must be equal to the downward force of gravity $F_g$. These forces can be expressed as $$F_{up} = F_p \sin \alpha$$

$$F_c = \frac{m_t V^2}{R}$$

$$F_g = m_t g$$

where V is equal to the vehicle's velocity along the circular flight path of radius $R = R_e + 100,000\ m = 6,471,315\ m$ and where the gravitational constant at 100 km altitude is equal to 9.5062 m/sec$^2$.

When the vehicle is moving along the 100 km high circular trajectory 208 propelled by the microwave beam 200, the propulsive power P will always be assumed to be maximum $P_{max}$. As described above $P_{max} = \pi R_{21}^2 P_{max}$ where $P_{max}$ is equal to the maximum power density limit (425 watts/cm$^2$) of the microwave beam set by atmospheric breakdown and where $R_{21}$ is equal to the radius of the ramjet's inner dipole coil. In view of equation (2) the ramjet's propulsive force $F_p$ along the thrust vector can be expressed as $$F_p = \frac{P_{max}}{V_p}$$

where $V_p$ is equal to the vehicle's velocity component along the thrust vector given by $$V_p = V \cos \alpha$$

Therefore, the condition $F_{up} + F_c = F_g$ results in the equation $$\tan \alpha = \frac{m_t}{P_{max}} \left( g - \frac{V^2}{R} \right) V \tag{41}$$

which can be used to determine the angle of inclination $\alpha$. FIG. 31 is a graph of $\alpha$ versus vehicle velocity V corresponding to the above numerical example where $m_t/P_{max} = 2.32417 \times 10^{-5}\ kg/watt$. This inclination is important because it enables the microwave beam that is transmitted from the ground to intercept the coil plane of the ramjet at a nearly perpendicular angle (i.e., nearly broadside) for maximum power reception. Since circular orbital velocity at an altitude of 100 km is 7,843.32 m/sec, $\alpha$ becomes zero when V is equal to this value.

Although the ramjet's propulsive thrust vector $\vec{F}_p$ is inclined to the vehicle's circular trajectory in order to cancel out the downward force of gravity so that it can maintain its altitude, the tangental component $F_t$ of the thrust vector along the trajectory which accelerates the vehicle along the trajectory is not diminished by this fact and is independent of $\alpha$. This can be demonstrated as follows:

The component $F_t$ of the ramjet's thrust vector along the flight path is equal to $F_p \cos \alpha$. However, $F_p = P_{max}/V_p$ where $V_p = V \cos \alpha$. Consequently, $F_t = [P_{max}/(V \cos \alpha)] \cos \alpha = P_{max}/V$. Therefore, the propulsive force generated by the ramjet along the trajectory is independent of $\alpha$ and is equal to that generated when there is no gravitational force and the thrust vector can be directed along the flight path with magnitude given by equation (2).

If $a_c$ denotes the vehicle's acceleration along the circular trajectory, the tangential propulsive force $F_t = m_t a_c = P_{max}/V$. Since $a_c = dv/dt$, this equation gives rise to a simple differential equation which can be solved to determine the time interval T required to achieve a velocity V while accelerating along the circular trajectory under maximum propulsive power. This time is given by the equation $$T = \frac{3(V^2 - V_o^2)}{2K} \tag{42}$$

where $V_o$ is equal to the initial vehicle velocity when it begins moving along 100 km high circular trajectory at point 196 (when T=0) and where K is a constant given by $$K = \frac{3 P_{max}}{m_t} \qquad (43)$$

The distance $s_c$ traversed by the vehicle accelerating along the circular trajectory can be expressed as $$s_c = \frac{V^3 - V_o^3}{K} \qquad (44)$$

Consequently, the vehicle velocity can be expressed as a function of $s_c$ by the expression $$V = [K s_c + V_o^3]^{\frac{1}{3}} \qquad (45)$$

The values of $V_o$ and K will depend upon the particular situation. This will be illustrated by continuing the numerical example given above.

Table 1 is a detailed computer simulation of the magnetically propelled ascent trajectory from launch to an altitude of 60 km corresponding to the above example where the total launch mass $m_t = 27{,}928{,}651$ kg. The various flight paramaters described in the table are:

H = altitude above earth's surface (km)
T = elapsed time from lift off (sec)
$\phi$ = flight path angle (from vertical, deg)
s = distance traveled along ascent trajectory (km)
F = propulsive thrust ($10^6$ N)
P = propulsive power (GW)
a = acceleration (g)
V = velocity (m/sec)
M = Mach number such that it will lift the ramjet (along with the enormous payload mass) off the earth's surface and accelerate it to supersonic speed at a high altitude very rapidly. For example, 28.21 seconds after launch, the vehicle will be at an altitude of 10 km (32,808 ft) and moving nearly vertically upward with a velocity of 995 m/sec (Mach 3.22). At 37.44 seconds after launch, the vehicle will be at 20 km (65,618 ft) and moving at 1,288 m/sec (Mach 4.42). The vehicle essentially leaves the sensible atmosphere 46.00 seconds after launch with a velocity of 1,340 m/sec (Mach 4.39) at an altitude of 30 km (98,425 ft). Relatively little initial magnetic launch energy is lost by aerodynamic drag while traversing through the atmosphere. The system is therefore able to convert initial electrical energy into kinetic and potential energy with an efficieny of nearly 100%. FIG. 32 is a graph of acceleration (g versus altitude H (km) corresponding to this example.

Perhaps the most spectacular parameters in the table are propulsive thru F and propulsive power P. At any altitude of 6 km, the propulsive force is 1,994,000,000$N$ which is more than 60 times greater than the maximum lift off thrust generated by the giant Saturn V Apollo launch vehicle. The corresponding propulsive power is 1,419 GW. This enormous propulsive power is being generated by magnetic repulsive forces acting on the ramjet's superconducting dipole coil by the field coils.

It is important to point out and emphasize that the initial launch trajectory from the earth's surface to an altitude of 60 km described in Table 1, where the ramjet is propelled by the magnetic repulsive forces generated by the field coils, will be the same for each vehicle

TABLE 1

Flight Parameters of A 700 m Diameter Electromagnetic Ramjet Accelerating a Launch Mass of 27,928,651 kg To An Altitude of 60 km at Mach 3.75 By Magnetic Repulsive Forces Generated By 10 Underground Coaxial Superconducting Field Coils

| h | T | $\phi$ | s | F | P | a | V | M |
|---|---|---|---|---|---|---|---|---|
| 0 | 0 | 0 | 0 | 0 | 0 | 0 | 0 | 0 |
| 2 | 14.84 | 7.570 | 2.009 | 1,248 | 338 | 3.563 | 270.67 | 0.794 |
| 4 | 20.02 | 10.748 | 4.035 | 1,812 | 926 | 5.631 | 511.23 | 1.530 |
| 6 | 23.37 | 13.216 | 6.080 | 1,994 | 1,419 | 6.305 | 711.39 | 2.174 |
| 8 | 25.98 | 15.322 | 8.144 | 1,906 | 1,661 | 5.994 | 871.04 | 2.735 |
| 10 | 28.21 | 17.202 | 10.228 | 1,695 | 1,688 | 5.233 | 995.31 | 3.216 |
| 12 | 30.28 | 18.923 | 12.332 | 1,448 | 1,579 | 4.338 | 1090.67 | 3.632 |
| 14 | 32.17 | 20.526 | 14.457 | 1,206 | 1,402 | 3.464 | 1163.12 | 3.998 |
| 16 | 33.97 | 22.039 | 16.603 | 989 | 1,204 | 2.683 | 1217.68 | 4.262 |
| 18 | 35.72 | 23.479 | 18.772 | 805 | 1,013 | 2.020 | 1258.30 | 4.359 |
| 20 | 37.44 | 24.861 | 20.965 | 656 | 845 | 1.488 | 1288.06 | 4.416 |
| 22 | 39.15 | 26.194 | 23.181 | 534 | 700 | 1.053 | 1309.35 | 4.445 |
| 24 | 40.85 | 27.486 | 25.423 | 433 | 574 | 0.694 | 1323.98 | 4.453 |
| 26 | 42.55 | 28.745 | 27.690 | 354 | 473 | 0.417 | 1333.35 | 4.446 |
| 28 | 44.27 | 29.975 | 29.985 | 292 | 391 | 0.201 | 1338.54 | 4.423 |
| 30 | 46.00 | 31.181 | 32.309 | 241 | 323 | 0.023 | 1340.38 | 4.392 |
| 32 | 47.76 | 32.366 | 34.661 | 197 | 263 | −0.127 | 1339.52 | 4.352 |
| 34 | 49.54 | 33.535 | 37.045 | 163 | 218 | −0.239 | 1336.45 | 4.300 |
| 36 | 51.35 | 34.689 | 39.460 | 140 | 186 | −0.312 | 1331.56 | 4.242 |
| 38 | 53.19 | 35.832 | 41.910 | 117 | 155 | −0.383 | 1325.17 | 4.182 |
| 40 | 55.07 | 36.966 | 44.395 | 95 | 126 | −0.451 | 1317.53 | 4.119 |
| 42 | 56.99 | 38.093 | 46.917 | 83 | 109 | −0.483 | 1308.81 | 4.055 |
| 44 | 58.95 | 39.215 | 49.478 | 72 | 94 | −0.511 | 1299.18 | 3.988 |
| 46 | 60.96 | 40.335 | 52.080 | 60 | 78 | −0.542 | 1288.76 | 3.921 |
| 48 | 63.02 | 41.454 | 54.726 | 52 | 67 | −0.558 | 1277.65 | 3.863 |
| 50 | 65.14 | 42.574 | 57.418 | 46 | 58 | −0.570 | 1265.93 | 3.828 |
| 52 | 67.32 | 43.697 | 60.159 | 39 | 48 | −0.582 | 1253.66 | 3.798 |
| 54 | 69.56 | 44.825 | 62.952 | 34 | 42 | −0.585 | 1240.89 | 3.787 |
| 56 | 71.87 | 45.960 | 65.800 | 29 | 35 | −0.591 | 1227.68 | 3.774 |
| 58 | 74.25 | 47.103 | 68.707 | 25 | 30 | −0.590 | 1214.04 | 3.761 |
| 60 | 76.71 | 48.258 | 71.678 | 24 | 29 | −0.578 | 1200.00 | 3.750 |

This table clearly demonstrates that the magnetic field generated by the field coils will exert a tremendous magnetic repulsive force on the electromagnetic ramjet regardless of the ramjet's size or total launch mass. This is because the velocity of a vehicle along this initial portion of the trajectory which is given by equation (40)

is determined only by the ratio of the ramjet's magnetic dipole moment divided by the total launch mass $M_2/m_t$. But in view of equation (37) this ratio is always the same and given by $$\frac{M_2}{m_t} = \frac{2\hat{E}_o}{\mu_o(S_1 - S_2)} \tag{46}$$

Consequently, the acceleration along the initial launch trajectory is always the same regardless of launch mass and is given by Table 1 and described graphically in FIG. 32.

When the vehicle reaches an altitude of 60 km and is moving at 1,200 m/s (Mach 3.75) the electromagnetic ramjet is started by transmitting microwave power from the first transmitter 194 (FIG. 29). The amount of gravitational potential energy represented by the vehicle climbing from 60 km to 100 km (which is equal to 40,000 g) while being propelled by the ramjet will appear as a velocity loss. A small fraction of this loss will be canceled by the remaining magnetic potential energy $\hat{\Delta}_m$ generated by the field coils given by equation (35) which is equal to 19,654.41 m²/sec². This residual magnetic potential energy is equivalent to a gravitational potential energy difference of 2,003.51 m (assuming g=9.81/m/sec²). Consequently, the gravity losses will be equal to that resulting from a climb of 37,996.40 m, which will be equal to a velocity loss of 863.42 m/sec. Therefore, by assuming that the vehicle's initial velocity at the altitude of 60 km is (1,200.00−863.42) m/sec=336.58 m/sec instead of 1,200 m/sec, the combined effects of gravity and the residual magnetic field along the remaining portion of the trajectory can be ignored.

For simplicity, the microwave power will begin at a relatively low level and is gradually increased to give the vehicle a constant acceleration $a_o$ along the remaining portion of the ascent trajectory (from 60 km to 100 km altitude) such that when the vehicle reaches an altitude of 100 km, the microwave power is at its maximum possible level $P_{max}=1.20166\times10^{12}$ watts. Consequently, if $\Delta s$ is equal to the distance the vehicle travels along the remaining portion of its ascent trajectory (from 60 km altitude to 100 km altitude) which is equal to 114,732.50 m, the vehicle's velocity $V_o$ after reaching 100 km altitude will be given by the equation $$V_o = 336.58 \text{ m/sec} + \sqrt{2a_o \Delta s}$$

The vehicle's propulsive force $F_o$ at the beginning of the circular 100 km high trajectory is given by $$F_o = \frac{P_{max}}{V_o}$$

However, at this point the vehicle's acceleration is equal to $a_o$. Consequently since $F_o = m_t a_o$ it follows that $$V_o = \frac{P_{max}}{m_t a_o} \tag{47}$$

By combining these two equations for $V_o$, the required acceleration $a_o$ can be determined by solving the equation $$\frac{P_{max}}{m_t a_o} = 336.58 \text{ m/sec} + \sqrt{2a_o \Delta s} \tag{48}$$

The result is $a_o=18.114$ m/sec². Consequently, $V_o=2,375.32$ m/sec.

With the value $V_o$ determined, it is now possible (via equation 44) to determine the required accelerating distance $s_c$ the vehicle must travel along the circular trajectory 208 in order to reach a desired launch velocity V. For example, if the required launch velocity is 8,000 m/sec, the required distance $s_c=3,862.76$ km. In this case, the vehicle would be accelerated by only 11 of the 17 transmitters. As soon as the required launch velocity is reached, the microwave power transmission is terminated. The time T required to carry out this acceleration process can be determined by equation (42). This time is 678.17 sec (11.303 minutes). The peak acceleration is equal to $a_o$ (which is 1.85 g). After reaching the required launch velocity, the vehicle moves out of the atmosphere along a free-fall trajectory. In order to remain out of the atmosphere during the next orbit revolution, the vehicle has to execute a small propulsive maneuver using onboard propulsion of a few meters per second when passing through its apogee.

FIG. 33 is a graph of velocity V versus acceleration distance $s_c$ given by equation (45) corresponding to this numerical example where $V_o=2,375.32$ m/sec. FIG. 34 is a graph of V versus time T given by equation (42) corresponding to this numerical example.

In view of Table 1, the maximum overall acceleration will occur during the initial portion of the ascent trajectory when the vehicle is propelled by the repulsive magnetic field generated by the field coils. This maximum will be about 6.5 g and will occur when the vehicle is at an altitude of about 6,300 m (20,670 ft) and moving at Mach 2.3. Since this acceleration decreases very rapidly, it could be easily tolerated by human passengers. (The passengers would be lying in a prone position on special acceleration couches designed to enable them to withstand very high acceleration.)

In some situations it may not be possible to propel the vehicle to the required launch velocity during one pass over the transmitters. For example, suppose that the required launch velocity is not 8,000 m/sec, but 11,035.72 m/sec which would be required for a direct flight to the moon. In order to achieve this launch velocity, an acceleration distance $s_c=10,309$ km would be required. However, the system would still be able to give the vehicle the required launch velocity by carrying out two propulsive passes over the microwave power transmitters instead of only one pass.

In order to enable the vehicle to make another propulsive pass over the transmitters, the initial orbit must be such that it will take the vehicle back over the initial ground track over the transmitters at some future time. However, since the earth's surface is moving relative to an earth centered inertial frame by virtue of its rotation, the initial ground track will not be under the vehicle after the vehicle makes one complete revolution in its orbit. The orbital mechanics of the situation are such that in order for the vehicle to pass over the initial ground track at some future time, it must have an orbital period that is a rational fraction of one sidereal day (i.e., its orbital period $P_v$ must be expressible as $(n_1/n_2)P_s$ where $P_s$ is one sidereal day and $n_1$ and $n_2$ are integers). These orbits are called "synchronous orbits". If $n_1=1$, the vehicle will pass over the launch site exactly one sidereal day after it is launched after making $n_2$ complete orbit revolutions. This is the shortest possible time interval between successive pass overs. Thus, the initial orbit of the vehicle will be designed such that its orbital period $P_v = P_s/n_2$ where $p_s = 86,164.099$ seconds and $n_2$ will be some integer $\leq 16$. Since the period $P_v$ of an orbit is related to its semi-major axis a by the equation $$P_v = 2\pi \sqrt{\frac{a^3}{G}}$$

each integer $n_2$ corresponds to a unique value of a synchronous orbit's semi-major axis $a_n$ that is determined by the equation $$P_v = 2\pi n_2 \sqrt{\frac{a_n^3}{G}}$$

Each of these values corresponds to a unique launch velocity $V_n$ given by $$V_n = \sqrt{G\left(\frac{2}{R_o} - \frac{1}{a_n}\right)}$$

where $R_o = 6,471,315$ m, and each of these launch velocities corresponds to a required acceleration distance s given by equation (44).

For example, if $n_2 = 16$, then $a_n = 6,637,660.85$ m, $V_n = 7,940.990$ m/sec and $s_c = 3,775.63$ km. If $n_2 = 15$, then $a_n = 6,929,483.65$ m, $V_n = 8,098.463$ m/s and $s_c = 4,011.03$ km. If $n_2 = 2$, then $a_n = 26,550,643.40$ m, $V_n = 10,394.29$ m/sec and $s_c = 8,596.42$ km. Since this distance exceeds the maximum acceleration distance of the electromagnetic ramjet, $n_2 = 2$ is too small. If $n_2 = 3$, then $a_n = 20,261,933.10$ m, $V_n = 10,167.97$ m/sec and $s_c = 8,040.40$ km. Hence this value of $n_2$ is also too small. Values of 4 and 5 are also too small for $n_2$. However, if $n_2 = 6$, then $a_n = 12,764,218.01$ m, $V_n = 9,583.66$ m/sec and $s_c = 6,715,49$ km which is within the maximum 7,000 km long acceleration distance. The best design strategy is to choose the initial synchronous orbit having the smallest eccentricity so that the ramjet will stay within the atmosphere over a long distance during its second pass over the transmitters. Therefore, the integer $n_2 = 16$ is selected. Since the earth's rotation will given the vehicle an additional 368.76 m/sec relative to an earth centered inertial frame, the actual launch velocity needed to achieve this synchronous orbit will be $(7,940.99 - 368.76)$ m/sec = 7,572.23 m/sec. The required acceleration distance $s_c = 3,259.88$ km.

After the vehicle is launched onto this $n_2 = 16$ synchronous orbit (with an eccentricity $e = 0.02506$) it will reach an apogee altitude (one-half revolution later) of 432.69 km. It will then make another half revolution and pass through its perigee point at an altitude of 100 km. Atmospheric drag will be very small and probably could be disregarded. However, if experience shows that this drag cannot be neglected, its effect can be canceled by increasing the initial launch velocity a small amount such that after 16 complete revolutions, the vehicle passes directly over the initial ground track and over the microwave power transmitters.

The initial velocity $V_o$ corresponding to the second ramjet propulsive maneuver will be equal to the initial launch velocity, which is 7,572.33 m/sec. Taking into consideration the effect of the earth's rotation, the required launch velocity for a direct trajectory to the moon is equal to $(11,035.72 - 368.76)$ m/sec = 10,666.96 m/sec. Consequently, the required acceleration distance needed to reach this velocity corresponding to the second pass over the microwave power transmitters is 6,039.35 km. It will be completed in 655.94 seconds (10.93 minutes). The vehicle acceleration at the beginning and end of this second propulsive maneuver is 5.682 m/sec$^2$ (0.579 g) and 4.045 m/sec$^2$ (0.412 g) respectively. The trip to the moon would take 2.1 days.

It is important to point out the fact that since the acceleration path over the microwave transmitters takes place in a fixed plane relative to the earth's surface, the launch trajectory to a particular target and intercept point will have to satisfy this condition. In particular, the latitude $\phi_o$ and azimuth angle $\beta_o$ of the launch point will depend upon the launch velocity. For example, low launch velocities will probably have a launch point over the United States, while high launch velocities may require a long accelerating distance that ends near Barbados Island with a latitude of only 11°.

If $\gamma_{01}$ represents the free-fall transfer trajectory's sweep angle between the launch point and the target intercept point relative to an earth centered inertial frame, the declination angle $\delta_1$ at the intercept point is determined by the equation $$\sin \delta_1 = \sin \phi_o \cos \gamma_{01} + \cos \phi_o \sin \gamma_{01} \cos \beta_o \quad (49)$$

In the case of the lunar transfer trajectory given in the above example, $\phi_o = 12°$, $\beta_o = 124°$ and $\gamma_{01} = 169.2°$. Consequently, the declination angle of the intercept point will be equal to $-17.862°$. Since the moon's declination angle is constrained by its orbital motion to lie within the range $\pm 28.5°$, the above described transfer trajectory could be easily accomplished with the electromagnetic ramjet accelerating system. (A detailed mathematical discussion of earth to moon free fall trajectories can be found in the book *Fundamentals of Astrodynamics*, Dover Publications, Inc. 1971, by Roger Bate.)

The vehicle would approach the moon with an asymptotic approach velocity of 1,198 m/sec. It could go into orbit around the moon by executing a retro propulsive maneuver using its onboard chemical rocket engines. For example, if the desired orbital altitude is 100 km, the vehicle would approach the moon along a hyperbolic trajectory to within 100 km and execute a $\Delta V$ retro maneuver of 968.39 m/sec. Assuming that the onboard chemical rocket propulsion system has a specific impulse of 490 sec (with an exhaust velocity of 4,806.9 m/sec) the amount of rocket propellant consumed during this retro propulsive maneuver would be 5,095,914 kg. Although this represents a very large amount of propellant, it is a relatively small fraction of the vehicle's actual payload. This payload (which would be about 20,000 tons) could be transferred down to the moon's surface by a fleet of relatively small lunar excursion molecules. (The propellant used to operate these vehicles could be manufactured from lunar material.)

After the payload is removed from the vehicle, the vehicle could accelerate out of lunar orbit and return to earth by means of its ECR propulsion system using the inductive energy stored in the ramjet's superconducting dipole coils. Since the ECR propulsion system will be capable of generating a much higher specific impulse than the chemical propulsion system, a significant saving in propellant mass can be achieved by using the ECR engine. Moreover, since it will be desirable to discharge the ramjet's dipole coils before reentering the earth's atmosphere in order to eliminate magnetic torque generated by the earth's magnetic field, it is very convenient to discharge the dipole coils by using the inductive energy to power the ECR engine.

Let $P_e$ denote the propulsive power generated by the ECR system. If $u_e$ denotes the exhaust velocity, the rate of propellant mass flow $\dot{m}_e$ is given b $$\dot{m}_e = \frac{2P_e}{u_e^2} \quad (50)$$

For any given propulsive power $P_e$, the rate of propellant mass flow $\dot{m}_e$ can be increased or decreased by decreasing or increasing the exhaust velocity $u_e$ respectively. The amount of propellant $m_p$ used to carry out the propulsive maneuver is given by $$m_p = \dot{m}_e T_e \quad (51)$$

where $T_e$ is equal to the time interval required to carry out the propulsive maneuver. Consequently, the required velocity increase $\Delta V$ can be expressed as $$\Delta V = u_e \log\left(\frac{M_1}{M_1 - \dot{m}_e T_e}\right) \quad (52)$$

where $M_1$ is equal to the total vehicle mass before the propulsive maneuver. In view of equation (50) this equation can be expressed as $$\Delta V = u_e \log\left(\frac{M_1}{M_1 - (2P_e T_e / u_e^2)}\right) \quad (53)$$

The product $P_e T_e$ in equation (53) is equal to the amount of propulsive energy used to carry out the maneuver. The exhaust velocity $u_e$ of the ECR propulsion system will be designed such that the ramjet's dipole coils are completely discharged when the required $\Delta V = \Delta V_r$ is achieved. (For the lunar mission $\Delta V_r = 968.39$ m/sec.) Consequently, if $\eta_e$ denotes the overall efficiency of the ECR engine, the required exhaust velocity $u_e$ can be determined by solving the equation $$\Delta V_r = u_e \log\left(\frac{M_1}{M_1 - (2\eta_e E_c / u_e^2)}\right) \quad (54)$$

where $E_c$ is equal to the total inductive energy of the dipole coils given by equation (32). Suppose $M_1 = 3,000,000$ kg and $\eta_e = 0.90$. Therefore, since $E_c = 9.455 \times 10^{12}$ Joules, the exhaust velocity $u_e$ required to return the vehicle back to earth with $\Delta V_r = 968.39$ m/sec using all of the inductive energy stored in the dipole coils would be equal to 6,318.57 m/sec. (This corresponds to a specific impulse of 644 sec.) The expelled propellant mass $m_p = 426,281$ kg. If the propulsive power of the ECR engine were 3 GW, the corresponding rate of propellant mass flow $\dot{m}_e = 150.28$ kg/sec, and the time $T_e$ required to carry out the maneuver would be equal to 2,836.50 sec (47.28 minutes). If chemical rocket propulsion were used to carry out the $\Delta V_r$ maneuver, the required propellant mass would be 547,387 kg. Consequently, by using the ECR propulsion system instead of the chemical propulsion system, a propellant mass saving of 121,106 kg will achieved.

The vehicle returns to earth along an eccentric trajectory having a perigee altitude that dips into the earth's upper atmosphere. This altitude is designed to be sufficiently low to enable the vehicle to be decelerated to suborbital velocity by atmospheric breaking. Since the vehicle's mass will be relatively low, this initial deceleration will be relatively easy. After the vehicle is decelerated to suborbital velocity, the deceleration process can be very gradual, extending over several thousand kilometers so as to avoid excessive aerodynamic heating. Guidance and control of the vehicle are accomplished automatically via computerized navigation and flight control systems. After the vehicle is decelerated via aerodynamic breaking to a relatively low velocity, it executes a controlled glide to the landing area (i.e., launch site) and makes a final descent along a line of magnetic induction generated by the field coils. The resulting magnetic repulsive forces allow the vehicle to be decelerated such that its vertical velocity is exactly zero at the instant it makes contact with the landing-/launching platform. The vehicle's aerodynamic control surfaces, dive brakes, attitude control gyros and reaction thrusters provide a high level of vehicle control to enable it to land automatically with very high precision.

Although the dipole coils of the electromagnetic ramjet are discharged when it reenters the atmosphere, they are partially recharged by the inductive coupling with the field coils. This creates magnetic repulsive forces between the ramjet and the field coils that allows the vehicle to be magnetically decelerated as it approaches the launch site, and descends for a vertical landing.

Since the space transportation system made possible by the electromagnet ramjet propulsion concept disclosed herein allows vast quantities of payload to be transported from the earth's surface directly to the moon, it will be possible to construct a system of superconducting field coils, similar to that described for the earth, on the moon so that vehicles could be decelerated by magnetic repulsive forces and land directly on the moon's surface. It is instructive to describe the required magnetic field that would have to be generated by the superconducting coils.

If the vehicle on the above described lunar transfer trajectory were allowed to free-fall onto the moon's surface without any retro propulsion, the impact velocity $V_m = 2,658.63$ m/sec. Consequently, if lunar field coils are used to decelerate the vehicle by magnetic repulsive forces such that its velocity is zero immediately prior to making contact, the total amount of specific kinetic and potential energy $E_o$ that must be converted into specific magnetic potential energy is given by $$\hat{E}_m = \hat{E}_o = \tfrac{1}{2} V_m^2 = 3.5341469 \times 10^6 \text{ Joules/kg}$$

The total magnetic potential energy $E_m = m_t \hat{E}_m$. If $B_m$ represents the magnetic field strength at the center of the field coils, the magnetic potential energy $E_m = M_2 B_m$ where $M_2$ represents the magnetic dipole moment of the electromagnetic ramjet. Consequently, the central magnetic field strength of the field coils can be determined by $$B_m = \frac{m_t E_o}{M_2}$$

Assuming that the magnetic dipole moment of the electromagnetic ramjet remains unchanged with a value of $6.18179 \times 10^{13}$ amp m$^2$, the required magnetic field strength of the lunar field coils will be 1.59669 T (15,966.9 Gauss). Thus, the superconducting coil system would have to be larger than the one described for the earth. However, if such a system were constructed and put into operation it would represent the ultimate in transportation efficiency. Since there is no atmosphere on the moon, nearly 100% of the total kinetic energy of a vehicle being decelerated to a gentle landing on moon's surface will be converted into electrical energy and stored inductively in the coils by the inductive coupling between the magnetically decelerated dipole coils of the ramjet and the field coils. This energy can therefore be used to launch the vehicle back to earth. However, since the mass of the vehicle returning to earth will be significantly lower than its arrival mass, the system will generate vast amounts of electrical energy that could be used to launch many magnetically propelled vehicles with payloads taken from the moon for other destinations. Such a system would be very versatile because unlike prior art electromagnetic accelerators designed for the moon's surface that require a long accelerating track with a fixed launch azimuth, this electromagnetic accelerating system does not require any accelerating track and will provide any launch azimuth desired. It will also be much safer since the vehicle being accelerated does not have to move near any stationary body (such as a guide rail or drive coils) where any accidental contact could result in a catastrophic disintegration of the entire system.

In order to determine the actual payload mass $m_{pay}$ that could be delivered to the moon in the above example, the total mass of the ramjet propulsion system and connecting cables must be determined. Since the structural mass of the airfoil surround the propulsion coils, including all internal components except the coils themselves, will have a mass equal to about 25% of the total coil mass, this mass will be about 410,000 kg. The airfoils will have a chord of about 4.3 m and a thickness of about 60 cm (20 in). The total mass of the radial airfoils (FIG. 18) will be approximately 25,000 kg. Thus, the total mass of the electromagnetic ramjet $m_r$ will be equal to about 2,074,300 kg. Therefore, the total mass $m_o$ that will be accelerated by the ramjet will be about 25,854,400 kg. Since the maximum acceleration $a_m$ (including 1.0 g from gravity) will be 7.6 g, the corresponding maximum accelerating force $F_m = m_o a_m = 1.902 \times 10^9$ N. Assuming that the total length of the central fuselage 108 is 400 m (1,312 ft) and is attached to the ramjet in a central position such that the fuselage extends 200 m on each side of the ramjet's coil plane, the supporting cables 110 attached to the inner airfoil and the rear of the fuselage 108 will make an angle of 56.3° with the central longitudinal axis of the ramjet. Consequently, the total tension $F_t$ acting on these cables 110 when the vehicle is under maximum acceleration $a_m$ will be equal to $F_m/\cos 56.3° = 3.429 \times 10^9$ N. If $A_t$ denotes the total cross sectional area of these cables and $\sigma$ denotes the tensil strength, then $\sigma A_t = F_t$. Assuming that the supporting cables are constructed with high strength fused glass fibers where $\sigma = 1.4 \times 10^{10}$ N/m$^2$, the required cross-sectional area $A_t = 3.429 \times 10^9$ N/$1.4 \times 10^{10}$ N/m$^2 = 0.2449$ m$^2$. The length of the cables will be $[300^2 + 200^2]^{\frac{1}{2}} = 500$ m. Therefore, since the density $\rho = 2,160$ kg/m$^3$, the total mass of these cables will be 500 $A_t \rho = 264,514$ kg. Thus, the total mass $m_{cab}$ of all the supporting cables attached to the fuselage will be about 300,000 kg.

If the fuselage 108 is cylindrical with a maximum diameter of 30 m (98 ft) and is constructed with high strength composite material with a mass density of 3,000 kg/ms, the total empty mass $m_f$ of the fuselage 108 will be about 700,000 kg. Consequently, if the total propellant mass $m_p = 5,600,000$ kg, the total payload mass $m_{pay}$ that could be delivered to the moon in the above numerical example would be $m_{pay} = m_t - m_r - m_{cab} - m_f - m_p = 19,254,400$ kg (42,456,000 lbs or 21,300 tons).

It is estimated that in the future, the lowest cost of transporting payloads to the moon from the earth's surface will be about \$25,000/lb using the most efficient prior art propulsion systems. Hence, it would cost over one trillion dollars (\$10$^{12}$) to deliver the same amount of payload mass $m_p$ as described in the example. Using the electromagnetic ramjet propulsion system disclosed herein, this cost would be essentially zero. The electromagnetic ramjet propulsion system would also be much more reliable than any prior art propulsion system because the engine has no moving parts and burns no combustible fuel.

There is another economic aspect which will have a profound impact on the SDI Program. The current planning for SDI payloads calls for 50 million pounds to be orbited at a total launch cost of \$130 billion. The electromagnetic propulsion system envisioned herein will be easily capable of delivering all of this payload in a single launch at zero cost. Moreover, the propulsion system will also be capable of transporting extremely large and bulky SDI payloads that could be completely assembled and tested on the ground before being transported to orbit as a single unit. This would eliminate the very tedious, costly, and time consuming process of having to assemble large SDI systems in orbit by transporting small components piece by piece.

The electromagnetic ramjet propulsion system could easily launch a huge fully assembled space station that is even larger and more elaborate than the giant toroidal design illustrated in Arthur C. Clarke's famous science fiction novel "2001 Space Odyssey"—fully manned with a crew of several hundred. In these ultra large payloads, an outer ablative protective jacket could be mounted around the hull that is designed to protect it while traversing through the atmosphere at high speed. (It could be enclosed in a detachable structure while being transported to orbit.) FIGS. 35 and 36 are schematic longitudinal and transverse verse cross sections illustrating how a fully assembled 25,000 ton toroidal space station 212 with a major and minor radius of 325 m and 20 m respectively, is attached to an electromagnetic ramjet 214 via detachable cables 216. This toroidal space station 212 is equipped with two, 250 m long, 30 m diameter, central column cylinders 218 that are connected to the central hub 220 of the space station via swivel joints so as to remain stationary while the toroidal hull is rotating to provide an artificial earth-like gravitational field for the inhabitants by centrifugal force. Three relatively small 4 m diameter spoke cylinders 222 connect the hub 220 with the toroidal hull. When the ramjet transports the space station to a certain altitude, the calbes 216 are detached from the ramjet, and the ramjet returns to the launch site without any central structure. The space station is equipped with a plurality of ECR propulsion systems that maneuver the station to a desired final orbit. The design of the space station could be similar to the one disclosed in my U.S. Pat. No. 4,730,797, entitled "Inflatable Core Orbital Construction Method and Space station," filed Aug. 12, 1985.

FIG. 37 is a schematic longitudinal cross section of the electromagnetic ramjet 214 attached to a fully assembled toroidal space station 212 prior to launch. The space station 212 is assembled inside a large subsurface cylindric cavity 224 that is 220 m deep with a diameter of 700 m. The electromagnetic ramjet 214 is positioned around the rim 226 of the cavity 224 on a plurality of movable launching/landing platforms 228. The main connecting cables 230 are positioned between the platforms 228. When the space station is launched vertically upward, the platforms 228 simultaneously swing away from the rim 226 of the cavity 224 so that the ramjet can lift the space station upward by magnetic repulsive forces acting between its superconducting dipole coils and the surrounding superconducting field coils. The platforms 228 are fitted with superconducting current carrying cables 232 that charge up the ramjet coils prior to launch and discharge the coils after a landing. The toroidal hull 234 of the space station 212 can be constructed inside the cavity 224 using the method described in my U.S. Pat. No. 4,730,797. The two column cylinders 236,238 and all of their internal structures and systems can be constructed outside the cavity 224 and transported into it via large diameter underground access tunnels 240. A plurality of large underground subassembly workrooms 242 are provided around the cavity 224. All of the walls of the tunnels, workrooms, and cavity are fitted with superconducting shielding coils 244 which prevent the magnetic field of the surrounding field coils from entering the work areas.

It should be noted that although magnetic shielding is provided to prevent the surrounding magnetic field generated by the field coils from entering the underground facilities of the launch complex, there is no medical evidence indicating that exposure to 6,000 Gauss magnetic fields is biologically harmful. See "Human Tolerance to Magnetic Fields," *Astronautics,* March 1962 by D. E. Beischer. However, in order to minimize the risk of such exposure, some personnel working inside the underground launch complex can be provided with flexible suits that are designed to keep out a magnetic field.

A superconducting dipole coil 246 is mounted inside a tunnel 248 near the rim 226 of the cavity. This coil 246 is designed to generate a relatively weak local magnetic field with variable strength so as to assist in guiding the ramjet 214 to a precise landing on the landing/launching platforms 228.

Large toroidal space stations represent ideal payloads for the electromagnetic ramjet because the area inside the circular periphery of a toroidal space station provides a large, relatively unobstructed central region 249 (FIG. 36) for low density atmospheric gas to pass through the ramjet. Other payloads such as the 400 m long cylindrical central body 108 (FIGS. 18,19,20) can also be introduced into the cavity 224 and attached to the electromagnetic ramjet 214 via detachable connecting cables. In this case, the central body would be brought into the cavity in two completely assembled sections, (loaded with payloads) and joined together inside the cavity 224 in a vertical position. This central body may contain two completely assembled self-refueling interplanetary transfer vehicles for carrying out ultra high speed interplanetary voyages around the entire solar system. Since these vehicles generate their own propellant while undergoing decelerating propulsive maneuvers, they never have to be refueled with propellant from external sources. The ability to launch fully assembled self-refueling interplanetary transfer vehicles would open up the entire solar system for manned exploration and eventual colonization. (See "A Generalized Theory of Classical Rocket Propulsion For Future Space Travel," *Journal of the British Interplanetary Society,* Vol. 40, No. 8, August 1987, pp. 341–352.)

In the practical application of the proposed ground to orbit space transportation system using the electromagnetic ramjet, it is important to consider the strength of the magnetic field generated by the field coils at various distances on the earth's surface. The field strength inside the central region 164 (FIG. 27) will be nearly constant and (for the preferred embodiment) equal to 0.6 T (6,000 Gauss). For distances D from the center that are outside the outer field coil 168, the magnetic field strength is given by $$B = \frac{\mu_o}{4D^3} \sum_{j=1}^{n} i_{1j} R_{1j}^2$$

For the particular field coils in the preferred embodiment $$B = \frac{1367.8 \ (T \, km^3)}{D^3}$$

where D is the distance in kilometers. Thus, the field strength in the region surrounding the field coils decreases very rapidly, inversely with the cube of the distance from the center. For example, at a distance D=30 km (8.17 km from the outer field coil 168) the ground field is 0.0507 T (507 Gauss). At a distance D=50 km (28.17 km from the outer field coil) the ground field 0.0103 T (103 Gauss). At a distance of 100 km from the outer field coil, the ground field would only be 8 Gauss. These correspond to very weak magnetic fields and would be essentially imperceptible. At distances greater than about 400 km, the ground field would be less than the earth's natural magnetic field. The annular region close to the outer field coil where the magnetic field strength is high is occupied by the solar array 172 which is unaffected by the field. FIG. 38 is a graph of the magnetic field strength (Gauss) generated by the field coils on the earth's surface versus distance from the center D (km) for the preferred embodiment.

The strength of the magnetic field at various altitudes h above the center of the field coils is given by $$B = \frac{\mu_o}{2} \sum_{j=1}^{n} \frac{i_{1j} R_{1j}^2}{[R_{1j}^2 + h^2]^{1.5}}$$

In the preferred embodiment of the field coils, the magnetic field strength at an altitude of 100 km directly over the center of the field coils would be 26 Gauss. At an altitude of 200 km, the field would only be 3 Gauss, and at an altitude of 500 km, it would only be 0.2 Gauss (which is approximately equal to the earth's natural magnetic field at this altitude). Thus, the region in space directly above the field coils 134 would be very weak at orbital altitudes. Consequently the field coils will not affect any artificial satellites moving in orbit above them. This is a beautiful situation as it allows the field to be relatively strong in a region where it is needed to lift the electromagnetic ramjet off the earth's surface and accelerate it to supersonic speed at a sufficiently high altitude to enable it to be accelerated by the microwave beam, but it decreases very rapidly beyond this region where it is no longer needed. FIG. 39 is a graph of the magnetic field strength in space directly above the field coils versus altitude.

Since the microwave power generating and transmitting stations are designed to transmit a maximum beam power of 10,000 GW ($10^{13}$ watts), it is possible to construct a much larger electromagnetic ramjet to take full advantage of this enormous power capability. It will be instructive to carry out this calculation as it will provide additional teaching as to how the various equations developed herein are applied in the actual design of an electromagnetic ramjet. The radius $R_{21}$ of the inner dipole coil of a multicoil electromagnetic ramjet designed to operate with the maximum $10^{13}$ watt microwave beam is determined by the equation $$\pi R^2_{21} \rho_{max} = 10^{13} \ W$$

where $\rho_{max}$ is equal to the beam's power density at the onset of atmospheric max breakdown, which is 425 w/cm$^2$. Hence, $R_{21} = 865.4$ m. Suppose that the ramjet has ten coaxial superconducting dipole coils with 10 m spacing between adjacent dipoles and that the magnetic field strength at the center generated by each coil is equal. Consequently, since the total strength of the magnetic field inside the inner dipole coil must be equal to 0.3572 T in order to generate electron cyclotron resonance with the 10 GHz microwave beam (as determined by equation 1) the central field of each dipole coil is equal to 0.03572 T. Upon substituting this value for $B_o$ into equation (18), the aspect ratio $\gamma$ of each coil in the ramjet will be equal to 3,772.0. The total magnetic dipole moment $M_2$ of the electromagnetic ramjet can now be calculated by equation (28). The result is $M_2 = 1.35167 \times 10^{15}$. The total launch mass $m_t$ can now be calculated from equation (37). The result is $m_t = 611,023,607$ kg. Since the total mass $m_c$ of the dipole coils is 22,679,413 kg, this launch mass is a factor of 26.9 times greater than the coil mass. In the previous example, this "mass ratio" was 17.0. It is greater in this example because the aspect ratio $\gamma$ of the dipole coils is greater than in the previous example (3,772.0 instead of 2,324.1). As is demonstrated by equation (38), the greater the aspect ratio, the greater the mass ratio (i.e., weight lifting efficiency).

Assuming that this mass is boosted to the 100 km high circular accelerating orbit along the same ascent trajectory as in the previous example, the initial velocity $V_o$, determined from equation (47) and (48) will be 1,786.46 m/sec The initial acceleration $a_o$ along the circular accelerating orbit will be equal to 9.1611 m/sec$^2$(0.934 g). In order to reach orbital velocity (7,843 m/sec), the ramjet would have to accelerate the vehicle a distance of 8,419 km, which is obtained from equation (44). Since the maximum acceleration distance in the preferred embodiment is 7,000 km, it will not be possible to accelerate the launch mass to orbital velocity. The maximum mass that could be accelerated to orbit velocity with the preferred embodiment can be calculated by determining the value of K in equation (44) where $s_c = 7 \times 10^6$ m, $V = (7,843 - 370)$ m/sec $= 7,473$ m/sec and $V_o = 1,786$ m/sec. The result is $K = 58.805$ w/kg. Consequently, it follows from equation (43) that the maximum possible vehicle mass $\overline{m}_t = 3 \ P_{max}/K = 510,156,788$ kg. Since the total mass of the ramjet's 10 dipole coils is 22,679,413 kg, and since the total mass of the ramjet's airfoils and all internal systems is assumed to be equal to 25% of the total coil mass, the total mass of the ramjet would be 28,349,266 kg. Hence, the total mass that could be transported to low earth orbit with this system would be equal to 481,807,522 kg (1,062,385,586 lbs or 531,193 tons). Since the ground to orbit transportation cost for the Space Shuttle is $2,000/lb, it would cost $2.125 trillion to orbit this amount of payload in that prior art system—and it would be in the form of 16,000 small pieces! Moreover, at a rate of one Shuttle launch every week, it would require over 300 years to deliver it. (By using the proposed scramjet propelled aerospace plane the cost could be reduced by one order of magnitude, but it would still require over a hundred years to deliver it—piece by piece.)

Although the capability of orbiting huge payloads with a mass of this magnitude may appear to be beyond any conceivable practical application, I do not believe this is the case. A ground-to-orbit transportation system with this capability would enable giant sized, completely assembled, toroidal habitats to be transported into orbit along with all of its inhabitants that may number in the tens of thousands.

The possibility of developing a ground-to-orbit transportation system having this capability is so remote in the prior art of astronautics that it is not even discussed in science fiction novels. However, the present disclosure introduces such a system that is well within present engineering feasibility. It is made possible by the electromagnetic ramjet propulsion concept and the recent developments in high temperature superconducting material which makes it possible. (Superconducting cable constructed with new ceramic high temperature superconducting material with critical temperature above liquid nitrogen is already being manufactured on a commercial basis. See "Superconducting Wire," *Popular Science*, March 1989, p. 17.)

The above example describes the performance capabilities of the most powerful electromagnetic ramjet that could be used in the preferred embodiment of the invention. It is therefore instructive to consider the performance capability of a ramjet having the smallest inner dipole diameter. This diameter is 61 m and is set by the minimum beam diameter at an assumed maximum range of 500 km. In this case $R_{21} = 30.5$ m. Consequently, the ramjet's maximum propulsive power $P_{max} = \pi R_{21}^2 \rho_{max} = 1.242 \times 10^{10}$ w (12.42 GW). It will be assumed that this ramjet has 3 dipole coils separated by 2 m intervals with equal aspect ratio $\gamma$. Hence, $R_{22} = 32.5$ m and $R_{23} = 34.5$ m. In order to generate the 0.3572 T central magnetic field that is required for electron cyclotron resonance with 10 GHz microwave beam, each of the three coils must generate a central magnetic field $B_o = 0.11907$ T. Hence, the aspect ratio of each coil will be 1,205.7 which is obtained by equation (18). The ramjet's total magnetic dipole moment $M_2 = 6.17777 \times 10^{10}$ amp m$^2$ (which is obtained by equation 28). The total launch mass $m_t = 28,003$ kg (which is obtained from equation 37). Since the total coil mass $m_c = 3,043$ kg, the mass ratio $m_t/m_c = 9.20$. This mass ratio can also be obtained directly from equation (38). The total ramjet mass will be about $m_c + 0.25\, m_c = 3,804$ kg. Hence, the non-ramjet payload mass will be 24,199 kg.

Assuming, as in the previous examples, that the vehicle is accelerated to the 100 km high circular accelerating trajectory along the same ascent trajectory, the initial velocity $V_o = 4,895.90$ m/sec and the initial acceleration $a_o = 90.59$ m/sec$^2$ (9.23 g) which is obtained from equations (47) and (48). In order to reach an orbital velocity of 7,843 m/sec (which would require a launch velocity of 7,493 m/sec because of the earth's rotation) the ramjet would only have to accelerate the vehicle a distance of 228 km along the circular flight path, which is obtained from equation (44). Hence, only the first microwave transmitter would be used in this case. (More than half of the required orbital velocity would be obtained while climbing along the initial ascent trajectory). Since the initial launch trajectory between lift-off and 60 km altitude is the same for every vehicle regardless of its mass (because the ratio $M_2/m_t$ which determines the launch trajectory given by equation (46) is unchanged) the vehicle's maximum acceleration will be 9.23 g. Although this acceleration is rather high, it is still within the limits of human toleration. (It could be easily lowered by reducing the propulsive power.) Consequently, since this smallest ramjet propelled vehicle would have the highest acceleration, every ramjet propelled vehicle in the preferred embodiment of the invention would be capable of transporting human passengers. However, these very small ramjet propelled vehicles would be ideal as automated unmanned ground to orbit supply vehicles.

Since any number of electromagnetic ramjets could be used to accelerate payloads into orbit (one at a time) by the same field coils and microwave transmitters, the ground-to-orbit transportation system envisioned herein is very large and includes many individual ramjets of various sizes. FIG. 40 is an enlarged schematic plan view of the central 10 km diameter launching/landing region 250. The center of this region contains 7 launching/landing terminals 252 designed for the largest ramjets with inner and outer dipole diameters of 1,731 m and 1,911 m respectively. These terminals are surrounded with other launching/landing terminals 254 using smaller ramjets. The smallest ramjets have an inner dipole diameter of 61 m and use the smallest outer launching/land terminals 256. A network of underground access tunnels 258 connect the various terminals. Passengers could be transported to and from various launching/landing terminals via high speed trains operating in some of the underground tunnels 258.

The field coils 160 (FIG. 27) may also have many other embodiments. For example, if it is possible to initiate the microwave propelled ramjet propulsion system at relatively low altitudes instead of at an altitude of 60 km, only one field coil would have to be constructed. In fact, in some embodiments of the invention, a vehicle propelled by an electromagnetic ramjet propulsion system could be boosted to some initial altitude and speed by a conventional chemical rocket system without requiring any field coils. After reaching this initial altitude, the rocket booster could be separated from the vehicle and the vehicle could be propelled by the electromagnetic ramjet receiving propulsive power from a microwave beam. However, as described herein, the preferred embodiment of the invention uses a plurality of large superconducting field coils to initially lift the vehicle off the earth's surface and to propel it to some initial altitude because this will enable the system to launch much greater payloads into orbit.

It should also be pointed out that the magnetic field generated by the field coils used in the preferred embodiment of the invention, may be increased by the presence of underground deposits of iron ore or other natural ferromagnetic substances in the earth near the field coils. This would be very desirable as it would reduce the number of field coils required to establish a desired magnetic field in the vicinity of the launch site.

In another embodiment of the invention, an orbiting microwave transmitter could be used to power the electromagnetic ramjet instead of a plurality of ground based transmitters. This would enable the accelerating distance $s_c$ of the ramjet to be essentially unlimited. It would also enable the maximum power density $\rho_{max}$ of the microwave beam to be increased because atmospheric breakdown at very high altitudes requires much higher power densities.

In still other embodiments, the frequency of the microwave beam may be other than 10 GHz. This is a design detail that would be determined after a more detailed study of the invention involving optimization analysis.

It should also be pointed out and emphasized that the construction of the self-supporting dipole propulsion coils described above, where thin layers of ceramic superconducting material is vapor deposited directly onto fused silica glass fibers, is not a necessary construction feature in the practice of this invention. The superconducting material can be deposited on some intermediate fiber substrate having high tensil strength $\sigma$ and low density $\rho$ such as carbon fibers. The superconducting tension bearing cable could then be fabricated by embedding the carbon filaments in a matrix of fused silica glass fibers as described in my previously mentioned U.S. Pat. No. 4,078,747.

Although constructing the ramjet's superconducting dipole coils with new high temperature superconducting material is an important construction feature of the invention, this feature is not a necessary construction feature in the practice of this invention. The dipole coils could be constructed with ordinary superconducting material that is vapor deposited onto the stress bearing fibers as disclosed in my U.S. Pat. No. 4,078,747. However, in this case the liquid hydrogen cryogenic refrigerant 36 (FIGS. 8,9) used for maintaining the ramjet's superconducting dipole coils 10 at cryogenic temperature would have to be replaced with liquid helium.

It should be emphasized that the ground to orbit electromagnetic propulsion concept and operating system disclosed herein is radically different from prior art electromagnetic propulsion concepts that also use magnetic forces generated by current carrying coils to generate propulsive thrust. In prior art electromagnetic propulsion systems, (which are called "Mass drivers" or "coaxial electromagnetic accelerators") the moving propulsion coil (which is mounted around the payload) is very small, usually only a few centimeters in diameter, and moves through an evacuated tube surrounded by a plurality of identical coaxial drive coils mounted at various intervals along the tube. The drive coils are exited (i.e., pulsed with a current surge) in a sequence timed with the moving coil to generate a travelling magnetic field. Thus, the moving coil is accelerated by series of relatively small incremental steps as it passes through each drive coil. These prior art systems are very complicated electronically (because of the required timing circuits) and can only accelerate very small payloads that are restricted in size by the diameter of the evacuated accelerating tube. Moreover, if the moving coil makes accidental contact with the inside walls of the tube, it could cause the system to disintegrate because of the very high speeds involved Since the tube must be several kilometers long in order to reduce acceleration loads, its construction will be very expensive and prone to catastrophic failure. These are fundamental problems inherent in prior art electromagnetic propulsion systems that cannot be circumvented. Thus, the practical utility of prior art ground-to-orbit launch systems using electromagnetic forces is severely limited. A good technical description of this prior art can be found in the following papers: "Basic Principles Of Coaxial Launch Technology," *IEEE Transactions On Magnetics*, Vol. MAG-20, No. 2, March 1984, pp. 227-230, by H. Kolm and P. Mongeau; and "An Alternative Launching Medium," IEEE Spectrum, April 1982, pp. 30-36, by H. Kolm and P. Mongeau.

The electromagnetic propulsion concept disclosed herein generates its magnetic propulsive force by creating a moving repulsive magnetic field behind superconducting dipole propulsion coils by utilizing low density ionized gas in the earth's upper atmosphere. This is achieved by directing a microwave beam at the propulsion dipoles having a frequency designed to produce electron cyclotron resonance with free electrons moving through the coils. When free electrons move into this resonance region they are rapidly accelerated into circular cyclotron orbits perpendicular to the lines of magnetic induction of the coils. The electrons are thus pumped into very high energy cyclotron orbits by the microwave beam. A strong coupling between the electrons and the microwave wave beam is created resulting in the absorption of essentially all of the beam energy by the electrons. The electrons become strong magnetic dipoles which, in their aggregate, generate a strong repulsive magnetic field behind the propulsion coils that accelerates the coils forward by magnetic repulsive forces. The unique relationship between the magnetic field of the propulsion coils and the frequency of the microwave beam required to produce electron cyclotron resonance is such that very large coil diameters are possible so that thousands of gigawatts of beam power could be used for accelerating giant size payloads with dimensions and mass many orders of magnitude greater than could be accelerated by any prior art propulsion concept. This is at the heart of the invention.

Unlike prior art beamed power propulsion concepts, where a beam is used to heat a working fluid in a relatively small heating region, so that it can be expelled at high velocity to generate propulsive thrust, the beam in the present invention is not absorbed by thermalization processes. Almost all of the beam energy is used to pump free electrons into high energy cyclotron orbits in a very large region. Thus, the microwave beam is converted directly into propulsive thrust with an efficiency that could, in principle, approach 100%. Consequently, the cost of transporting payloads into orbit with this system is essentially equal to the cost of generating an amount of electrical energy equal to the orbital energy. Since the system generates its own electrical energy, this cost is essentially zero.

Although the propulsion system is basically a high altitude ramjet, it is fundamentally different from all prior art ramjets in that it does not require any fuel, and does not involve any heating or combustion processes. Consequently, it has no inherent velocity limitations and, since it generates its propulsive power from a microwave beam, it has no energy limitations. Since the electromagnetic ramjet propulsion system does not have any moving parts and operates by electrical processes, it would be extremely reliable.

Perhaps the most striking operating feature of the electromagnetic ramjet propulsion system disclosed herein is the fact that it can be operated as a reusable self-contained payload acceleration system whereby pre-assembled payloads with very large dimensions and virtually unlimited mass can be lifted off the earth's surface and accelerated into orbit at essentially zero cost. This is a fundamental physical impossibility within the prior art of space travel and will have truly revolutionary implications. For example, it will enable huge completely assembled and fully equipped space stations, manned with hundreds (or thousands) of occupants with a mass of tens of thousands of tons to be transported into essentially any orbit around the earth or the moon at zero cost. Hundreds (of even thousands) of such stations, in the form of orbiting self-contained cities, could be transported into space on such a vast scale that a significant fraction of the total world population could be living in them before the end of the next century. It could also be used to transport huge, completely assembled self-refueling space based interorbital/interplanetary vehicles operating under the generalized theory of rocket propulsion to transport hundreds of passengers at very low cost on high speed interplanetary trajectories throughout the entire solar system. This could lead to the colonization of the solar system.

From the foregoing description, it will thus be evident that the present invention provides a vastly improved method for propelling payloads from the earth's surface into orbit for achieving economical space transportation. As various changes and modifications can be made in the above system and operating method without departing from the spirit or scope of the invention, it is intended that all matter contained in the above description or shown in the accompanying drawings, should be interpreted as illustrative and not in a limiting sense.

What is claimed is:

1. A method for generating propulsive thrust comprising the steps of:
   charging a superconducting coil with electric current to generate a magnetic field;
   providing a source of ionized gas moving through a portion of said magnetic field; and
   directing a beam of electromagnetic radiation into said magnetic field with a frequency designed to produce electron cyclotron resonance with free electrons of said ionized gas moving through said magnetic field thereby accelerating said ionized gas away from said coil and generating propulsive thrust.

2. A method as set forth in claim 1 wherein said gas is atmospheric air that is moving through said coil.

3. A method as set forth in claim 1 further comprising the step of mounting said superconducting coil inside a circular wing-like airfoil having an open duct-like central region.

4. A method as set forth in claim 3 further comprising the step of maintaining said coil at cryogenic temperature by cryogenic cooling means mounted inside said airfoil.

5. A method as set forth in claim 3 wherein said ionized gas is atmospheric air and further comprising the step of moving said airfoil through the atmosphere so as to provide a continuous source of gas moving through said coil 6. A method as set forth in claim 5 wherein said beam of electromagnetic radiation is transmitted from a transmitter located on the earth's surface.

7. A method as set forth in claim 5 further comprising the step of mounting movable aerodynamic control surfaces on said airfoil adapted for guiding said airfoil through the atmosphere.

8. A method as set forth in claim 5 wherein a portion of said ionized air is generated by the step of moving said airfoil at supersonic speed thereby generating supersonic shock waves and creating ionized gas.

9. A method as set forth in claim 5 wherein said airfoil establishes a central longitudinal axis passing through the center of said coil and perpendicular to the plane of said coil and furhter comprising the step of mounting a payload carrying central body in the center of said airfoil extending along said longitudinal axis.

10. A method as set forth in claim 9 further comprising the step of rotating said central body about an axis perpendicular to said longitudinal axis when said airfoil is moving outside the earth's atmosphere.

11. A method as set forth in claim 10 further comprising the step of mounting secondary thrust generating means inside said airfoil and inside said central body for controlling the attitude of said airfoil and for providing maneuvering thrust when said airfoil is moving outside said atmosphere.

12. A method as set forth in claim 5 further comprising the steps of:
creating a static magnetic field on the earth's surface that extends upward into the atmosphere;
launching said airfoil from the earth's surface to some initial altitude at some initial velocity by magnetic repulsive forces exerted on said coil by said static magnetic field; and
accelerating said airfoil to higher velocity by directing said beam or electromagnetic radiation into said magnetic field generated by said superconducting coil when said airfoil reaches said initial altitude, 13. A method as set forth in claim 5 further comprising the steps of:
mounting aerodynamic breaking means on said airfoil; and
decelerating said airfoil by said aerodynamic breaking means so that said airfoil means can be returned to the earth's surface.

14. A method as set forth in claim 3 wherein said step of providing a source of ionized gas comprises the step of moving said airfoil through the earth's ionosphere and utilizing said ionosphere as a source for said ionized gas.

15. A method as set forth in claim 1 wherein said superconducting coil is self-supporting dipole with an aspect ratio exceeding 100.

16. A method for generating propulsive thrust comprising the steps of:
moving a current carrying superconducting coil means generating a magnetic field through the atmosphere such that atmospheric air flows through said coil means; and
creating a secondary repulsive magnetic field behind said coil means by free electrons in said atmospheric air moving in circular electron cyclotron orbits in the magnetic field of said coil means energized by a microwave beam tuned to the electron cyclotron resonant frequency of said orbiting electrons.

17. A method as set forth in claim 16 wherein said microwave beam is transmitted from a transmitter located on the earth's surface.

18. A method as set forth in claim 16 furhter comprising the step of mounting said superconducting coil means inside circular wing-like airfoil means having an open duct-like central region.

19. A method as set forth in claim 16 wherein said superconducting coil means comprises a plurality of superconducting coils further comprising the steps of
mounting said coils inside a like plurality of circular wing-like airfoils having an open duct-like central region; and
maintaining said airfoils in a co-axial spaced-apart relationship with a plurality of radial supporting airfoils mounted between adjacent circular airfoils.

20. A method as set forth in claim 18 further comprising the step of maintaining said coil means at cryogenic temperature by cryogenic cooling means mounted inside said airfoil means.

21. A method as set forth in claim 18 further comprising the step of mounting movable aerodynamic control surfaces on said airfoil means adapted for guiding said airfoil means through the atmosphere.

22. A method as set forth in claim 18 further comprising the step of generating free electrons in the atmosphere by moving said airfoil means at supersonic speed thereby shock ionizing a portion of said air flowing through said airfoil means.

23. A method as set forth in claim 18 further comprising the step of moving said airfoil means through the earth's ionosphere thereby utilizing natural ionized gas present in the ionosphere as a source for free electrons.

24. A method as set forth in claim 18 wherein said airfoil means establishes a longitudinal central axis passing through the center of said airfoil means and further comprising the step of mounting a payload carrying central body in the center of said airfoil means extending along said longitudinal axis.

25. A method as set forth in claim 24 further comprising the step of rotating said central body about an axis perpendicular to said longitudinal axis when said airfoil is moving outside the earth's atmosphere thereby allowing said central body to be aligned along any desired direction while said coil means is constrained by magnetic torque exerted by the earth's natural magnetic field.

26. A method as set forth in claim 25 further comprising the step of mounting secondary thrust generating means inside said airfoil means and inside said central body adapted for controlling the attitude of said airfoil means and for providing maneuvering thrust when said airfoil means is moving outside said atmosphere.

27. A method as set forth in claim 18 further comprising the steps of:

creating a static magnetic field on the earth's surface that extends upward into the atmosphere;

launching said airfoil means from the earth's surface to some initial altitude at some initial velocity by magnetic repulsive forces exerted on said coil means by said static magnetic field; and accelerating said airfoil means to higher velocity when said airfoil mean reaches said initial altitude by directing said microwave beam into said magnetic field generated by said coil means thereby creating said secondary repulsive magnetic field behind said coil means.

28. A method as set forth in claim 18 further comprising the steps of:

mounting aerodynamic breaking means on said airfoil means; and decelerating said airfoil means by said aerodynamic breaking so that airfoil means can be returned to the earth's surface.

29. A method as set forth in claim 16 wherein said superconducting coil means comprises a plurality of self-supporting dipoles having aspect ratios exceeding 100.

30. A method for generating propulsive thrust comprising the steps of:

charging a superconducting coil means with electric current thereby generating a magnetic field; and accelerating ionized gas away from said coil means by a microwave beam having a frequency tuned to produce electron cyclotron resonance with free electrons of said ionized gas moving in said magnetic field.

31. A method as set forth in claim 30 wherein said ionized gas is atmospheric air moving through said coil means.

32. A method as set forth in claim 30 further comprising the steps of:

mounting said superconducting coil means inside circular wing-like air-foil means having an open duct-like central region; and moving said airfoil means through the atmosphere such that said gas is atmospheric air moving through said duct-like central region.

33. A method as set forth in claim 32 further comprising the step of ionizing a portion of said atmospheric air moving through said airfoil means.

34. A method as set forth in claim 32 further comprising the step of maintaining said coil means at cryogenic temperature by cryogenic cooling means mounted inside said airfoil means.

35. A method as set forth in claim 32 wherein said microwave beam is transmitted from a transmitter located on the earth's surface.

36. A method as set forth in claim 32 further comprising the step of mounting movable aerodynamic control surfaces on said airfoil means for guiding said airfoil means through the atmosphere in controlled flight.

37. A method as set forth in claim 32 wherein said circular airfoil means establishes a central longitudinal axis passing through the center of said airfoil means further comprising the step of mounting a payload carrying central body in the center of said airfoil means extending along said longitudinal axis.

38. A method as set forth in claim 37 further comprising the step of rotating said central body about an axis perpendicular to said longitudinal axis when said airfoil means is moving outside the earth's atmosphere thereby allowing said central body to be aligned along any desired direction while said coil means is constrained by magnetic torque exerted by the earth's natural magnetic field.

39. A method as set forth in claim 38 further comprising the step of mounting secondary thrust generating means inside said airfoil means and inside said central body for controlling the attitude of said airfoil means and for providing maneuvering thrust when said airfoil means is moving outside said atmosphere.

40. A method as set forth in claim 32 further comprising the step of moving said airfoil means through the atmosphere at supersonic speed thereby generating shock waves and ionizing a portion of said atmospheric air moving through said airfoil means.

41. A method as set forth in claim 32 further comprising the steps of:

creating a static magnetic field on the earth's surface that extends upward into the atmosphere;

launching said airfoil means from the earth's surface to some initial altitude at some initial velocity by magnetic repulsive forces exerted on said coil means by said static magnetic field; and propelling said airfoil means to higher velocity when said airfoil means reaches said initial altitude by accelerating ionized gas away from said airfoil means by transmitting said microwave beam tuned to said electron cyclotron resonant frequency.

42. A method as set forth in claim 32 further comprising the steps of:

mounting aerodynamic breaking means on said airfoil means; and decelerating said airfoil means by said aerodynamic breaking means so that said airfoil means can be returned to the earth's surface.

43. A method as set forth in claim 32 further comprising the steps of:

moving said airfoil means through the earth's ionosphere while generating said propulsive thrust; and utilizing said ionosphere as a source for ionized gas.

44. A method as set forth in claim 30 wherein said superconducting coil means comprises a plurality of circular superconducting coils further comprising the steps of:

mounting said coils inside a like plurality of circular wing-like airfoils with an open duct-like central region; and maintaining said airfoils in a co-axial, spaced-apart relationship with a plurality of radial supporting airfoils mounted between adjacent circular airfoils.

45. A method as set forth in claim 30 wherein said superconducting coil means comprises a plurality of self-supporting dipoles having aspect ratios exceeding 100.

46. A method for accelerating a body to high velocity comprising the steps of charging a superconducting coil means with electric current so as to create a magnetic field;

mounting said superconducting coil means inside an airfoil means adapted for flight through the atmosphere;

attaching said body to said airfoil means; and creating a travelling repulsive magnetic field behind said airfoil means by inducing free electrons in the atmosphere to move in circular electron cyclotron resonance orbits by a microwave beam thereby accelerating said airfoil means by magnetic repulsive forces.

47. A method as set forth in claim 46 wherein said microwave beam is transmitted from a transmitter means located on the earth's surface.

48. A method as set forth in claim 46 further comprising the step of maintaining said superconducting coil means at cryogenic temperature by cryogenic cooling means mounted inside said airfoil means.

49. A method as set forth in claim 46 further comprising the step of ionizing a portion of atmospheric air for generating free electrons.

50. A method as set forth in claim 46 wherein said airfoil means has a circular wing-like shape with an open circular duct-like central region that is surrounded by said coil means and further comprising the step of moving said airfoil means so that atmospheric air passes through said open duct-like region.

51. A method as set forth in claim 50 further comprising the step of mounting movable aerodynamic control surfaces on said airfoil means for guiding said airfoil means through the atmosphere in controlled flight.

52. A method as set forth in claim 50 further comprising the step of mounting secondary thrust generating means inside said airfoil means for controlling the attitude of said airfoil means and for providing maneuvering thrust when said airfoil means is moving outside the earth's atmosphere.

53. A method as set forth in claim 50 further comprising the step of moving said airfoil means through the atmosphere at supersonic speed thereby generating shock waves and ionizing a portion of said atmospheric air moving through said open duck-like airfoil means.

54. A method as set forth in claim 50 wherein said body has a length less than the diameter of said open duct-like region further comprising the step of mounting said body inside said duct-like region on a beam extending along a diameter of said duct-like region and such that said body can be rotated around said beam.

55. A method as set forth in claim 54 wherein said body defines a longitudinal central axis that is perpendicular to said beam further comprising the steps of:
rolling said body about said longitudinal axis; and
rotating said body around said beam so that said longitudinal axis can be pointed in any direction independent of the orientation of said airfoil means.

56. A method as set forth in claim 47 further comprising the steps of:
creating a static magnetic field on the earth's surface that extends upward into the atmosphere;
launching said airfoil means from the earth's surface to some initial altitude at some initial speed by magnetic repulsive forces exerted on said coil means by said static magnetic field; and
accelerating said airfoil means to higher velocity when said airfoil means reaches said initial altitude by creating said travelling repulsive magnetic field by said microwave beam transmitted from said transmitter means.

57. A method as set forth in claim 50 further comprising the steps of:
mounting aerodynamic breaking means on said airfoil means; and
decelerating said airfoil means by said aerodynamic breaking means so that said airfoil means can be returned to the earth's surface.

58. A method as set forth in claim 46 further comprising the steps of:
moving said airfoil means through the earth's ionosphere; and
utilizing the ionosphere as a source for ionized gas for creating said travelling repulsive magnetic field.

59. A method as set forth in claim 46 wherein said superconducting coil means comprises a plurality of circular superconducting coils and further comprising the steps of:
mounting said coils inside a like plurality of circular wing-like airfoils with an open duct-like central region; and
maintaining said airfoils in a co-axial, spaced-apart relationship with a plurality of radial supporting airfoils mounted between adjacent circular airfoils.

60. A method as set forth in claim 46 wherein said superconducting coil means comprises a plurality of self-supporting dipoles having aspect ratios exceeding 100.

61. An apparatus for generating propulsive thrust comprising:
superconducting coil means for generating a magnetic field;
means for passing ionized gas through a portion of said magnetic field; and
means for transmitting a microwave beam into said magnetic field with a frequency designed to produce electron cyclotron resonance with free electrons of said ionized gas moving through said magnetic field thereby accelerating said ionized gas away from said coil means and generating propulsive thrust.

62. An apparatus as set forth in claim 61 wherein said ionized gas is atmospheric air.

63. An apparatus as set forth in claim 61 further comprising:
circular wing-like airfoil means having a duct-like central region; and
means for mounting said superconducting coil means inside said airfoil means.

64. An apparatus as set forth in claim 63 further comprising cryogenic cooling means mounted inside said airfoil means for maintaining said superconducting coil means at cryogenic temperature.

65. An apparatus as set forth in claim 63 wherein said circular airfoil means is moved through the atmosphere such that atmospheric air flows through said duct-like central region and through said magnetic field.

66. An apparatus as set forth in claim 65 wherein said means for transmitting said microwave beam comprises a phased array microwave transmitter located on the earth's surface.

67. An apparatus as set forth in claim 65 further comprising:
movable aerodynamic control surfaces mounted on said wing-like airfoil means;
actuator means for moving said movable control surfaces mounted inside said airfoil means;
guidance and navigation computer means mounted inside said airfoil means; and
electrical conduit means connecting said computer means with said actuator means enabling said airfoil means to be guided automatically through the atmosphere along a pre-calculated flight path.

68. An apparatus as set forth in claim 65 further comprising means for generating supersonic shock waves mounted inside said duct-like central region of said airfoil means such that when said airfoil means is moving at supersonic speed, a portion of said atmospheric air flowing through said duct-like central region is ionized by said shock waves.

69. An apparatus as set forth in claim 65 wherein said duct-like region establishes a longitudinal central axis further comprising means for mounting a payload carrying central body in the center of said airfoil means extending along said longitudinal axis wherein the transverse cross sectional area of said central body is significantly less than the transverse cross sectional area of said open duct-like central region so as to not restrict the atmospheric air flowing through said central region.

70. An apparatus as set forth in claim 69 wherein said central body has a length less than the diameter of said airfoil means and further comprising means for rotating said central body about an axis perpendicular to said longitudinal axis when said airfoil means is moving outside the earth's atmosphere thereby allowing said central body to be aligned along any desired direction while said coil means is constrained by magnetic torque exerted by the earth's natural magnetic field.

71. An apparatus as set forth in claim 70 further comprising attitude control and maneuvering propulsion means mounted inside said airfoil means and inside said central body for providing attitude control and maneuvering propulsion when said airfoil means is moving outside the earth's atmosphere.

72. An apparatus as set forth in claim 65 further comprising:
means for creating a static magnetic field on the earth's surface that extends upward into the atmosphere; and
means for launching said airfoil means from the earth's surface to some initial altitude at some initial velocity by magnetic repulsive forces exerted on said coil means by said static magnetic field such that when said airfoil means reaches said initial altitude, said microwave beam is turned on from a microwave transmitter located on the earth's surface thereby accelerating said airfoil means to higher velocity.

73. An apparatus as set forth in claim 72 further comprising a plurality of spaced-apart microwave transmitters located on the earth's surface such that when said airfoil means moves out of range of one transmitter, the next transmitter is turned on in a precisely synthronized manner so as to enable said airfoil means to be continuously accelerated sequentially through the atmosphere by a series of transmitters until said airfoil means reaches a desired terminal velocity.

74. An apparatus as set forth in claim 65 further comprising aerodynamic breaking means mounted on said airfoil means for decelerating said airfoil means when said airfoil means is traversing through the atmosphere so that said airfoil means can be returned to the earth's surface.

75. An apparatus as set forth in claim 61 wherein said superconducting coil means is a self-supporting dipole with an aspect ratio exceeding 100.

76. An apparatus for generating propulsive thrust comprising:
superconducting current carrying coil means generating a magnetic field;
means for moving said coil means through the atmosphere such that atmospheric air flows through said coil means; and
means for creating a secondary repulsive magnetic field behind said moving coil means by free electrons in said atmospheric air moving in circular electron cyclotron orbits in the magnetic field of said coil means energized by a microwave beam tuned to the electron cyclotron resonant frequency of said orbiting electrons.

77. An apparatus as set forth in claim 76 wherein said microwave beam is transmitted from a phased array transmitter located on the earth's surface.

78. An apparatus as set forth in claim 76 further comprising:
circular wing-like airfoil means having a duct-like central region; and
means for mounting said superconducting coil means inside said airfoil means.

79. An apparatus as set forth in claim 78 wherein said circular airfoil means is moved through the atmosphere such that atmospheric air flows through said duct-like central region and through said magnetic field generated by said coil means.

80. An apparatus as set forth in claim 76 wherein said superconducting coil means comprises a plurality of superconducting coils further comprising:
a like plurality of circular wing-like airfoils having a duct-like central region;
means for mounting said coils inside said airfoils; and
means for maintaining said circular airfoils in a coaxial, spaced-apart relationship by a plurality of radial supporting airfoils mounted between adjacent circular airfoils.

81. An apparatus as set forth in claim 79 further comprising:
cryogenic cooling means; and
means for mounting said cryogenic cooling means inside said airfoil means for maintaining said superconducting coil means at cryogenic temperature.

82. An apparatus as set forth in claim 79 further comprising:
movable aerodynamic control surfaces mounted on said circular airfoil means;
actuator means for moving said movable control surfaces mounted inside said airfoil means;
guidance and navigation computer means mounted inside said airfoil means; and
electrical conduit means connecting said computer means and said actuator means enabling said airfoil means to be guided automatically through the atmosphere along a pre-calculated flight path.

83. An apparatus as set forth in claim 79 further comprising means for generating supersonic shock waves mounted inside said duct-like central region of said airfoil means such that when said airfoil means is moving at supersonic speed, a portion of said atmospheric air flowing through said duct-like central region is ionized by said shock waves.

84. An apparatus as set forth in claim 79 wherein said duct-like central region establishes a longitudinal central axis further comprising means for mounting a payload carrying central body in the center of said airfoil means extending along said longitudinal axis wherein the transverse cross sectional area of said central body is significantly less than the transverse cross sectional area of said airfoil duct so as to not restrict the atmospheric air flowing through said duct.

85. An apparatus as set forth in claim 84 wherein said central body has a length less than the diameter of said airfoil means and further comprising means for rotating said central body about an axis perpendicular to said longitudinal axis when said airfoil means is moving outside the earth's atmosphere thereby allowing said central body to be aligned along any desired direction while said coil means is constrained by magnetic torque exerted by the earth's natural magnetic field.

86. An apparatus as set forth in claim 85 further comprising attitude control and maneuvering propulsion means mounted inside said airfoil means and said central body for providing attitude control and maneuvering propulsion when said airfoil means is moving outside the earth's atmosphere.

87. An apparatus as set forth in claim 79 further comprising:
   means for creating a static magnetic field on the earth's surface that extends upward into the atmosphere; and
   means for launching said airfoil means from the earth's surface to some initial altitude at some initial velocity by magnetic repulsive forces exerted on said coil means mounted inside said airfoil means by said static magnetic field such that when said airfoil means reaches said initial altitude, said microwave beam is turned on from a microwave transmitter located on the earth's surface thereby accelerating said airfoil means to higher velocity.

88. An apparatus as set forth in claim 87 furhter comprising a plurality of spaced-apart microwave transmitters located on the earth's surface such that when said airfoil means moves out of range of one transmitter, the next transmitter is turned on in a precisely synchronized manner so as to enable said airfoil means to be continuously accelerated sequentially through the upper atmosphere by a series of transmitters until said airfoil means reaches a desired terminal velocity.

89. An apparatus as set forth in claim 84 further comprising aerodynamic breaking means mounted on said airfoil means and on said central body for decelerating said airfoil means when said airfoil means is traversing through the atmosphere so that said airfoil means can be returned to the earth's surface.

90. An apparatus as set forth in claim 76 wherein said superconducting coil means comprises a plurality of self-supporting dipoles having aspect ratios exceeding 100.

91. An apparatus for generating propulsive thrust comprising:
   superconducting coil means for generating a magnetic field;
   means for passing ionized gas through said magnetic field;
   a microwave transmitter located on the earth's surface;
   means for transmitting a microwave beam from said microwave transmitter into said magnetic field with a frequency tuned to produce electron cyclotron resonance with free electrons of said ionized gas moving in said magnetic field thereby accelerating said ionized gas away from said coil means and generating propulsive thrust.

92. An apparatus as set forth in claim 91 wherein said ionized gas is atmospheric air.

93. An apparatus as set forth in claim 91 further comprising:
   circular wing-like airfoil means having a duct-like central region; and
   means for mounting said superconducting coil means inside said airfoil means.

94. An apparatus as set forth in claim 93 further comprising:
   cryogenic cooling means; and
   means for mounting said cryogenic cooling means inside said airfoil means for maintaining said superconducting coil means at cryogenic temperature.

95. An apparatus as set forth in claim 93 wherein said circular airfoil means is moved through the atmosphere such that atmospheric air flows through said duct-like central region and through said magnetic field.

96. An apparatus as set forth in claim 95 wherein said superconducting coil means comprises a plurality of superconducting coils further comprising:
   A like plurality of circular wing-like airfoils having a duct-like central region;
   means for mounting said coils inside said airfoils; and
   means for maintaining said circular airfoils in a coaxial spaced-apart relationship by a plurality of radial airfoils mounted between adjacent circular airfoils.

97. An apparatus as set forth in claim 95 further comprising means for ionizing a portion of said atmospheric air flowing through said duct-like central region.

98. An apparatus as set forth in claim 95 wherein said microwave transmitter is an electrically steered phased array.

99. An apparatus as set forth in claim 95 further comprising:
   movable aerodynamic control surfaces mounted on said wing-like airfoil means;
   actuator means for moving said movable control surfaces mounted inside said airfoil means;
   guidance and navigation computer means mounted inside said airfoil means; and
   electrical conduit means connecting said computer means with said actuator means enabling said airfoil means to be guided automatically through the atmosphere along a pre-calculated flight path.

100. An apparatus as set forth in claim 95 wherein said duct-like region establishes a longitudinal central axis further comprising means for mounting a payload carrying central body in the center of said airfoil means extending along said longitudinal axis wherein the transverse cross sectional area of said central body is significantly less than the transverse cross sectional area of said airfoil duct so as to not restrict the atmospheric air flowing through said duct.

101. An apparatus as set forth in claim 100 wherein said central body has a length less than the diameter of said airfoil means and further comprises means for rotating said central body about an axis perpendicular to said longitudinal axis when said airfoil means is moving outside the earth's atmosphere thereby allowing said central body to be aligned along any desired direction while said coil means is constrained by magnetic torque exerted by the earth's natural magnetic field.

102. An apparatus as set forth in claim 101 further comprising attitude control and maneuvering propulsion means mounted inside said airfoil means and inside said central body for providing attitude control and maneuvering propulsion when said airfoil means is moving outside the earth's atmosphere.

103. An apparatus as set forth in claim 95 further comprising means for generating supersonic shock waves mounted inside said duct-like central region of said airfoil means such that when said airfoil means is moving at supersonic speed, a portion of said atmospheric air flowing through said duct-like central region is ionized by said shock waves.

104. An apparatus as set forth in claim 95 further comprising:

means for creating a static magnetic field on the earth's surface that extends upward into the atmosphere; and means for launching said airfoil means from the earth's surface to some initial altitude at some initial velocity by magnetic repulsive forces exerted on said coil means mounted inside said airfoil means by said static magnetic field such that when said airfoil means reaches said initial altitude said microwave beam is turned on from a microwave transmitter located on the earth's surface thereby accelerating said airfoil means to higher velocity.

105. An apparatus as set forth in claim 104 further comprising a plurality of spaced-apart microwave transmitters located on the earth's surface such that when said airfoil means moves out of range of one transmitter, the next transmitter is turned on in a precisely synchronized manner so as to enable said airfoil means to be continuously accelerated sequentially through the upper atmosphere by a series of microwave transmitters until said airfoil means reaches a desired terminal velocity.

106. An apparatus as set forth in claim 105 wherein said central duct-like region of said airfoil means has a radius exceeding 100 m and wherein said microwave beams transmitted by said transmitters have beam powers exceeding 100 GW and further comprising cable means attached to said airfoil means adapted for accelerating a toroidal space station having a maor radius greater than said duct radius, from the earth's surface into orbit.

107. An apparatus as set forth in claim 95 further comprising aerodynamic breaking means mounted on said airfoil means for decelerating said airfoil means when said airfoil means is traversing through the atmosphere.

108. An apparatus as set forth in claim 91 wherein said superconducting coil means comprises a plurality of self-supporting dipoles having aspect ratios exceeding 100.

109. A high altitude ramjet propulsion system comprising:
superconducting coil means for generating a primary magnetic field;
circular duct-like airfoil means;
means for mounting said superconducting coil means inside said duct-like airfoil means;
a microwave transmitter located on the earth's surface; and
means for transmitting a microwave beam from said transmitter into said primary magnetic field with a frequency designed to produce electron cyclotron resonance with free electrons moving in said primary magnetic field thereby creating a secondary repulsive magnetic field behind said primary magnetic field and generating propulsive thrust.

110. An electromagnetic accelerator for accelerating a body to high velocity comprising:
movable superconducting coil means for generating a primary magnetic field;
means for attaching said body to said movable superconducting coil means;
microwave transmitter means mounted on the earth's surface; and
means for creating a travelling repulsive magnetic field behind said superconducting coil means within the earth's atmosphere by a microwave beam transmitted from said transmitter means thereby accelerating said coil means by magnetic repulsive forces.

111. An electromagnetic accelerator as set forth in claim 110 wherein said means for creating said travelling repulsive magnetic field behind said movable superconducting coil means comprises transmitting said microwave beam into said primary magnetic field with an electron cyclotron resonant frequency, such that free electrons from the atmosphere moving through said primary magnetic field are pumped into high energy electron cyclotron resonant orbits which, by virtue of their circular paths, become magnetic dipoles creating said travelling repulsive magnetic field.

112. An electromagnetic accelerator set forth in claim 111 further comprising:
circular wing-like airfoil means having an open circular central duct-like region; and
means for mounting said movable superconducting coil means inside said airfoil means such that said coil means surrounds said open central duct-like region and such that said primary magnetic field passes through said duct-like region.

113. An electromagnetic accelerator as set forth in claim 112 wherein said circular airfoil means is moved through the atmosphere such that atmospheric air flows through said central duct-like region and through said primary magnetic field.

114. An electromagnetic accelerator as set forth in claim 113 further comprising cryogenic cooling means mounted inside said airfoil means for maintaining said superconducting coil means at cryogenic temperature.

115. An electromagnetic accelerator as set forth in claim 113 further comprising:
movable aerodynamic control surfaces mounted on said airfoil means;
actuator means for moving said movable control surfaces mounted inside said airfoil means;
guidance and navigation computer means mounted inside said airfoil means; and
electrical conduit means connecting said computer means with said actuator means enabling said airfoil means to be guided automatically through the atmosphere along a pre-calculated flight path.

116. An electromagnetic accelerator as set forth in claim 113 wherein said open circular central duct-like region defines a central longitudinal axis and wherein said body has a length less than the diameter of said duct-like central region and a transverse cross sectional area less than 10% of the transverse cross sectional area of said duct-like region and wherein said mounting means comprises:
a beam extending along a diameter of said open central duct-like region perpendicular to said longitudinal axis connected to said airfoil means; and
means for mounting said body on said beam such that the center of mass of said body passes through said beam.

117. An electromagnetic accelerator as set forth in claim 116 wherein said body defines a longitudinal central axis that is perpendicular to said beam further comprising:
means for rolling said body around its longitudinal central axis; and
means for rotating said body around said beam such that said longitudinal axis of said body can be pointed in any direction independent of the orientation of said airfoil means.

118. An electromagnetic accelerator as set forth in claim 117 further comprising attitude control and maneuvering propulsion means mounted inside said airfoil means and inside said central body for providing attitude control and maneuvering propulsion when said airfoil means is moving outside the earth's atmosphere.

119. An electromagnetic accelerator as set forth in claim 113 further comprising means for generating supersonic shock waves mounted inside said duct-like central region of said airfoil means such that when said airfoil means is moving at supersonic speed, a portion of said atmospheric air flowing through said duct-like region is ionized by said shock waves.

120. An electromagnetic accelerator as set forth in claim 113 further comprising:
  means for creating a static magnetic field on the earth's surface that extends upward into the atmosphere; and
  means for launching said airfoil means from the earth's surface to some initial altitude at some initial velocity by magnetic repulsive forces exerted on said coil means mounted inside said airfoil means by said static magnetic field such that when said airfoil means reaches said initial altitude, said microwave beam is turned on thereby creating said travelling repulsive magnetic field behind said airfoil means accelerating said airfoil means to higher velocity.

121. An electromagnetic accelerator as set forth in claim 120 further comprising a plurality of spaced-apart microwave transmitters mounted on the earth surface such that when said airfoil means moves out of range of one transmitter, the next transmitter is turned on in a precisely synchronized manner so as to enable said airfoil means to be accelerated sequentially through the upper atmosphere by a series of microwave transmitters until said airfoil means reaches a desired terminal velocity.

122. An electromagnetic accelerator as set forth in claim 113 further comprising aerodynamic breaking means mounted on said airfoil means for decelerating said airfoil means when said airfoil means is traversing through the atmosphere.

123. An electromagnetic accelerator as set forth in claim 113 wherein said superconducting coil means comprises a plurality of superconducting coils further comprising:
  a like plurality of circular wing-like airfoils having a circular duct-like central region;
  means for mounting said coils inside said circular airfoils such that said coils surround said open central duct-like region; and
  means for maintaining said circular airfoils in a coaxial spaced-apart relationship by a plurality of radial airfoils mounted between adjacent circular airfoils.

124. An electromagnetic accelerator as set forth in claim 110 wherein said superconducting coil means comprises a plurality of self-supporting dipoles having aspect ratios exceeding 100.

125. An electromagnetic accelerator as set forth in claim 118 further comprising:
  secondary electromagnetic propulsion means mounted inside said body energized by electric current; and
  means for utilizing electric current stored inside said superconducting coil means as an energy source to power said secondary propulsion means.

126. An electromagnetic accelerator as set forth in claim 120 further comprising control and guidance means for landing said airfoil means back on the earth's surface while decelerating said airfoil means by magnetic repulsive forces generated by said static magnetic field.

127. An electromagnetic accelerator for accelerating a body to high velocity above the earth's surface comprising:
  movable superconducting coil means for generating a primary magnetic field;
  means for attaching said body to said movable superconducting coil means;
  microwave transmitter means mounted on the earth's surface; and
  means for generatig a travelling secondary repulsive magnetic field behind said superconducting coil means by a microwave beam transmitted from said transmitter means.

128. An electromatnetic accelerator as set forth in claim 127 wherein said means for generating said travelling repulsive magnetic field comprises accelerating free electrons from ionized gas moving in said primary magnetic field into circular cyclotron orbits by said microwave beam operating with an electron cyclotron resonant frequency.

129. An electromagnetic accelerator as set forth in claim 128 wherein said ionized gas is ionized atmospheric air.

130. An electromagnetic accelerator as set forth in claim 129 wherein said microwave transmitter means comprises a series of spaced-apart microwave transmitters mounted on the earth's surface further comprising switching means such that when said coil means moves out of range of one transmitter, said energizing microwave beam is transmitted from the next transmitter in the series so that said coil means can be accelerated over a long accelerating distance.

131. An apparatus for generating propulsive thrust comprising:
  superconducting coil means for generating a primary magnetic field; and
  means for generating a secondary repulsive magnetic field behind said superconducting coil means by a microwave beam.

132. An apparatus as set forth in claim 131 wherein said means for generating said secondary repulsive magnetic field comprises accelerating free electrons from ionized gas moving in said primary magnetic field into circular cyclotron orbits by said microwave beam operating with an electron cyclotron resonant frequency.

133. An apparatus as set forth in claim 132 wherein said ionized gas is ionized atmospheric air.

* * * * *